(12) United States Patent
Singer et al.

(10) Patent No.: US 12,162,216 B2
(45) Date of Patent: Dec. 10, 2024

(54) THICKNESS-LIMITED ELECTROSPRAY DEPOSITION

(71) Applicant: Rutgers, the State University of New Jersey, New Brunswick, NJ (US)

(72) Inventors: Jonathan P. Singer, Cranford, NJ (US); Lin Lei, Piscataway, NJ (US)

(73) Assignee: Rutgers, the State University of New Jersey, New Brunswick, NJ (US)

( * ) Notice: Subject to any disclaimer, the term of this patent is extended or adjusted under 35 U.S.C. 154(b) by 1034 days.

(21) Appl. No.: 17/251,262

(22) PCT Filed: Jun. 12, 2019

(86) PCT No.: PCT/US2019/036776
§ 371 (c)(1),
(2) Date: Dec. 11, 2020

(87) PCT Pub. No.: WO2019/241394
PCT Pub. Date: Dec. 19, 2019

(65) Prior Publication Data
US 2021/0323006 A1    Oct. 21, 2021

Related U.S. Application Data

(60) Provisional application No. 62/683,869, filed on Jun. 12, 2018.

(51) Int. Cl.
*B05D 1/04*    (2006.01)
*B05D 5/00*    (2006.01)
(Continued)

(52) U.S. Cl.
CPC ............ *B29C 64/188* (2017.08); *B05D 1/045* (2013.01); *B05D 5/005* (2013.01); *C09D 5/24* (2013.01);
(Continued)

(58) Field of Classification Search
CPC .... B05D 1/045; B05D 5/005; B05D 2203/35; B05D 2350/00; B05D 2601/10;
(Continued)

(56) References Cited

U.S. PATENT DOCUMENTS 3,267,057 A    8/1966  Spillier
3,873,024 A    3/1975  Probst et al.
(Continued)

FOREIGN PATENT DOCUMENTS

CN     101331625    12/2008
GB       1099713     1/1968
(Continued)

OTHER PUBLICATIONS

Lei et al., Obtaining Thickness-Limited Electrospray Deposition for 3D Coating, ACS Appl. Mater. Interfaces 2018, 10, 11175-11188 (Mar. 15, 2018). (Year: 2018).*
(Continued)

*Primary Examiner* — William P Fletcher, III
(74) *Attorney, Agent, or Firm* — Wolter Van Dyke Davis, PLLC; Eugene J. Molinelli; Cian G. O'Brien

(57) ABSTRACT

Self-limiting electrospray compositions including a non-charge-dissipative component and/or a charge-dissipative component. Self-limiting electrospray composition including a plurality of charge-dissipative components and excluding a non-charge-dissipative component. Methods for forming layers of self-limiting thickness. Methods for determining a conductivity of a material. Methods for repairing a flaw in a layer on a surface of an object.

17 Claims, 53 Drawing Sheets

(51) Int. Cl.

| | |
|---|---|
| *B29C 64/188* | (2017.01) |
| *C09D 5/24* | (2006.01) |
| *C09D 5/26* | (2006.01) |
| *C09D 163/00* | (2006.01) |
| *C09D 177/06* | (2006.01) |
| *B05B 5/025* | (2006.01) |

(52) U.S. Cl.
CPC .............. *C09D 5/26* (2013.01); *C09D 163/00* (2013.01); *C09D 177/06* (2013.01); *B05B 5/0255* (2013.01); *B05D 2203/35* (2013.01); *B05D 2350/00* (2013.01); *B05D 2601/10* (2013.01); *B05D 2601/20* (2013.01)

(58) Field of Classification Search
CPC ........ B05D 2601/20; B05D 1/06; B05D 1/12; B05B 5/0255; C09D 5/24; C09D 5/26; C09D 163/00; C09D 177/06; C08G 2261/3221; C08G 2261/3223; C08G 2261/51; C08L 63/04; C08L 77/08; C08L 25/06; C08L 53/02
See application file for complete search history.

(56) References Cited

U.S. PATENT DOCUMENTS

| | | | |
|---|---|---|---|
| 4,082,860 | A | 4/1978 | Corbett et al. |
| 4,218,493 | A | 8/1980 | Rarey |
| 4,952,293 | A | 8/1990 | Sypula et al. |
| 5,792,558 | A | 8/1998 | Jonas et al. |
| 6,531,142 | B1 | 3/2003 | Rabe et al. |
| 6,866,212 | B2 | 3/2005 | Sumiyoshi et al. |
| 2003/0203991 | A1 | 10/2003 | Schottman et al. |
| 2004/0021017 | A1 | 2/2004 | Sumiyoshi et al. |
| 2007/0065668 | A1 | 3/2007 | Hiroshi |
| 2007/0113530 | A1 | 5/2007 | Morozov et al. |
| 2010/0080923 | A1 | 4/2010 | Bardelli |
| 2012/0263938 | A1 | 10/2012 | Paul et al. |

FOREIGN PATENT DOCUMENTS

| | | |
|---|---|---|
| GB | 1399934 A | 7/1975 |
| JP | 48-028040 A | 4/1973 |
| JP | 54-080346 A | 6/1979 |
| JP | 2005-518278 A | 2/2002 |
| JP | 2007-111690 A | 5/2007 |
| JP | 2009-508973 A | 3/2009 |
| KR | 10-2000-0004982 | 9/2002 |
| KR | 10-0426767 B1 | 5/2004 |
| SU | 1 092 224 A1 | 5/1984 |
| WO | 9311209 A1 | 10/1993 |
| WO | 9735941 A1 | 2/1997 |

OTHER PUBLICATIONS

Lei et al., Self-Limiting Electrospray Deposition on Polymer Templates, Scientific Reports 2020, 10, 17290 (Oct. 14, 2020). (Year: 2020).*
Al-Milaji, K. N.; Zhao, H. Applied Surface Science 2017, 396, 955-964.
Bailey, A. G. Journal of Electrostatics 1998, 45, (2), 85-120.
Balazs, A. C.; Emrick, T.; Russell, T. P. Science 2006, 314, (5802), 1107-1110.
Banerjee, P.; Mandal, B. M. Macromolecules 1995, 28, (11), 3940-3943.
Bertrand, E.; Bibette, J.; Schmitt, V. Physical Review E 2002, 66, (6), 060401.
Blumberg, L. N.; Gursky, J. C.; Stein, P. C., Electrospraying of Thin Targets. Los Alamos Scientific Laboratory: 1962.
Bodnar, E.; Rosell-Llompart, J. Journal of Colloid and Interface Science 2013, 407, (0), 536-545.
Brown, E.; Zhang, H.; Forman, N. A.; Maynor, B. W.; Betts, D. E.; DeSimone, J. M.; Jaeger, H. M. Physical Review E 2011, 84, (3), 031408.
Burkarter, E.; Saul, C. K.; Thomazi, F.; Cruz, N. C.; Roman, L. S.; Schreiner, W. H. Surface and Coatings Technology 2007, 202, (1), 194-198.
Cazaux, J. Journal of Electrostatics 2007, 65, (12), 764-774.
Chavhan, M. P.; Ganguly, S. Industrial & Engineering Chemistry Research 2016, 55, (38), 10073-10083.
Choo, Y.; Hu, H.; Toth, K.; Osuji, C. O. Journal of Polymer Science Part B: Polymer Physics 2016, 54, (2), 247-253.
Coleman, J. N.; Curran, S.; Dalton, A. B.; Davey, A. P.; McCarthy, B.; Blau, W.; Barklie, R. C. Physical Review B 1998, 58, (12), R7492-R7495.
Dhawan, S. K.; Singh, N.; Venkatachalam, S. Synthetic Metals 2001, 125, (3), 389-393.
Elmoursi, A. A.; Garner, D. P. J. Coat. Technol. 1992, 64, (805), 39-44.
Freeman, P.; Rowlinson, J. Polymer 1960, 1, 20-26.
Gañán-Calvo, A. M.; Dávila, J.; Barrero, A. Journal of Aerosol Science 1997, 28, (2), 249-275.
Gaskell, S. J. Journal of mass spectrometry 1997, 32, (7), 677-688.
Gomez, A.; Tang, K. Physics of Fluids 1994, 6, (1), 404-414.
Guo, Q.; Mather, J. P.; Yang, P.; Boden, M.; Mather, P. T. PLOS ONE 2015, 10, (6), e0129960.
Hinaut, A.; Pawlak, R.; Meyer, E.; Glatzel, T. Beilstein Journal of Nanotechnology 2015, 6, 1927-1934.
Hoang, A.; Pallon, L.; Liu, D.; Serdyuk, Y.; Gubanski, S.; Gedde, U. Polymers 2016, 8, (3), 87.
Hoburg, J. F. IEEE Transactions on Industry Applications 1982, (6), 666-672.
Hoque, E.; DeRose, J. A.; Houriet, R.; Hoffmann, P.; Mathieu, H. J. Chemistry of Materials 2007, 19, (4), 798-804.
Hou, X.; Choy, K.-L. Surface and Coatings Technology 2004, 180-181, 15-19.
Hu, H.; Singer, J. P.; Osuji, C. O. Macromolecules 2014, 47, (16), 5703-5710.
Hu, H.; Toth, K.; Kim, M.; Gopalan, P.; Osuji, C. O. MRS Communications 2015, 5, (2), 235-242.
Hwang, D.; Lee, H.; Jang, S.-Y.; Jo, S. M.; Kim, D.; Seo, Y.; Kim, D. Y. ACS Applied Materials & Interfaces 2011, 3, (7), 2719-2725.
Jaworek, A.; Sobczyk, A. T. Journal of Electrostatics 2008, 66, (3-4), 197-219.
Kanta, A.; Sedev, R.; Ralston, J. Colloids and Surfaces A: Physicochemical and Engineering Aspects 2006, 291, (1), 51-58.
Kataby, G.; Prozorov, T.; Koltypin, Y.; Cohen, H.; Sukenik, C. N.; Ulman, A.; Gedanken, A. Langmuir 1997, 13, (23), 6151-6158.
Kay, D.; Styles, V.; Welford, R. Interfaces Free Bound 2008, 10, (1), 15-43.
Kim, J. W.; Yamagata, Y.; Kim, B. J.; Higuchi, T. Journal of Micromechanics and Microengineering 2009, 19, (2), 025021.
Kim, J.-S.; Chung, W. S.; Kim, K.; Kim, D. Y.; Paeng, K.-J.; Jo, S. M.; Jang, S.-Y. Advanced Functional Materials 2010, 20, (20), 3538-3546.
Kim, J.-Y.; Kim, E.-K.; Kim, S. S. Journal of Colloid and Interface Science 2013, 392, 376-381.
Kim, Y.; Zhu, J.; Yeom, B.; Di Prima, M.; Su, X.; Kim, J.-G.; Yoo, S. J.; Uher, C.; Kotov, N. A. Nature 2013, 500, (7460), 59-63.
Kitano, M.; Shiojiri, M. Powder Technology 1997, 93, (3), 267-273.
Klein, L. C .; Kallontzi, S.; Fabris, L.; Jitianu, A.; Ryan, C.; Aparicio, M.; Lei, L.; Singer, J. P. Journal of Sol-Gel Science and Technology 2018.
Krella, A. K.; Sobczyk, A. T.; Krupa, A.; Jaworek, A. Mechanics of Materials 2016, 98, 120-133.
Kuhn, H. H., Characterization and Application of Polypyrrole-Coated Textiles. In Intrinsically Conducting Polymers: An Emerging Technology, Aldissi, M., Ed. Springer Netherlands: Dordrecht, 1993; pp. 25-34.
Edward Law, S. Journal of Electrostatics 2001, 51-52, 25-42.
Ee, J.; Bong, J.; Ha, Y.-G.; Park, S.; Ju, S. Applied Surface Science 2015, 330, 445-448.
Leeuwenburgh, S.; Wolke, J.; Schoonman, J.; Jansen, J. Journal of Biomedical Materials Research Part A 2003, 66A, (2), 330-334.

(56) References Cited

OTHER PUBLICATIONS

Li, J.; Kim, J.-K. Composites Science and Technology 2007, 67, (10), 2114-2120.
Li, Q.; Church, J. S.; Naebe, M.; Fox, B. L. Composites Part A: Applied Science and Manufacturing 2016, 90, 174-185.
Maleski, K.; Mochalin, V. N.; Gogotsi, Y. Chemistry of Materials 2017, 29, (4), 1632-1640.
Merrill, M. H.; Pogue, I. I. I. W. R .; Baucom, J. N. Journal of Micro and Nano-Manufacturing 2015, 3, (1), 011003-011003.
Merrill, M.; Teferra, K.; Kang, W. In Nano-scaled Structures through Charged Particle Interactions, Proceedings of the American Society for Composites: Thirty-First Technical Conference, 2016.
Moerman, R.; Frank, J.; Marijnissen, J. C. M.; Schalkhammer, T. G. M.; van Dedem, G. W. K. Analytical Chemistry 2001, 73, (10), 2183-2189.
Naguib, M.; Mochalin, V. N.; Barsoum, M. W.; Gogotsi, Y. Advanced Materials 2014, 26, (7), 992-1005.
Narkis, M.; Lidor, G.; Vaxman, A.; Zuri, L. Journal of Electrostatics 1999, 47, (4), 201-214.
Novak, S.; Johnston, D. E.; Li, C.; Deng, W.; Richardson, K. Thin Solid Films 2015, 588, 56-60.
Nutz F.A.; Philipp A; Kopera B.A.F; Dulle M.; Retsch M . . . Advanced Materials 2018, 30, (14), 1704910.
Park, M.; Im, J.; Shin, M.; Min, Y.; Park, J.; Cho, H.; Park, S.; Shim, M.-B.; Jeon, S.; Chung, D.-Y.; Bae, J.; Park, J.; Jeong, U.; Kim, K. Nat Nano 2012, 7, (12), 803-809.
Powell, M. Physical Review B 1979, 20, (10), 4194.Powell, M. Physical Review B 1979, 20, (10), 4194.
Prasad, L. K.; McGinity, J. W.; Williams, R. O. International Journal of Pharmaceutics 2016, 505, (1), 289-302.
Rietveld, I. B.; Kobayashi, K.; Yamada, H.; Matsushige, K. Journal of Colloid and Interface Science 2006, 298, (2), 639-651.
Rietveld, I. B.; Kobayashi, K.; Yamada, H.; Matsushige, K. Soft Matter 2009, 5, (3), 593-598.
Sprik, M.; Delamarche, E.; Michel, B.; Roethlisberger, U.; Klein, M. L.; Wolf, H.; Ringsdorf, H. Langmuir 1994, 10, (11), 4116-4130.
Subbiah, T.; Bhat, G. S.; Tock, R. W.; Parameswaran, S.; Ramkumar, S. S. Journal of Applied Polymer Science 2005, 96, (2), 557-569.
Tachi, K.; Okuda, C.; Yamada, K. J. Coat. Technol. 1990, 62, (791), 19-25.
Tang, J.; Gomez, A. Aerosol Science and Technology 2017, 51, (6), 755-765.
Taylor, G. Proceedings of the Royal Society of London. Series A, Mathematical and Physical Sciences 1964, 280, (1382), 383-397.
Vonnegut, B.; Neubauer, R. L. Journal of Colloid Science 1952, 7, (6), 616-622.
Wang, Y.; Shan, J. W.; Weng, G. J. Journal of Applied Physics 2015, 118, (6), 065101.
Weiss, F. M.; Topper, T.; Osmani, B.; Peters, S.; Kovacs, G.; Muller, B. Adv. Electron. Mater. 2016, 2, (5), 8.
Winey, K. I.; Kashiwagi, T.; Mu, M. MRS Bulletin 2007, 32, (4), 348-353.
Woo, C. G.; Shin, H.; Jeong, C.; Jun, K.; Lee, J.; Lee, J.-R.; Lee, H.; You, S.; Son, Y.; Choi, M. Small 2011, 7, (13), 1790-1794.
Wu, S. Polymer-Plastics Technology and Engineering 1976, 7, (2), 119-220.
Yamashita, M.; Fenn, J. B. The Journal of Physical Chemistry 1984, 88, (20), 4451-4459.
Zeleny, J. Physical review 1917, 10, (1), 1.
Examination Report received for Indian Patent Application No. 202027056315, mailed on Jul. 1, 2022, 6 pages.
Search Report and Written Opinion received for SG Patent Application No. 11202012177V, mailed on Apr. 4, 2022, 10 pages.
Chinese Search Report dated Nov. 24, 2021, issued in corresponding CN 201980039826X. English abstract provided.
Lei L. et al., "Obtaining Thickness-Limited Electrospray Deposition for 30 Coating", ACS Applied Materials & Interfaces, Mar. 15, 2018, vol. 10, issue 13, pp. 11175-11188.
International Search Report and Written Opinion for International Patent Application No. PCT/US19/36776, dated Aug. 29, 2019, pp. 1-11.
International Preliminary Report on Patentability received for PCT Patent Application No. PCT/US2019/036776, mailed on Dec. 24, 2020, 11 pages.
International Search Report and Written Opinion received for PCT Patent Application No. PCT/US2019/036776, mailed on Aug. 29, 2019, 11 pages.
Japan Patent Office, "Office Action," issued in connection with Japan Patent Application No. 2020-569187 dated Feb. 21, 2023 (11 pages) (6 pages of English Translation and 5 pages of Original Document).
Notification of Second Office Action received for Chinese Patent Application No. 201980039826.X, mailed on Jul. 4, 2022, 9 pages (3 pages of English Translation and 6 pages of Original Document).
Office Action received for Brazilian Patent Application No. 112020025373, mailed on Sep. 7, 2022, 4 pages (Original Document only).
Office Action received for Korean Patent Application No. 10-2020-7035790, mailed on Oct. 27, 2022, 15 pages (8 X pages of English Translation and 7 pages of Original Document).
Extended European Search report issued Feb. 18, 2022, in corresponding EP19818710.6.
Korean Office Action issued Mar. 8, 2022, in corresponding KR 10-2020-7035790. English translation provided.

* cited by examiner

```
                          130
                              ┐
                    ┌─────────────────────────────────────────────────────┐
                    │  OPTIONALLY RENDERING A TARGET MATERIAL CONDUCTIVE  │
                    └─────────────────────────────────────────────────────┘
         136                               │
                                           ▼
              ┌──────────────────────────────────────────────────────────┐
              │       EXPOSE THE TARGET MATERIAL TO AN INCIDENT SPRAY    │
              │       COMPRISING A THERMO-RESPONSIVE POLYMER SOLUTION    │
              │    CONTAINING A NON-CONDUCTIVE POLYMER AND OPTIONALLY A  │
              │  PLURALITY OF CONDUCTIVE FILLER PARTICLES, IN THE PRESENCE │
              │                    OF AN ELECTRIC FIELD                  │
              └──────────────────────────────────────────────────────────┘
         131
```

131 EXPOSE THE TARGET MATERIAL TO AN INCIDENT SPRAY COMPRISING A THERMO-RESPONSIVE POLYMER SOLUTION CONTAINING A NON-CONDUCTIVE POLYMER AND OPTIONALLY A PLURALITY OF CONDUCTIVE FILLER PARTICLES, IN THE PRESENCE OF AN ELECTRIC FIELD

132 ALLOW TEMPERATURE OF THERMO-RESPONSIVE POLYMER SOLUTION TO DEVIATE TOWARD A SURFACE TEMPERATURE OF THE TARGET TO A DEPOSITED TEMPERATURE AT WHICH THE NON-CONDUCTIVE POLYMER IS IMMOBILE

133 ALLOW THE NON-CONDUCTIVE POLYMER TO ACCUMULATE ON THE TARGET TO FORM A LAYER, HAVING A THICKNESS OR A CHARGE SUFFICIENT TO REPULSE THE INCIDENT SPRAY

134 OPTIONALLY THERMALLY DENSIFY THE LAYER TO REMOVE AIR VOIDS

135 OPTIONALLY AT LEAST PARTIALLY REMOVING THE NON-CONDUCTIVE POLYMER TO FORM A CONTINUOUS NETWORK OF THE CONDUCTIVE FILLER PARTICLES

FIG. 1C

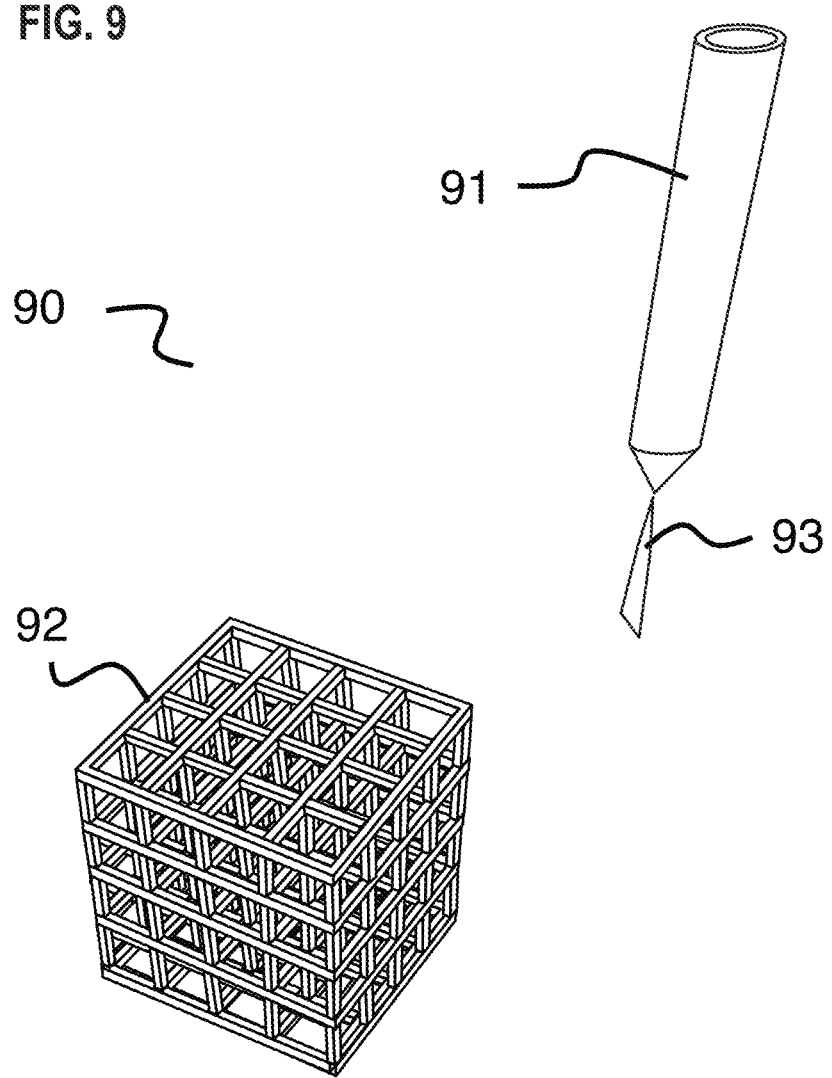

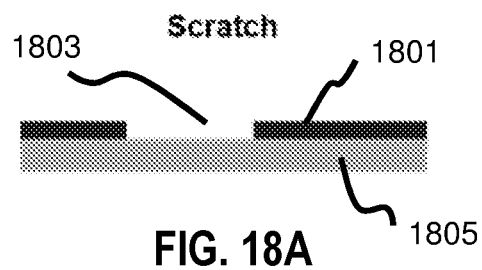
FIG. 18A
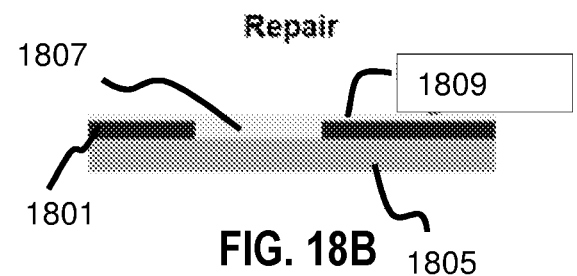
FIG. 18B
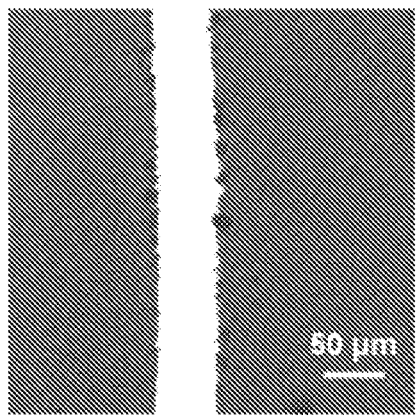 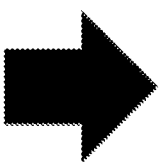 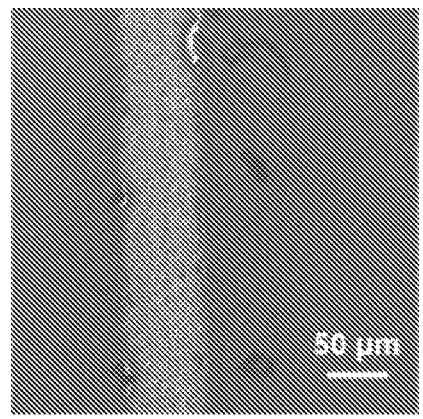
FIG. 18C                    FIG. 18D

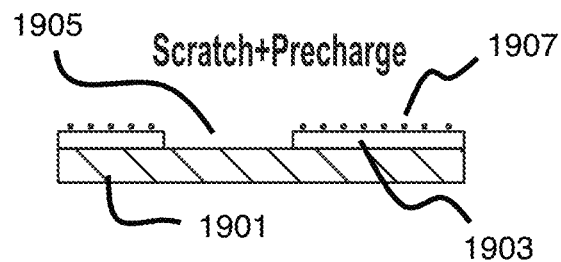
FIG. 19A
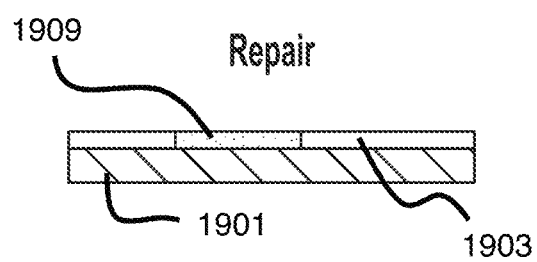
FIG. 19B
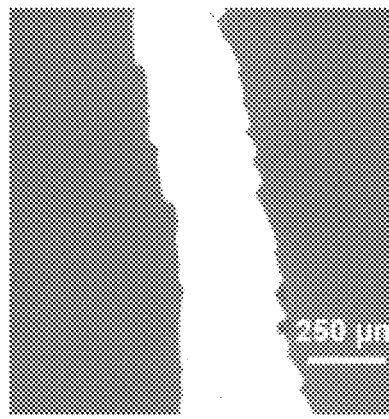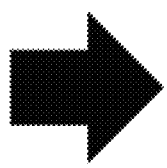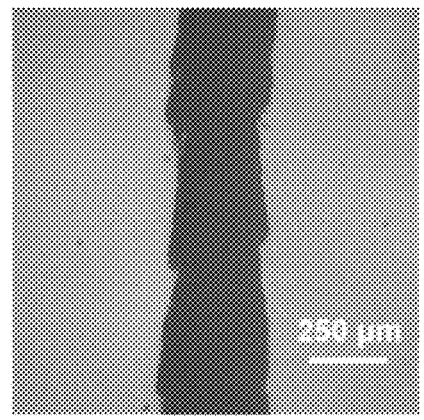
FIG. 19C
FIG. 19D

THICKNESS-LIMITED ELECTROSPRAY DEPOSITION

CROSS-REFERENCE TO RELATED APPLICATION

This application is a National Stage entry of PCT/US19/36776 filed Jun. 12, 2019, which claims the benefit of U.S. Provisional Patent Application No. 62/683,869, filed Jun. 12, 2018, titled THICKNESS-LIMITED ELECTROSPRAY DEPOSITION OF THERMORESPONSIVE MATERIALS, which are incorporated by reference herein in their entireties.

BACKGROUND

In the field of coatings, one of the longest-standing engineering challenges is the problem of wasted material mass. For many applications, including protective (e.g. anti-fouling, anti-corrosion, anti-static, and ultra-violet (UV) barrier) and active (e.g. catalytic and sensing) coatings, only the thin, top-most layer is necessary to impart a particular surface functionality, such as, for example, a particular appearance, a reflectivity, an anti-corrosive property, a water-proof property, etc. Wasted material mass may be especially problematic when high-efficiency nanomaterials or other advanced materials are employed in the coatings, resulting in significant unused materials cost.

Micro/nanoscale conformal coatings may be applied in either the molecular or condensed state. Molecular deposition techniques, such as electrodeposition, vacuum deposition, atomic layer deposition, or chemical vapor deposition, generally require either a fluid bath or high-vacuum to apply and may also require high-temperature precursor processing. This offsets their cost-benefit considerations and limits the size of the component that may be coated. Condensed deposition techniques, such as spray coating, dip coating, spin coating, and brush or blade coating struggle with 3D surfaces and result in capillary or shadowing effects.

Electrospray deposition (ESD) is one of a family of electrostatically-driven, material-deposition processes in which a high voltage electric field (typically >100 kilovolts per meter, kV/m) is used to create fluid droplets or extruded wires. ESD describes conditions where dilute (typically <5 vol %) spray solutions are placed under an electric field while being emitted through a narrow capillary. The field creates charge on the surface of the fluid that in turn draws the fluid into a Taylor cone which emits droplets. These charged droplets split into a size where surface and electrostatic forces are balanced in one or several generations of droplets of narrow dispersion. As each of these droplets arrive at a grounded or opposite polarity target, it delivers the material contained within, depositing a coating of material. However, despite this technology, it has been discovered that there is a need for an ESD method to form a layer of self-limiting thickness, including the formation of a self-limiting thickness that is sufficient to allow the layer to hinder further accumulation of the spray of material onto the conductive target.

SUMMARY

Various embodiments relate to methods of thickness-limited, electrospray deposition that may reduce wasted material mass and also provide a well-adhered, conformal coating, having a self-limiting thickness.

Various embodiments relate to a self-limiting electrospray composition including a non-charge-dissipative component and a charge-dissipative component.

Various embodiments relate to a self-limiting electrospray composition including a plurality of charge-dissipative components and excluding a non-charge-dissipative component. According to such embodiments, each of the plurality of charge-dissipative components may be incapable of forming a layer of self-limiting thickness when electrosprayed without at least one other member of the plurality of charge-dissipative components, and/or without a non-charge-dissipative component.

Various embodiments relate to methods for forming a layer of self-limiting thickness. The methods may include exposing a conductive target to a spray in the presence of an electric field, wherein the spray includes a self-limiting electrospray composition according to any of the other embodiments described herein. The methods may further include allowing the spray to accumulate on a surface of the conductive target to form the layer of self-limiting thickness, wherein the self-limiting thickness is sufficient to allow the layer to hinder further accumulation of the spray on the conductive target. A variety of mechanisms may be involved to hinder the accumulation of the spray. The embodiments described herein may utilize any or all of such mechanisms.

Various embodiments relate to a method of thickness-limited, electrospray deposition. The method may include exposing an electrically conductive target to an incident spray comprising a thermo-responsive polymer solution, in the presence of an electric field. The electrically conductive target may have a surface temperature. The thermo-responsive polymer solution may include a non-conductive polymer. The thermo-responsive polymer solution may have a solution temperature. The method may further include allowing the solution temperature to deviate toward the surface temperature to a deposited temperature at which the non-conductive polymer is immobile. The method may further include allowing the non-conductive polymer to accumulate on the electrically conductive target to form a layer, having a thickness sufficient to repulse the incident spray.

Various embodiments relate to a method for determining a conductivity of a material. The method may include exposing a material to a spray in the presence of an electric field, wherein the spray comprises a self-limiting electrospray composition; allowing the spray to accumulate on a surface of the material to form the layer of self-limiting thickness, wherein the self-limiting thickness is sufficient to allow the layer to hinder further accumulation of the spray on the material; measuring the self-limiting thickness of the layer; and determining the conductivity of the material by comparing the self-limiting thickness to a thickness achieved by exposing a test material having a known conductivity to the spray in the presence of the electric field. Any self-limiting electrospray composition according to any of the other embodiments described herein may be employed.

Various embodiments relate to a method for repairing a flaw in a layer on a surface of an object. The method may include applying a charge to the layer; exposing the flaw to a spray in the presence of an electric field, wherein the spray comprises a self-limiting electrospray composition; and allowing the spray to accumulate on the flaw to form a repair layer having a self-limiting thickness, wherein the self-limiting thickness is sufficient to hinder further accumulation of the spray on the repair layer. Any self-limiting electrospray composition according to any of the other embodiments described herein may be employed.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details may be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1C is a flow chart that illustrates an example of self-limiting electrospray deposition (SLED) method according to various embodiments;

FIG. 9 is an example according to various embodiments illustrating a method and device for post-print spray of a 4D structure made of responsive materials;

FIG. 13B is an example according to various embodiments illustrating 3D spray using PS and then PVP;

FIG. 18A is an example according to various embodiment illustrating a schematic cross-section of a SLED coating having a scratch;

FIG. 18B is an example according to various embodiment illustrating a schematic cross-section of a SLED coating having a scratch repaired with a repair layer deposited by SLED;

FIG. 18C is an example according to various embodiment illustrating an image of a SLED coating having a scratch;

FIG. 18D is an example according to various embodiment illustrating an image of a SLED coating having a scratch repaired with a repair layer deposited by SLED;

FIG. 19A is an example according to various embodiment illustrating a schematic cross-section of a SLED coating having a scratch;

FIG. 19B is an example according to various embodiment illustrating a schematic cross-section of a SLED coating having a scratch repaired with a repair layer deposited by SLED;

FIG. 19C is an example according to various embodiment illustrating an image of a SLED coating having a scratch;

FIG. 19D is an example according to various embodiment illustrating an image of a SLED coating having a scratch repaired with a repair layer deposited by SLED;

DETAILED DESCRIPTION

Figure 1A:
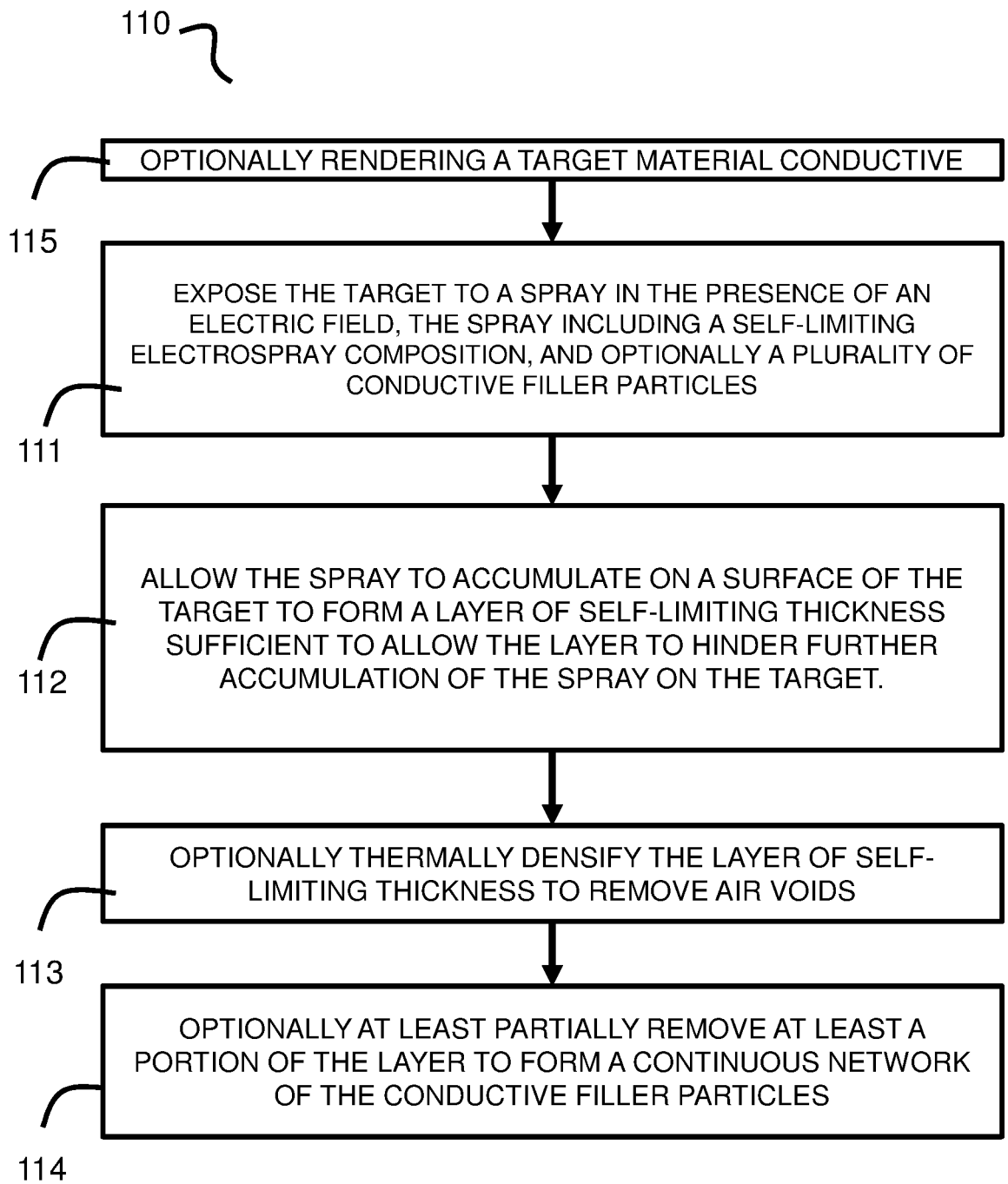
FIG. 1A is a flow chart that illustrates an example of a method for forming a layer of self-limiting thickness according to various embodiments.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter may include any and all sub-ranges between (and including) the minimum value of zero and the maximum value of 10, that is, any and all sub-ranges having a minimum value of equal to or greater than zero and a maximum value of equal to or less than 10, e.g., 1 to 4.

General Definitions

As used herein, the term "thickness-limited" in the context of electrospray deposition refers to an electro-spraying procedure where the accumulation of charge on a target repels further spray.

As used herein, the term "thermo-responsive polymer solution" refers to a polymer solution capable of undergoing decomposition into a solvent-rich phase and a polymer-rich phase through a variety of mechanisms including, but not limited to evaporation or spinodal decomposition.

As used herein, the term "electrospray composition" refers to any formulation of one or more materials that may be electrosprayed.

As used herein, the term "self-limiting electrospray composition" refers to any electrospray composition that forms a thickness-limited coating or layer.

As used herein, the term "non-volatile" refers to a composition that is not easily evaporated at normal temperatures and pressures. In the context of electrospray deposition, a non-volatile composition is one that is not easily evaporated at electrospray deposition temperatures, pressures, and deposition times.

As used herein, the term "electrospray deposition conditions" is not limited to any specific temperature, pressure, and/or time range, because the conditions at which various compositions may be electrosprayed varies. Some materials may be electrosprayed at ambient temperature, pressure, and hours of spraying. Other materials may be electrosprayed at higher or lower temperatures, pressures, and/or times. If the electrospray composition comprises, a solvent, the solvent is generally in the form of a volatile liquid at the electrospray deposition temperature, pressure, and time. Other materials in the electrospray composition may be non-volatile at the electrospray deposition conditions. At electrospray deposition temperatures, pressures, and times, the electric field may provide the dominant steering mechanism for the ejected electrospray composition such that the spray is generally non-inertial in nature.

As used herein, the term "spinodal decomposition" refers to a mechanism for the rapid unmixing of a mixture of liquids or solids from at least one thermodynamic phase to form at least two coexisting phases in the absence of thermodynamic energy barriers.

As used herein, the term "electrically conductive target" or "conductive target" refers to an electrospray deposition target possessing sufficient conductivity to remove a charge at an equal or greater rate than it is being delivered by a spray, being applied to the target in an electrospray deposition process. According to various embodiments described herein, the spray may include a non-conductive polymer.

As used herein, the term "non-charge-dissipative" used to describe a material, a component, or a substance means that the material, component, compound, or substance is electrically insulating or at least sufficiently resistant to conducting an electrical charge such that a layer comprising the material, component, compound, or substance may have a self-limiting thickness at which the layer hinders further electrospray deposition of the material, component, compound, or substance onto the layer. A non-charge-dissipative material, component, compound, or substance may be any suitable material, component, compound, or substance, including but not limited to a non-conductive polymer.

As used herein, the term "charge-dissipative" used to describe a material, component, compound, or substance means that the material, component, compound, or substance is not electrically insulating or is at least sufficiently dissipative or conductive such that a layer consisting of only that material, component, compound, or substance in the absence of a non-charge-dissipative material, component, compound, or substance does not exhibit a self-limiting thickness at which the layer repels further electrospray deposition of the material, component, compound, or substance onto the layer. According to various embodiments described herein, a solution comprising one or more charge-dissipative materials, components, compounds, or substances along with one or more non-charge-dissipative materials, components, compounds, or substances may be electrosprayed to form a layer having a self-limiting thickness at which the layer repels further deposition of the sprayed solution.

As used herein, the term "non-conductive polymer" or "non-charge dissipating polymer" refers to any electrically insulating thermoplastic polymer, thermosetting polymer, oligomer, copolymer, or blend. In this context, "electrically insulating" or "charge-dissipating" means that a rate of charge movement by electrical conduction or mass transport (i.e. electrical advection) is much less than a rate of charge deposited by the arriving droplets during electrospray. In the case of copolymers or blends, the individual components of the copolymer or blend may not be non-conductive, but the total copolymer or blend may be non-conductive.

As used herein, the term "immobile" refers to a component in a state at which it is resistant to flow. For example, a polymer or polymer solution that is at a temperature below the polymer's softening point or glass transition temperature Tg may be considered immobile. According to various embodiments, a component may be "immobilized" by a variety of mechanisms, including, but not limited to, a temperature transition, a spinodal decomposition, and/or a polymerization.

As used herein, the term "spherical shell surface morphology" refers to a surface textured with a plurality of spheroidal or approximately spheroidal particles.

As used herein, the term "spheroidal particles" refers to granules having a generally, but not necessarily precisely, spherical shape, for example, any ellipsoid with approximately equal semi-diameters. The spheroid may have an oblate or a prolate shape or a shape that combines an oblate and a prolate shape. The spheroid may be incomplete, for example, a spherical shell with one or more holes in the surface.

As used herein, the term "at least one dimension," when used with respect to a particle or a nanofeature, such as a nanowire, refers to a dimension defining an overall size of the particle or nanowire, such as an overall length, width, height, and/or diameter as opposed to a dimension that does not define the overall size of the particle or nanowire, such as the size of a surface feature.

As used herein, the term "nanofeature" means a structure or a substructure that has at least one dimension on a nanoscopic scale.

As used herein, the term "nanoscopic scale" (or nanoscale) refers to a dimension in a range of from about 1 to about 1000 nanometers or from 1 to about 100 nanometers.

As used herein, the term "nanotextured surface morphology" refers to a surface textured with a plurality of nanofeatures.

As used herein, the term "nanowire surface morphology" refers to a surface textured with a plurality of nanowire structures.

As used herein, the term "nanowire" refers to elongated structures with a nanoscale diameter. A nanowire may be a type nanofeature.

As used herein, the term "lower critical solution temperature" (LCST) refers to the critical temperature below which the components of a mixture are miscible for a broad range of solute in solvent compositions.

As used herein, the term "upper critical solution temperature" (UCST) refers to the critical temperature above which the components of a mixture are miscible for a broad range of solute in solvent compositions.

As used herein, the term "thermally densifying" refers to heating a polymer, copolymer, or blend, to a temperature above its glass transition temperature or above its melting point to liberate entrained gases, to coalesce the polymer, copolymer, or blend, and optionally to remove at least a portion of the polymer, copolymer, or blend material.

As used herein, the term "particle volume content" refers to the concentration of a particle by volume of all constituents of a mixture or system.

Introduction

Various embodiments described herein relate to self-limiting electrospray deposition (SLED), which describes a regime of spray wherein the spray target may be electrically conductive. In this context, "electrically conductive" refers to possessing sufficient conductivity to remove charge at an equal or greater rate than it is being delivered by the spray, and the spray itself is both (1) electrically non-conductive, where "non-conductive" in this context refers to possessing electrical conductivity insufficient to dissipate the charge at a rate equal to or greater than the rate delivered by the spray, and (2) immobile, where "immobile" in this context means unable to flow at a rate comparable to the time scale of spray, for example, at a rate comparable to the rate at which the spray is applied to the target. In this regime charge builds up on the surface of the coating and leads to repulsion of the incident spray, which is redirected to uncoated portions of the target. This property enables coatings of complex 3D surfaces with uniform thickness of the coating.

Various embodiments disclosed here relate to a self-limiting electrospray deposition (SLED) method as a means to fabricate microscale functional coatings. Various embodiments of this method make use of charge buildup in SLED to redirect sprays to uncoated regions of the target. In this way, the coatings may track the target surface in a conformal fashion, and since the sprays do not require vacuum or immersion in a bath, they may be deposited in ambient conditions, for example at about atmospheric temperature and pressure. These unique advantages may create a scalable technique that may be compatible with complex three-dimensional (3D) additive or micromachined structures and that reduces materials waste. Various embodiments may achieve high-efficiency application of nanotextured coatings with multifunctional additives at desired microscale thicknesses. To accomplish these objectives, various embodiments leverage the mechanisms of charge redistribution and self-assembly that occur in this highly-dynamic process. Four mechanisms may be employed, alone or in some combination, in various embodiments: (1) the phase behavior of evaporating SLED droplets of homogeneous or blended polymer solutions; (2) the changes to this phase behavior with the addition of conductive and non-conductive particles; (3) the effects of substrate conductivity on the ability to spray SLED coatings, and (4) the effects of different 3D geometries and their resulting limitations.

Various embodiments recognize that the capability to deposit precise micro/nanoscale coatings onto 3D surfaces with control over the morphology in a non-bath or non-vacuum method would represent a huge cost savings for these coatings and electrostatically-induced sprays have the potential to fill this need. ESD and electrostatic spray processing both generate highly monodisperse droplets or powder sprays through the acceleration of particles in a strong electric field. As used herein, a strong electric field generally refers to an electric field of about 100 kV/m. The key difference between ESD and commercial electrostatic spray is the nature of the charge transfer and motion. In electrostatic spray, moving ionized air is used to charge and direct the spray, while in ESD, the electrostatic force on the droplet is the only driver for transport. Despite having been studied for several decades, results of ESD are notoriously difficult to reproduce, and the deliberate use of the electrostatic instabilities observed in electrostatic spray to control ESD has been quite limited.

Various embodiments provide (1) the ability to control the micro/nanoscale morphology and porosity of sprayed polymer coatings for applications, including applying coatings as thermal barriers; (2) SLED sprays that may be deposited from non-toxic aqueous solutions at ambient temperatures and humidity; (3) the addition of materials that would be otherwise incompatible with SLED through blending, such as functional polymers or nanoparticles as anti-fouling, anti-static, or active layers; or (4) coating of 3D non-conductive structures that would normally be considered incompatible with ESD, including native oxides of metallic surfaces, which reduces the need for pretreatment; or some combination.

In ESD, the droplets are emitted by electrostatic breakdown from an electrostatically drawn Taylor cone. ESD tends to use much lower flow rates (on the order of ~1 milliliter per hour, mL/hr) and exclusively makes use of low solids loadings (generally <5 vol %). Higher solids loadings result in a third technique, electrospinning, which is commonly employed in the production of fiber mats. When DC electric fields are employed, the droplets produced in the initial separation from the Taylor cone in ESD continue to split until they achieve a balance of surface tension and surface charge, with the crossover referred to as the Rayleigh limit. In the process, they undergo repeated Coulomb explosion events, ejecting monodisperse "child" droplets. As the solvent in the parent and child droplets evaporates, they eject additional generations of droplets until the spray arrives at a substrate or the solids fraction gels the droplets. This cascading process, most typically two generations, results in a finite collection of monodisperse final particle sizes. The dominant size of these droplets (typically ~0.1 to ~100 µm) may be described through the following empirical relationship shown in Equation (1):

$$d = \alpha \left( \frac{Q^3 \varepsilon_0 \rho}{\pi^4 \sigma \gamma} \right)^{\frac{1}{6}} + d_0 \quad (1)$$

Where $\alpha$ is a constant related to the fluid's dielectric permittivity, Q is the flow rate, $\varepsilon_0$ is the permittivity of vacuum, $\rho$ is the density of solution, $\gamma$ is the surface tension of the solution, $\sigma$ is the electrical conductivity of the solution, and $d_0$ is a relatively small diameter that comes into play only at low flow rates. This monodisperse generation of self-repelling droplets is a major advantage of ESD, along with the ease of creating nanocomposites via simple mixing. As a result, ESD may be employed for deposition of nanomaterials. These capabilities make ESD ideal for the deposition of nanomaterials including proteins and cells, thin polymeric and chalcogenide films, ceramic precursors, and nanoparticles.

Because of the charged nature of the droplets, ESD of continuous films requires continuous dissipation of the delivered charge. Therefore, there is an inherent contradiction to spraying insulating coatings onto conductive surfaces, since even a thin layer of insulator should "clad" the conductive surface and stop the spray in a "thickness-limited" fashion.

Self-Limiting Electrospray Compositions Comprising a Non-Charge-Dissipative Component Various embodiments relate to self-limiting electrospray compositions that may include one or more non-charge-dissipative components, optionally one or more charge-dissipative component, optionally one or more solvents, and optionally a plurality of filler particles.

According to various embodiments, the non-charge-dissipative component may be present in an amount within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 5, 10, 15, 20, 25, 30, 35, 40, 45, 50, 55, 60, 65, 70, 75, 80, 85, 90, 95, and 100 percent by weight based on the total weight of the self-limiting electrospray composition. For example, according to certain embodiments, the non-charge-dissipative component may be present in an amount of from about 0.0001 to about 100 percent by weight based on the total weight of the self-limiting electrospray composition, or any combination of lower limits and upper limits described.

According to various embodiments, the charge-dissipative component may be present in an amount within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 5, 10, 15, 20, 25, 30, 35, 40, 45, 50, 55, 60, 65, 70, 75, 80, 85, 90, 95, and 100 percent by weight based on the total weight of the self-limiting electrospray composition. For example, according to certain embodiments, the charge-dissipative component may be present in an amount of from about 0.0001 to about 100 percent by weight based on the total weight of the self-limiting electrospray composition, or any combination of lower limits and upper limits described.

According to various embodiments, the non-charge-dissipative component may be, but is not limited to, a non-charge-dissipative polymer, a non-charge-dissipative organosilicon compound, a non-charge-dissipative polysaccharide, a non-charge-dissipative polypeptide, a non-charge-dissipative collagen derivative, a non-charge-dissipative cellulose derivative, a non-charge-dissipative compound containing an epoxide functional group, a non-charge-dissipative urethane, and combinations thereof.

According to various embodiments, the non-charge-dissipative polymer may be, but is not limited to, a poly(styrene), a poly(methyl methacrylate), a poly(vinyl pyrrolidone), a temperature responsive polymer, a poly(N,N-diethylacrylamide), a poly(N-vinylcaprolactam), a poly(vinyl alcohol), a poly(tetrafluoroethylene), a poly(acrylic acid), a poly(propylene oxide), a poly(dimethylamino ethyl methacrylate), a poly(N-(L)-(1-hydroxymethyl) propylmethacrylamide), a polyamide, a polyimide, a poly(oxazoline), a poly(propylene), and combinations thereof. According to various embodiments, the temperature responsive polymer may be a poly(N-isopropylacrylamide). According to various embodiments, the poly(tetrafluoroethylene) may be a sulfonated tetrafluoroethylene based fluoropolymer-copolymer (such as, for example, NAFION®). According to various embodiments, the polyamide may be ELVAMIDE®, a nylon, and/or a nylon copolymer. According to various embodiments, the polyimide may be MATRIMID®.

According to various embodiments, the non-charge-dissipative organosilicon compound may be, but is not limited to, a poly(silsesquioxane), an oligomeric silsesquioxane, and combinations thereof.

According to various embodiments, the non-charge-dissipative polysaccharide may be, but is not limited to, dextran, agarose, chitosan, and combinations thereof.

According to various embodiments, the non-charge-dissipative polypeptide may be, but is not limited to, a poly(pentapeptide) of elastin.

According to various embodiments, the non-charge-dissipative collagen derivative may be, but is not limited to, gelatin.

According to various embodiments, the non-charge-dissipative cellulose derivative may be, but is not limited to, methylcellulose, cellulose acetate, nitro cellulose, hydroxypropyl cellulose, and combinations thereof.

According to various embodiments, the non-charge-dissipative compound containing an epoxide functional group may be, but is not limited to, an epoxide, an epoxy, an oxirane, an ethoxyline, an epoxy-based resin, and combinations thereof. According to various embodiments, the epoxy-based resin may be SU-8®.

According to various embodiments, the non-charge-dissipative urethane may be, but is not limited to, an ethyl carbamate, a polyurethane, a carbamate, and combinations thereof.

According to various embodiments, the charge-dissipative component may be, but is not limited to, a charge-dissipative polymer, a charge-dissipative curing agent or photoinitiator, a charge-dissipative organic compound, a charge-dissipative ionic compound, a charge-dissipative chalcogenide glass, a charge-dissipative oil, a charge-dissipative saccharide, a charge-dissipative surfactant, a charge-dissipative polymer, a charge-dissipative protein, a nucleic acid, and combinations thereof.

According to various embodiments, the charge-dissipative polymer may be, but is not limited to, a poly(ethylene), a poly(ethylene oxide), a poly(isoprene), a poly(butadiene), a poly(vinyl methyl ether), a poly(dimethyl siloxane), a poly(ethylene glycol), a poly(propylene), a poly(propyleneglycol), a poly(caprolactone), an epoxy, and combinations thereof. According to various embodiments, the epoxy may be EPON® 828.

According to various embodiments, the charge-dissipative curing agent or photoinitiator may be, but is not limited to, isopropylthioxanthone, benzoyl peroxide, a polyamide, and combinations thereof. According to various embodiments, the polyamide may be VERSAMID®.

According to various embodiments, the charge-dissipative organic compound may be, but is not limited to, terpineol, cinnamaldehyde, citric acid, 1-(2,5-dimethyl-4-(2,5-dimethylphenyl) phenyldiazenyl) azonapthalen-2-ol, sodium bicarbonate, sodium chloride, potassium hydroxide, phenyl-C61-butyric acid methyl ester, a polymerizable monomer, and combinations thereof. According to various embodiments, the polymerizable monomer may be methyl methacrylate, styrene, butadiene, an alkane, a cycloalkane, and combinations thereof.

According to various embodiments, the charge-dissipative ionic compound may be, but is not limited to, citric acid, 1-(2,5-dimethyl-4-(2,5-dimethylphenyl) phenyldiazenyl) azonapthalen-2-ol, silver nitrate, calcium nitrate, calcium carbonate, sodium carbonate, gold hexachloroaurate, iron nitride, sodium chloride, potassium hydroxide, sodium bicarbonate, triphenylsulfonium salts, a metal organic framework, and combinations thereof.

According to various embodiments, the charge-dissipative chalcogenide glass may be, but is not limited to, GeSbTe, AgInSbTe, InSe, SbSe, SbTe, InSbSe, InSbTe, GeSbSe, GeSbTeSe, AgInSbSeTe, and combinations thereof.

According to various embodiments, the charge-dissipative oil may be, but is not limited to a vegetable oil, a silicone oil, an epoxidized soybean oil, a hexadecane, a butyl glycidal ether, and combinations thereof.

According to various embodiments, the charge-dissipative saccharide may be, but is not limited to, trehalose, sucrose, dextrose, fructose, glucose, and combinations thereof.

According to various embodiments, the charge-dissipative surfactant may be, but is not limited to lauryl mono-ethanol, abietic acid, and combinations thereof. According to various embodiments, the charge-dissipative surfactant may be lauryl mono-ethanol, abietic acid, TWEEN®, TRITON®, a block copolymer, PLURONIC®, and combinations thereof.

According to various embodiments, the charge-dissipative polymer may be, but is not limited to, a poly(3,4-ethylenedioxythiophene), a poly(pyrrole), a poly(acetylene), a poly(ethylene oxide), a poly(3-hexylthiophene), and combinations thereof.

According to various embodiments, the charge-dissipative protein may be, but is not limited to lecithin, hemoglobin, a structural protein, a signaling protein, a regulatory protein, a transport protein, a sensory protein, a motor protein, a defense protein, a storage protein, an enzyme, and combinations thereof. According to various embodiments, the structural protein may be collagen, tubulin, fibroin (silk), and combinations thereof. According to various embodiments, the signaling protein may be insulin, epidermal growth factor, and combinations thereof. According to various embodiments, the regulatory protein may be bovine serum albumin. According to various embodiments, the defense protein may be fibrin. According to various embodiments, the storage protein may be gluten. According to various embodiments, the enzyme may be oxidoreductase, transferase, hydrolase, lyase, isomerase, ligase, and combinations thereof.

According to various embodiments, the nucleic acid may be, but is not limited to, DNA, RNA, and combinations thereof.

Self-Limiting Electrospray Compositions Comprising Combinations of Components that are not Self-Limiting Individually Various embodiments relate to a self-limiting electrospray composition that may include a plurality of charge-dissipative components and that may exclude any non-charge-dissipative component. According to such embodiments, each of the plurality of charge-dissipative components may be incapable of forming a layer of self-limiting thickness when electrosprayed without at least one other member of the plurality of charge-dissipative components, and/or the non-charge-dissipative component, and combinations thereof. As with all self-limiting electrospray compositions described herein, compositions according to these embodiments may further include optionally one or more solvents, and/or optionally a plurality of filler particles.

According to various embodiments, each of the plurality of charge-dissipative components may be, but is not limited to, a charge-dissipative liquid, a charge-dissipative crystalline material, a charge-dissipative protein, a nucleic acid, a lyotropic material, and combinations thereof. Any combination of such charge-dissipative components may be employed. For example, according to various embodiments a combination of a charge-dissipative liquid and a charge-dissipative crystalline material may be employed; a combination of a charge-dissipative liquid and a charge-dissipative protein may be employed; a combination of a charge-dissipative liquid and a nucleic acid may be employed; a combination of a charge-dissipative crystalline material and a charge-dissipative protein may be employed; a combination of a charge-dissipative crystalline material and a nucleic acid may be employed; or a combination of a charge-dissipative liquid and a lyotropic forming phase may be employed. The combinations are not limited to those specifically exemplified.

According to various embodiments, the charge-dissipative liquid may be, but is not limited to, water, sulfuric acid, terpineol, a poly(ethylene), a poly(ethylene oxide), a poly(isoprene), a poly(butadiene), a poly(vinyl methyl ether), a poly(dimethyl siloxane), a poly(ethylene glycol), a poly(propylene), a poly(propyleneglycol), a poly(caprolactone), an epoxy, a surfactant, and combinations thereof. According to various embodiments, the epoxy may be EPON® 828. According to various embodiments, the surfactant may be lauryl mono-ethanol, abietic acid, TWEEN®, TRITON®, and combinations thereof.

According to various embodiments, the charge-dissipative crystalline material may be, but is not limited to, citric acid, 1-(2,5-dimethyl-4-(2,5-dimethylphenyl) phenyldiazenyl) azonapthalen-2-ol, silver nitrate, calcium nitrate, calcium carbonate, sodium carbonate, gold hexachloroaurate, iron nitride, sodium chloride, potassium hydroxide, sodium bicarbonate, triphenylsulfonium salts, a metal organic framework, trehalose, sucrose, dextrose, fructose, glucose, and combinations thereof.

According to various embodiments, the charge-dissipative protein may be, but is not limited to, bovine serum albumin, lectin, hemoglobin, structural protein, signaling protein, a regulatory protein, a transport protein, a sensory protein, a motor protein, a defense protein, a storage protein, an enzyme, and combinations thereof. According to various embodiments, the structural protein may be collagen, tubulin, fibroin (silk), and combinations thereof. According to various embodiments, the signaling protein may be insulin, an epidermal growth factor, and combinations thereof. According to various embodiments, the regulatory protein may be bovine serum albumin. According to various embodiments, the defense protein may be fibrin. According to various embodiments, the storage protein may be gluten. According to various embodiments, the enzyme may be oxidoreductase, transferase, hydrolase, lyase, isomerase, ligase, and combinations thereof.

According to various embodiments, the nucleic acid may be, but is not limited to, DNA, RNA, and combinations thereof.

According to various embodiments, the lyotropic material may be, but is not limited to phytantriol, DNA, a block copolymer, a synthetic aramid, and combinations thereof. According to various embodiments, the block copolymer may be PLURONIC®. According to various embodiments, the synthetic aramid may be KEVLAR®. A material is called "lyotropic" if it forms liquid crystal phases upon the addition of a solvent.

Regarding Charge-Dissipative Components and Non-Charge-Dissipative Components

In certain conditions, items classified as charge-dissipative components or non-charge-dissipative components may be interchangeable. Some non-charge dissipating materials may be made charge-dissipating and vice-versa. For example, this interchangeability may be achieved thermally, chemically, or compositionally. The interchangeability may be achieved thermally, for example, by raising or lowering the temperature and crossing the glass transition temperature. The interchangeability may be achieved chemically, for example, through polymerization or depolymerization. The interchangeability may be achieved in the spray process compositionally, for example, through phase separation or mixing as induced by an evaporation or an external stimulus.

A person having ordinary skill in the art will be well apprised of the properties exhibited by various components under different conditions and will be readily equipped to determine whether the component will be charge-dissipative or non-charge-dissipative at those conditions.

Self-Limiting Electrospray Compositions May Include One or More Solvents

According to various embodiments, any self-limiting electrospray composition described herein may further include a solvent. The solvent may be present in an amount within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 5, 10, 15, 20, 25, 30, 35, 40, 45, 50, 55, 60, 65, 70, 75, 80, 85, 90, 95, and 100 percent by weight based on the total weight of the self-limiting electrospray composition. For example, according to certain embodiments, the solvent may be present in an amount of from about 0.0001 to about 100 percent by weight based on the total weight of the self-limiting electrospray composition, or any combination of lower limits and upper limits described. According to various embodiments, the solvent may be, but is not limited to, water, alcohol, ethanol, isopropanol, 2-butanone, acetone, ethyl acetate, an alkane, a cycloalkane, an ether, benzene, xylene, toluene, dimethylformamide, dimethyl sulfoxide, chloroform, chlorobenzene, dichlorobenzene, dichloroethane, trichlorobenzene, a chlorofluorocarbon, an ionic liquid, a fluorinated oil, N,N-dimethylformamide, tetrahydrofuran, methylene chloride, pyridine, cyclohexyl chloride, anisole, benzaldehyde, and combinations thereof. According to various embodiments, the ionic liquid may be, but is not limited to, dicyanamide, 1-alkyl-3-methylimidazolium, and combinations thereof. According to various embodiments, the fluorinated oil, may be a NOVEC® fluorinated fluid.

Self-Limiting Electrospray Compositions May Include Filler Particles

According to various embodiments, any self-limiting electrospray composition described herein may further include a plurality of filler particles. The plurality of filler particles may be conductive. The plurality of filler particles may be present in an amount within a range having a lower limit and/or an upper limit. The range may include or exclude the lower limit and/or the upper limit. The lower limit and/or upper limit may be selected from about 0, 10, 20, 30, 40, 50, 55, 60, 65, 70, 75, 80, 85, and 90 percent by volume based on the total volume of the self-limiting electrospray composition. For example, according to certain embodiments, the plurality of filler particles may be present in an amount of from about 50 to about 90 percent by volume based on the total volume of the self-limiting electrospray composition, or any combination of lower limits and upper limits described.

According to various embodiments, the plurality of filler particles may be, but are not limited to, an inorganic compound, a carbon allotrope, a ceramic, a bacteria, a virus, a pollen, a cell, a protein, a polymer particle, a crystalline powder, a metal, and combinations thereof. In embodiments of the electrospray composition that include a solvent, the plurality of filler particles may also be any material that is insoluble in the selected solvent and thus may be included as a micronized powder.

According to various embodiments, the inorganic compound may be, but is not limited to, a MXene, zinc oxide, cadmium selenide, boron nitride, molybdenum disulfide, silver disulfide, titanium dioxide, hydroxyapitate, alumina, barium titanate, iron oxide, magnesium oxide, zinc oxide, silicon dioxide, a silica compound, a silica xerogel, a silicate, and combinations thereof. According to various embodiments, the MXene may be titanium silicide. According to various embodiments, the silica compound may be a fumed silica, an epoxidized silica, silica aerogel, and combinations thereof. According to various embodiments, the silicate may be Bitotite, Antigorite, Kaolinite, Chlorite, and combinations thereof.

According to various embodiments, the carbon allotrope may be, but is not limited to, graphite, graphene, carbon nanotubes, activated carbon, carbon foam, and combinations thereof.

According to various embodiments, the cell may be, but is not limited to, a human cell, an animal cell, a plant cell, and combinations thereof.

According to various embodiments, the protein may be, but is not limited to, a protein powder, an antibody, an enzyme, a hormone, and combinations thereof. According to various embodiments, the protein powder may be cytochrome C, hemoglobin, ubiquitin, actin, and combinations thereof. According to various embodiments, the hormone may be insulin, prolactin, oxytocin, growth hormone, cortisol, an auxin, and combinations thereof.

According to various embodiments, the polymer particle may be, but is not limited to, a polymer powder, polyethylene beads, polystyrene beads, a rubber, and combinations thereof. According to various embodiments, the rubber may be silicone rubber, butadiene rubber, polyurethane rubber, nitrile rubber, and combinations thereof.

According to various embodiments, the crystalline powder may be, but is not limited to, sugar crystals, salt crystals, metal organic framework crystals, and combinations thereof.

According to various embodiments, the metal may be, but is not limited to aluminum, copper, gold, silver, iron, and combinations thereof. According to various embodiments, the metal may be aluminum pigment particles, copper pigment particles, gold nanoparticles, and combinations thereof.

According to various embodiments, each of the plurality of filler particles may have at least one dimension, for example, a length, a width, a height, and/or a diameter, within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, and 150 micrometers. For example, according to certain embodiments, each of the plurality of filler particles may have at least one dimension, for example, a length, a width, a height, and/or a diameter, less than about 100 micrometers, less than about 10 micrometers, less than about 1 micrometers, less than about 0.1 micrometers, less than about 0.01 micrometers, or less than about 0.001 micrometers, or any combination of lower limits and upper limits described. According to some embodiments, the at least one dimension of each filler particle may be approximately the same. According to other embodiments, the at least one dimension of each filler particle may be the same or different relative to the at least one dimension of any other filler particle. The at least one dimension of each filler particle described herein may describe the at least one dimension of any given filler particle or may describe an average for all of the at least one dimensions of the filler particle.

Methods of Self-Limited Electrospray Deposition (SLED)

FIG. 1A is a flow chart that illustrates an example of a method 110 for forming a layer of self-limiting thickness according to various embodiments. Any self-limiting electrospray composition described herein may be employed in method 110. At optional step 115, the method 110 may include optionally rendering the target material conductive. Rendering the target conductive may include, but is not limited to, exposing the target to a conductive liquid, exposing the target to a conduction-inducing environment, and combinations thereof. According to other embodiments, the target may already be a conductive target. At step 111, the method 110 may include exposing target to a spray in the presence of an electric field, the spray including a self-limiting electrospray composition according to any embodiment described herein, and optionally a plurality of conductive filler particles. At step 112, the method 110 may include allowing the spray to accumulate on a surface of the target to form a layer of self-limiting thickness sufficient to allow the layer to hinder further accumulation of the spray on the target. The surface of the target may be the entire outer surface of the target or may be only a portion of the outer surface of the target, such as might be established from masking the material with tape or a stencil. The transition from the coated region to the non-coated region may be smooth, such that variations of film thickness greater than 75% are required. At step 113, the method 110 may optionally include thermally densifying the layer of self-limiting thickness to remove air voids. At step 114, the method 110 may optionally include at least partially removing at least a portion of the layer to form a continuous network of the conductive filler particles. Any of the compositions according to the various embodiments may be employed and may be non-volatile at the electrospraying conditions of method 110.

The self-limiting thickness required to repulse the incident spray may vary based on the materials employed. The thickness may generally be within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1000, 2000, 3000, 4000, 5000 micrometers. For example, according to certain embodiments, the thickness may be in a range of less than about 1 mm, less than about 100 micrometers, less than about 10 micrometers, less than about 1 micrometers, or less than about 0.1 micrometers, or any combination of lower limits and upper limits described.

Methods of Determining the Conductivity of a Material

Figure 1B:
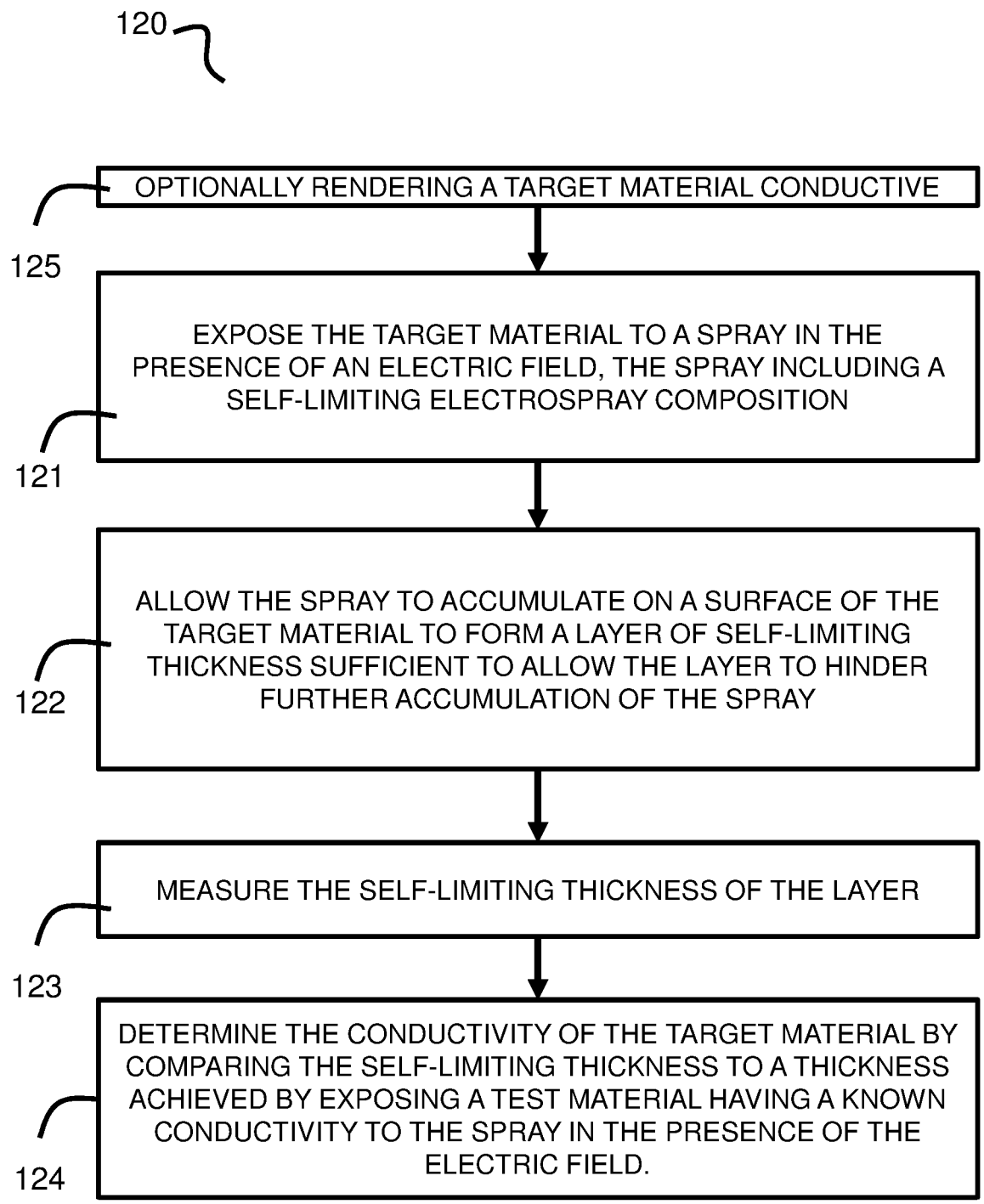
FIG. 1B is a flow chart that illustrates an example of a method for determining the conductivity of a material according to various embodiments.

FIG. 1B is a flow chart that illustrates an example of a method 120 for determining the conductivity of a material according to various embodiments. Any self-limiting electrospray composition described herein may be employed in method 120. At optional step 125, the method 120 may include optionally rendering the target material conductive. Rendering the target conductive may include, but is not limited to, exposing the target to a conductive liquid, exposing the target to a conduction-inducing environment, and combinations thereof. According to other embodiments, the target may already be a conductive target. At step 121, the method 120 may include exposing a material, for example a material having an unknown conductivity, to a spray in the presence of an electric field, the spray including a self-limiting electrospray composition according to any embodiment described herein. At step 122, the method 120 may include allowing the spray to accumulate on a surface of the material to form a layer of self-limiting thickness sufficient to allow the layer to hinder further accumulation of the spray on the material. At step 123, the method 120 may include measuring the self-limiting thickness of the layer. This may include waiting for the spray to stop accumulating on the surface of the material and then measuring the thickness of the resultant layer. At step 124, the method 120 may include determining the conductivity of the material by comparing the self-limiting thickness to a thickness achieved by exposing a test material having a known conductivity to the spray in the presence of the electric field.

Self-Limiting Electrospray Compositions Comprising Thermo-Responsive Polymer Solutions FIG. 1C is a flow chart that illustrates an example of self-limiting electrospray deposition (SLED) method 130 according to various embodiments. The method 130 is an example of a specific self-limiting electrospray composition comprising a thermo-responsive polymer solution. All variations applicable to other self-limiting electrospray compositions apply to the thermo-responsive polymer solution described herein and vice-versa.

Referring to FIG. 1C, various embodiments relate to a method of thickness-limited, electrospray deposition 130. At optional step 136, the method 130 may include optionally rendering the target material conductive. Rendering the target conductive may include, but is not limited to, exposing the target to a conductive liquid, exposing the target to a conduction-inducing environment, and combinations thereof. According to other embodiments, the target may already be a conductive target. At step 131, the method 130 may include exposing the target to an incident spray comprising a thermo-responsive polymer solution, in the presence of an electric field. At step 132, the method 130 may include allowing a temperature of the thermo-responsive polymer solution to deviate toward a surface temperature of the target to a deposited temperature at which the non-conductive polymer is immobile. At step 133, the method 130 may include allowing the non-conductive polymer to accumulate on the target to form a layer, having a thickness or a charge sufficient to repulse the incident spray. At step 134, the method 130 may optionally include thermally densifying the layer to remove air voids. At step 135, the method 130 may optionally include at least partially removing the non-conductive polymer to form a continuous network of the conductive filler particles.

The thermo-responsive polymer solution may include a polymeric component. The polymeric component may be a polymer, co-polymer, or a blend or a mixture thereof. The polymer may be a non-conductive polymer. Any non-conductive polymer may be employed. According to certain embodiments, the non-conductive polymer may be poly(ethylene), poly(styrene), poly(silsesquioxane), poly(methyl methacrylate), poly(vinyl pyrrolidone), poly(N-isopropylacrylamide), poly(N,N-diethylacrylamide), poly(N-vinylcaprolactam), poly(ethylene oxide), poly(vinyl alcohol), poly(tetrafluoroethylene), poly(acrylic acid), dextran, poly(propylene oxide), poly(pentapeptide) of elastin, poly(dimethylamino ethyl methacrylate), poly(N-(L)-(1-hydroxymethyl) propylmethacrylamide), poly(oxazoline) s, poly(propylene), methylcellulose, silk, polysaccharides, gelatin, or agarose. Potential blends or copolymer components not listed above may be liquid polymers. According to certain embodiments, liquid polymers may be DNA, poly(ethylene glycol), poly(isoprene), poly(butadiene), poly(vinyl methyl ether), poly(dimethyl siloxane, or epoxies.

The polymeric component may be present in an amount within a range having a lower limit and/or an upper limit. The range may include or exclude the lower limit and/or the upper limit. The lower limit and/or upper limit may be selected from about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, and 15 percent by weight based on the total weight of the thermo-responsive polymer solution. For example, according to certain embodiments, the polymeric component may be present in an amount of from about 0.1 to about 10 percent by weight based on the total weight of the thermo-responsive polymer solution, or any combination of lower limits and upper limits described.

According to various embodiments, the solvent component must generally be compatible with the polymeric component and the electrospray process. The solvent component may be a pure solvent, or a blend, or solvents with molecular additives, such as dyes, salts, surfactants, or pharmaceutical compounds. According to certain embodiments, the solvent may be water, alcohols, 2-butanone, acetone, ethyl acetate, alkanes, cycloalkanes, ethers, xylene, toluene, dimethylformamide, dimethyl sulfoxide, chloroform, chlorobenzene, dichlorobenzene, dichloroethane, trichlorobenzene, chlorofluorocarbons, or fluorinated oils. The solution may include the solvent in an amount within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 5, 10, 15, 20, 25, 30, 35, 40, 45, 50, 55, 60, 65, 70, 75, 80, 85, 90, 95, and 100 percent by weight. For example, according to certain embodiments, the solution may include the solvent in an amount of from about 0.0001 to about 80 percent by weight, or any combination of lower limits and upper limits described.

The thermo-responsive polymer solution may also optionally include a plurality of filler particles as described according to various other self-limiting electrospray compositions.

The thermo-responsive polymer solution may have a solution temperature within a range having a lower limit and/or an upper limit. The range may include or exclude the lower limit and/or the upper limit. The lower limit and/or upper limit may be selected from about 0, 5, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, and 1000 degrees Celsius. For example, according to certain embodiments, the thermo-responsive polymer solution may have a solution temperature in a range of from −200 to 1000 degrees Celsius, or in a range of from −50 to 200 degrees Celsius, or in a range of from 0 to 100 degrees Celsius, or any combination of lower limits and upper limits described.

The target may have a surface temperature within a range having a lower limit and/or an upper limit. The range may include or exclude the lower limit and/or the upper limit. The lower limit and/or upper limit may be selected from about 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, and 200 degrees Celsius. For example, according to certain embodiments, the target may have a surface temperature in a range of from about 0 to about 100 degrees Celsius, or any combination of lower limits and upper limits described.

Still referring to FIG. 1C, the method 130 may further include a step 132 of allowing the solution temperature to deviate toward the surface temperature to a deposited temperature at which the non-conductive polymer is immobile. The deviation from the solution temperature toward the surface temperature may include heating or cooling of the thermo-responsive polymer solution. The thermo-responsive solution may be heated or cooled due to environmental conditions within an electrospraying apparatus and/or due to contact with the target and/or due to contact with material, such as due to the non-conductive polymer accumulating on the target.

Still referring to FIG. 1C, the method 130 may further include a step 133 of allowing the non-conductive polymer to accumulate on the target to form a layer, having a thickness or a charge sufficient to repulse the incident spray. The thickness required to repulse the incident spray may vary based on the materials employed. The thickness may generally be within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1000, 2000, 3000, 4000, 5000 micrometers. For example, according to certain embodiments, the thickness may generally be in a range of less than about 1 mm, less than about 100 micrometers, less than about 10 micrometers, less than about 1 micrometers, or less than about 0.1 micrometers, or any combination of lower limits and upper limits described.

According to various embodiments, the layer may have a spherical shell surface morphology. The spherical shell surface morphology may include a plurality of spheroidal particles comprising the non-conductive polymer. Each of the plurality of spheroidal particles may have at least one dimension within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, and 500 micrometers. For example, according to certain embodiments, each of the plurality of spheroidal particles may have at least one dimension less than about 100 micrometers, less than about 10 micrometers, less than about 1 micrometers, less than about 0.1 micrometers, less than about 0.01 micrometers, or less than about 0.001 micrometers, or any combination of lower limits and upper limits described. The at least one dimension may be a length, a width, a height, and/or a diameter. According to some embodiments, the at least one dimension of each particle may be approximately the same. According to other embodiments, the at least one dimension of each particle may be the same or different than the at least one dimension for any other particle. The at least one dimension described herein may describe a dimension of any given particle or may describe an average for all of the particles.

According to various embodiments, the plurality of spheroidal particles may also possess a shell thicknesses. The shell thickness may be a thickness of a wall defining all or a portion of the spheroidal shape of each particle. According to some embodiments, each particle may have approximately the same thickness. According to other embodiments, each particle may have a thickness the same or different than any other shell. The shell thicknesses described herein may describe any given particle or may describe an average thickness for all of the particles. The shell thickness may be within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 2, 3, 4, 5, 6, 7, 8, 9, 10, 15, 20, 25, 30, 35, 40, 45, and 50 micrometers. For example, according to certain embodiments, the shell thickness may be less than about 10 micrometers, less than about 1 micrometers, less than about 0.1 micrometers, less than about 0.01 micrometers, or less than about 0.001 micrometers, or any combination of lower limits and upper limits described.

According to various embodiments, the step 132 of allowing the solution temperature to deviate toward the surface temperature to the deposited temperature at which the non-conductive polymer is immobile may prompt a spinodal decomposition of the thermo-responsive polymer solution. To achieve spinodal decomposition, the deposited temperature may be greater than a lower critical solution temperature (LCST) of the thermo-responsive polymer solution. Alternatively, or in addition, the deposited temperature may be less than an upper critical solution temperature (UCST) of the thermo-responsive polymer solution. Prior to the present invention, LCST materials were not processable by existing methods. There was no way to deliver microscale coatings of engineered materials onto 3D objects in ambient conditions, preventing the integration of nanotechnology into a host of commercial applications. According to various embodiments, particularly embodiments wherein the thermo-responsive polymer solution is a lower critical solution temperature (LCST) solution, the thermo-responsive polymer solution may further include water. The thermo-responsive polymer solution may include water in an amount within a range having a lower limit and/or an upper limit. The range may include or exclude the lower limit and/or the upper limit. The lower limit and/or upper limit may be selected from about 0, 0.001, 0.005, 0.01, 0.05, 0.1, 0.5, 1, 5, 10, 15, 20, 25, 30, 35, 40, 45, 50, 55, 60, 65, 70, 75, and 80 percent by weight. For example, according to certain embodiments, the thermo-responsive polymer solution may include water in an amount of from about 0 to about 80 percent by weight, or any combination of lower limits and upper limits described.

The spinodal decomposition of the thermo-responsive polymer solution may result in the layer having a nanowire surface morphology. The nanowire surface morphology may include a plurality of elongated strands, each comprising the non-conductive polymer. Each of the plurality of elongated strands may have at least one dimension, for example, a length, a width, a height, and/or a diameter within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, and 500 micrometers. For example, according to certain embodiments, each of the plurality of elongated strands has at least one dimension less than about 100 micrometers, less than about 10 micrometers, less than about 1 micrometers, less than about 0.1 micrometers, less than about 0.01 micrometers, or less than about 0.001 micrometers, or any combination of lower limits and upper limits described. According to some embodiments, each strand may have approximately the same dimensions. According to other embodiments, each strand may have the same or different dimensions than any other strand. The strand dimensions described herein may describe any given strand or may describe an average for all of the strands.

According to various embodiments, the thermo-responsive polymer solution further may include a plurality of filler particles. The filler particles may be conductive filler particles or non-conductive filler particles. Referring again to FIG. 1C, the method 130 may further include, after thickness-limited deposition, a step 134 of thermally densifying the layer to remove air voids. The method 130 may further include an optional step 135 of at least partially removing the non-conductive polymer to form a continuous network of the conductive filler particles. The layer may have a particle volume content within a range having a lower limit and/or an upper limit. The range may include or exclude the lower limit and/or the upper limit. The lower limit and/or upper limit may be selected from about 40, 45, 50, 55, 60, 65, 70, 75, 80, 85, 90, and 95 percent. For example, according to certain embodiments, the layer may have a particle volume content of from about 50 to about 90 percent, of from about 60 to about 80 percent, or about 70 percent, or any combination of lower limits and upper limits described.

Various embodiments relate to a three-dimensional structure conformally-coated with a thin film, the thin film comprising a non-conductive polymer and a plurality of conductive filler particles. The three-dimensional structure, conformally-coated with a thin film, may be made by a process as described in other embodiments. The non-conductive polymer may have the composition and structure as described in any of the other embodiments. By way of non-limiting example, the non-conductive polymer may be in the form of a plurality of elongated strands, wherein each of the plurality of elongated strands may have at least one dimension as described according to other embodiments, for example, a length, a width, a height, and/or a diameter, less than about 100 micrometers, less than about 10 micrometers, less than about 1 micrometers, less than about 0.1 micrometers, less than about 0.01 micrometers, or less than about 0.001 micrometers. As another, non-limiting example, the non-conductive polymer may be in the form of a plurality of spheroidal particles comprising the non-conductive polymer, wherein each of the plurality of spheroidal particles may have at least one dimension as described in other embodiments, for example, a length, a width, a height, and/or a diameter, less than about 100 micrometers, less than about 10 micrometers, less than about 1 micrometers, less than about 0.1 micrometers, less than about 0.01 micrometers, or less than about 0.001 micrometers. The non-conductive polymer may be at least partially thermally densified, as described in any of the other embodiments. The plurality of conductive filler particles may form a continuous, conductive network while retaining the controlled thickness imparted by the deposition process.

Various embodiments provide the ability to deposit minimal coatings comprised of multifunctional materials. SLED may potentially be employed with a wide variety of functional coatings including chemical, electrical, or thermal barrier coatings, electrically or thermally conductive coatings, piezoelectric coatings, and reactive, energetic, or antimicrobial coatings. The deposited coating, coatings, layer, or layers may each or collectively have thicknesses as described according to any of the other embodiments. Compared to millimeter-scale coatings currently employed, microscale coatings represent a materials reduction of 2 to 3 orders of magnitude. Such a reduction reduces both mass and cost. Further, multiple of these functionalities may be included in the same composite coating, potentially reducing the need for layered applications.

The ability to deposit these coatings without the need for vacuum or fluid bath gives SLED a huge cost advantage over other conformal methods. Simultaneously, the conformal nature of SLED, as compared to other spray techniques, reduces the complexity of the application process, because neither the target nor the sprayer needs to be moved to coat complex or even reentrant surfaces. In this way, components such as gantries or robotic arms may be removed and replaced with assembly line spraying equipment.

Methods for Repairing Flaws in Coatings or Layers

Figure 1D:
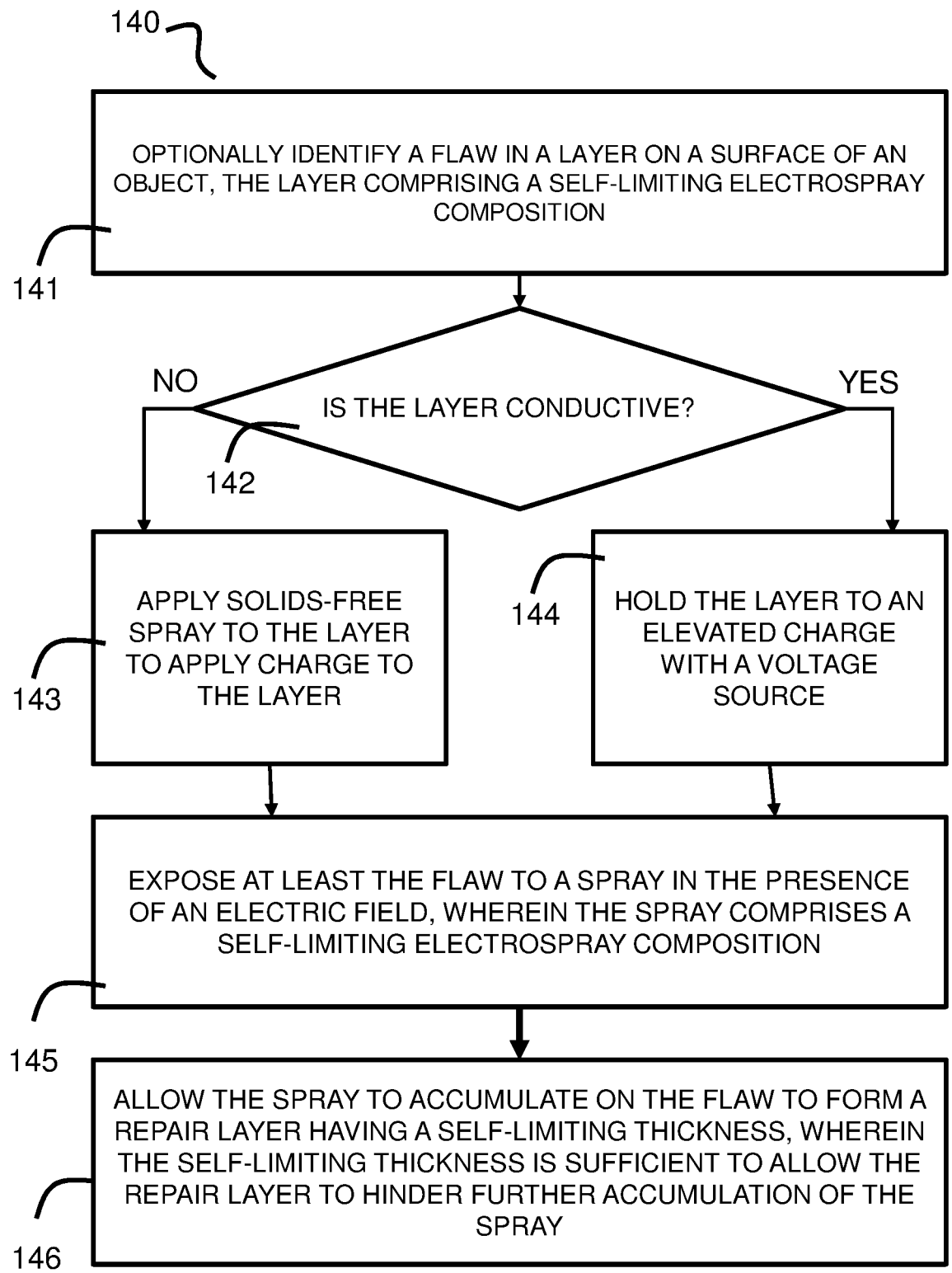
FIG. 1D is a flow chart that illustrates an example of repairing a flaw in a layer on a surface of an object according to various embodiments.

FIG. 1D is a flow chart that illustrates an example of a method 140 for repairing a flaw in a layer on a surface of an object according to various embodiments. The layer may include or be derived from a self-limiting electrospray composition according to any embodiment described herein. At step 141, the method 140 may optionally include identifying a flaw, such as, for example, a scratch, crack, dent, or abrasion, in a layer on a surface of an object. Step 141 may be optional, because according to various embodiments it is useful to execute the method 140 without first bothering to identify a flaw, for example, as a way to expedite routine maintenance procedures. A benefit of the method 140, according to various embodiments, is that the electrospray may preferentially coat any flaws in the layer. The layer may be a layer formed according to any of the methods described herein, such as for example a layer comprising a self-limiting electrospray composition according to any embodiment described herein, and/or a plurality of conductive fillers. Generally, at step 142, 143, and 144, the method 140 may include applying a charge to the layer. Depending on whether the layer is conductive or has a conductive top surface, different steps may be utilized to apply the charge to the layer. Therefore, at step 142, the method 140 may include determining whether the layer or at least a top surface of the layer is conductive. For cases in which the layer or the top surface of the layer is not conductive, at step 143, the method 140 may include applying solids-free spray to the surface to apply charge to the layer. For cases in which the layer is conductive, at step 144, the method 140 may include holding the layer to an elevated charge with a voltage source, which may include contacting the layer with the voltage source or contacting the object underlying the layer with the voltage source. If only the topmost surface of the layer is conductive, then it should be contacted with the voltage source directly, because insulative portions of the layer may restrict application of the charge. At step 145, the method 140 may include exposing the layer or at least the flaw in the layer to an incident spray comprising a self-limiting electrospray composition according to any embodiment described herein and optionally a plurality of conductive filler particles. Finally, at step 146, the method 140 may include allowing the spray to accumulate on the flaw to form a repair layer having a self-limiting thickness, wherein the self-limiting thickness is sufficient to allow the layer to hinder further accumulation of the spray on the repair layer.

Various embodiments also allow for targeted repair of these coatings down to microscale flaws without reapplication of the coating or addition of material to undamaged areas. For example, in embodiments where the final coating surface is non-conductive, charge may be applied to the top surface by a solids-free spray, and then a thickness-limited spray of the same or similar charge may be used to target exposed regions. According to various embodiments, the solids-free spray may comprise any suitable solvent, for example, ethanol. The thickness-limited spray of the same or similar charge may be a spray according to any of the embodiments described herein, for example, a spray comprising a thermo-responsive polymer solution, or a spray comprising a charge-dissipative component and/or a non-charge-dissipative component.

Other embodiments allow for targeted repair of final SLED coatings, wherein the surface of the coating is conductive, but there exists a non-conductive layer between it and the target surface. A conductive surface insulated from the target by a non-conductive layer may arise, for example, when the thermo-responsive polymer includes conductive filler particles. Such embodiments may include a step, such as step 135 in FIG. 1, of removing at least a portion of non-conductive polymer to form a continuous network of the conductive filler particles on the surface. According to such embodiments, a repair may be performed by holding the top surface, for example the continuous network of conductive filler particles, by a voltage source to an elevated charge such that once again, sprays of the same charge will target exposed regions. This represents a large opportunity for reduction of both materials use and regeneration of coatings without replacement. Indeed, by eliminating the need to know the location of damage, repair may be conducted via routine reapplication by human personnel or even drones for hard-to-access areas.

Self-Limited Electrospraying Techniques

Figure 2A:
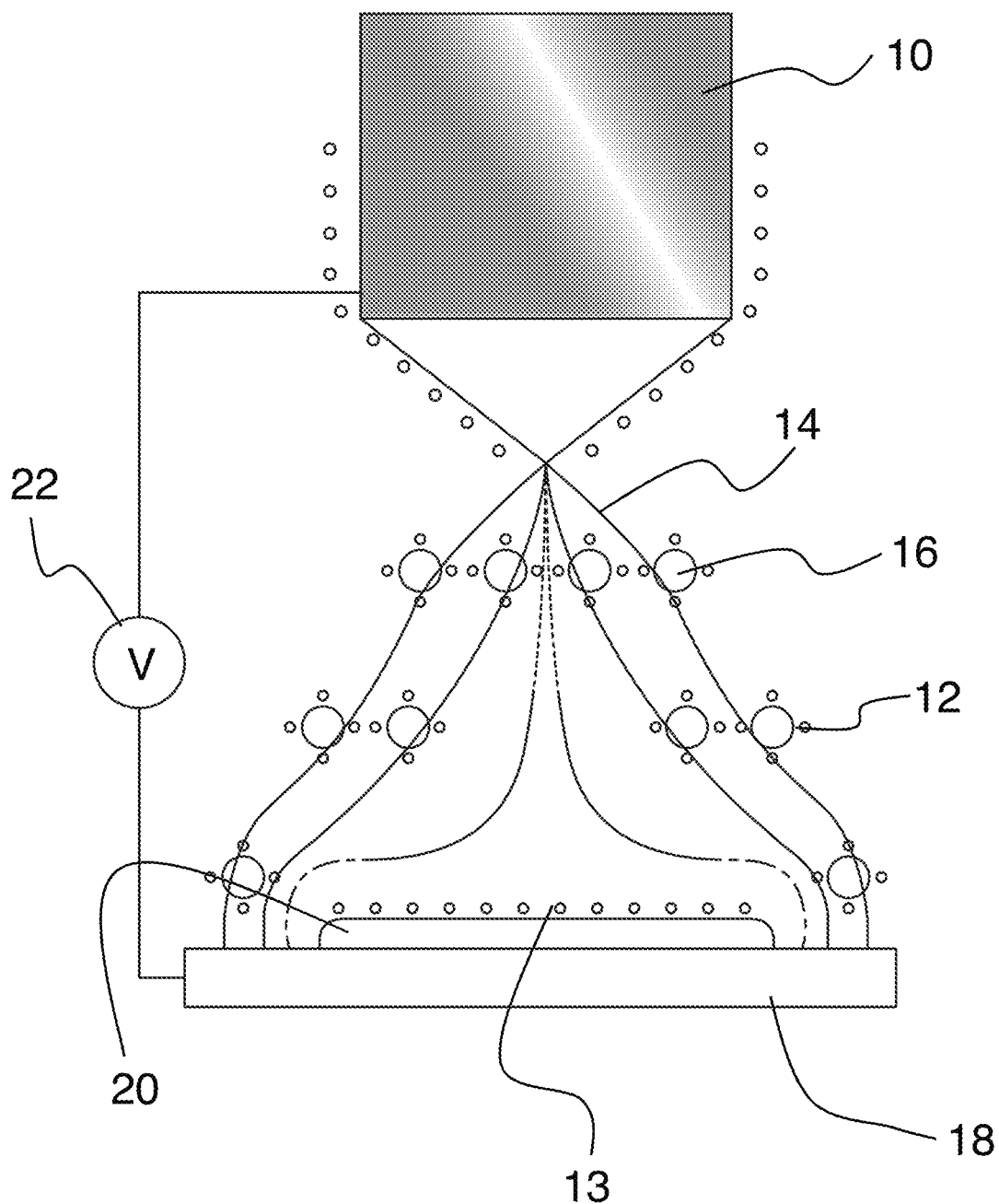
FIG. 2A is a schematic that illustrates an example of self-limiting electrospray deposition (SLED) according to various embodiments.

To access the thickness-limited regime, components of the self-limiting electrospray composition, such as, polymer-loaded droplets, in which the polymer is insulating in nature, may arrive in an immobile state or rapidly become immobile at the surface of the substrate, such as to not allow the component to flow and thus produce interfacial charge transport. These immobile component, such as polymer-rich droplets or particles, may create a loosely-connected porous film that may be densified by heat treatment as with other powder sprays. It should be noted that these droplets/particles may be slightly fused together by a solvent, diminishing the powder losses observed in SLED electrostatic spray. In this way, the newly-arriving spray may be repelled by particles that previously arrived. FIG. 2A is a schematic that illustrates an example of thickness-limited ESD according to various embodiments that may be used to electrospray a self-limiting electrospray composition according to any embodiment described herein. FIG. 2A shows a charged film or layer 20 deposited on a substrate 18 that has been exposed to an electrostatically-driven spray comprising a plurality of droplets 16 following paths 14, in an electric field created by a voltage 22 between the substrate 18 and an electrospray deposition apparatus 10. The droplets 16 have charges 12 and are repelled by like-charges 13 on the deposited layer 20 to be redirected to uncoated portions of the substrate 18. In this way, the thickness of film 20 may be self-limited, because the electrostatically-driven spray leads to a charged film 20 that redirects charged droplets 16 incident on the same substrate 18.

According to various embodiments, parameters such as temperature, flow rate, and solids loading may be utilized to influence self-limiting electrospray deposition (SLED). For example, polymer films of ~2 to ~4 µm may be obtained with a high degree of process repeatability. For example, as illustrated in FIG. 2B through FIG. 8D, PS in butanone (PS-butanone) and oligomeric sol gel-butanone solutions may be employed and adjusted via parameters such as spray time, temperature, flow rate, and solids loading.

Figure 8A:
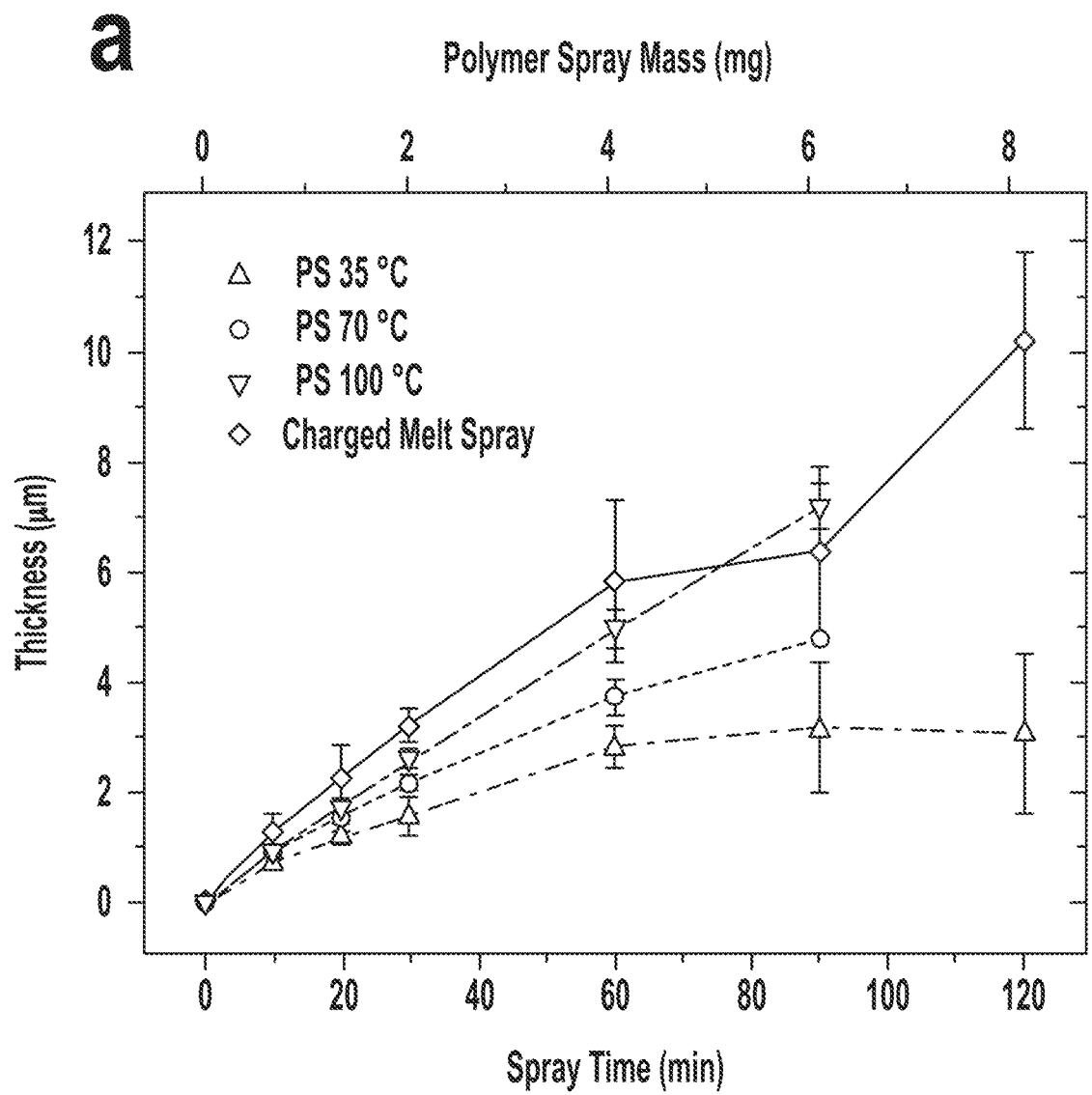
FIG. 8A is an example according to various embodiments illustrating central thickness as a function of time for PS sprayed from butanone at 35° C., 70° C., and 100° C., as compared to a charged melt spray.

FIG. 8A is a chart that illustrates an example of the central thickness of a deposited layer as a function of time for polystyrene (PS) sprayed from butanone at 35° C., 70° C., and 100° C., as compared to a charged melt spray according to various embodiments. SLED behavior is evident in the lower-temperature sprays at an onset of ~4 mg.

Figure 8B:
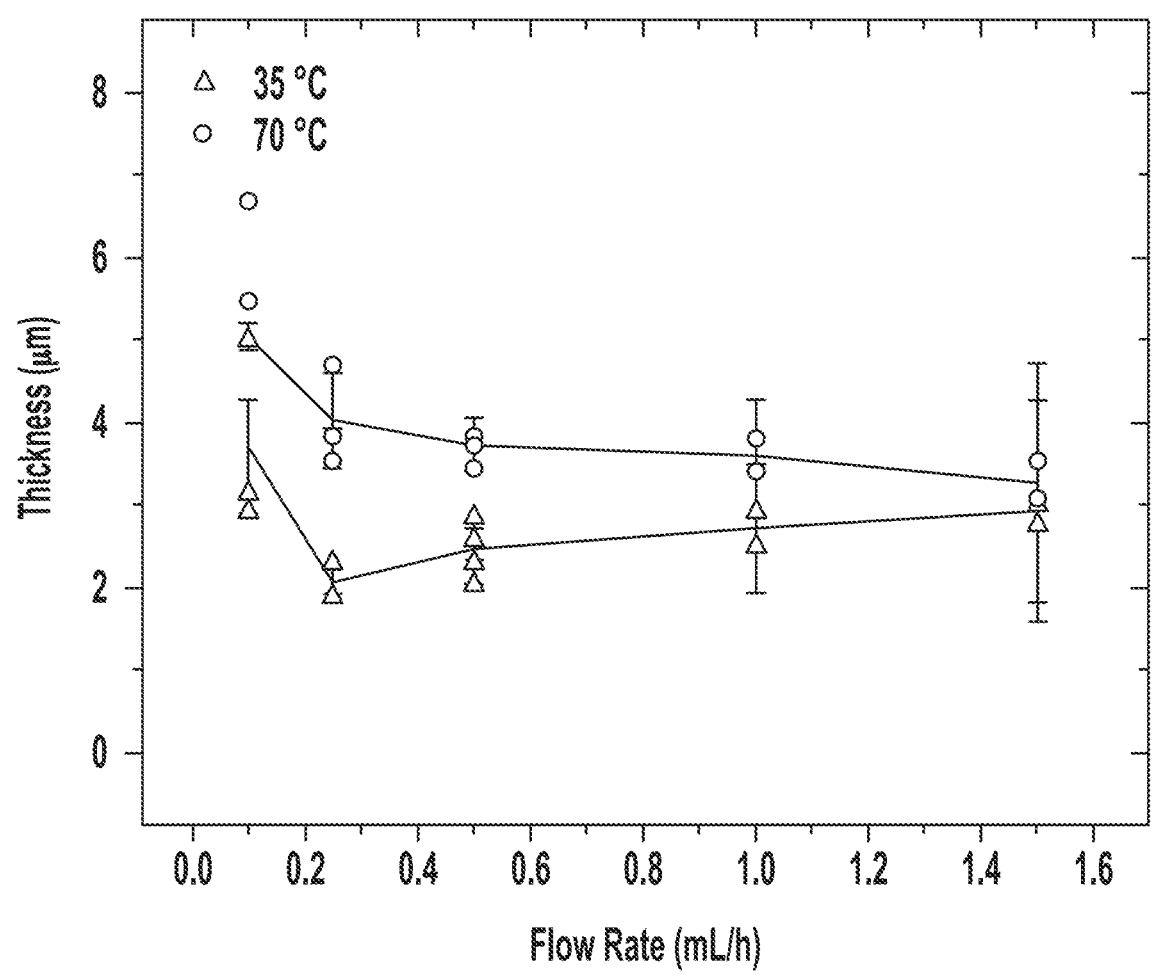
FIG. 8B is an example according to various embodiments illustrating central thickness for PS-butanone spray as a function of flow rate for 4 mg of total PS spray mass at 35° C. and 70° C.

FIG. 8B is a chart that illustrates an example of the central thickness for a PS-butanone spray as a function of flow rate for 4 mg of total PS spray mass at 35° C. and 70° C., displaying the stability of the thickness-limited effect according to various embodiments. This demonstrates that, according to certain embodiments, at a given temperature, the coating thickness changes only as, and may be controlled as a function of, the polymer mass delivered.

Some Conformal Coatings Achieved

Figure 8C:
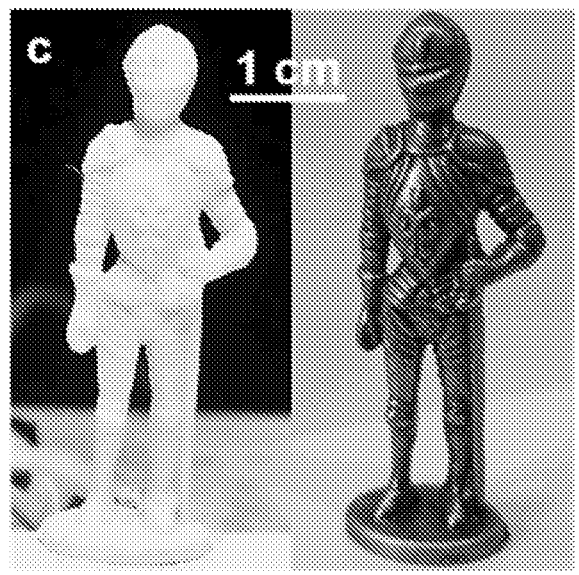
FIG. 8C is an example according to various embodiments illustrating a photograph of a pewter statue conformally coated with a PS film before (left) and after (right) thermal leveling.

FIG. 8C is a photograph that illustrates an example of a conformally-coated 3d structure, i.e., a metal statue coated with a thermally-smoothed PS film according to various embodiments. The coating contains ~10 wt % of dye for ease of observation. A critical implication of accessing the thickness-limited regime is that it allows for a much greater ability to coat 3D structures with high uniformity. FIG. 8C shows a result of a 3D statue possessing a PS coating with a narrow ~4 to 17 µm range of coating thicknesses obtained by spraying at a long distance at a moderate voltage (~8 to 10 cm and ~6 kV respectively).

Figure 8D:
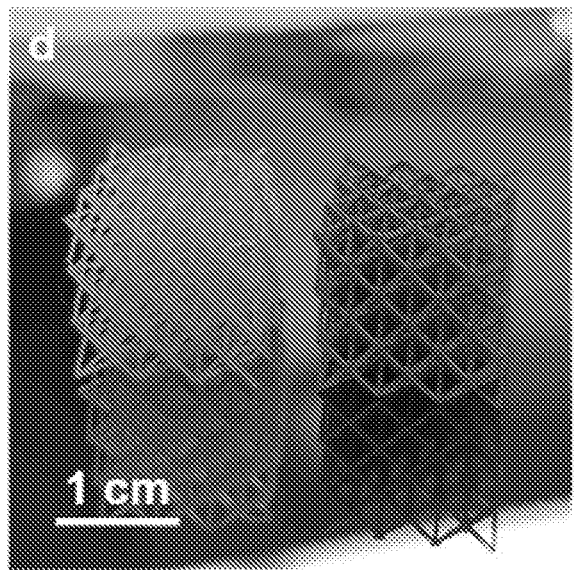
FIG. 8D is an example according to various embodiments illustrating a photograph of coatings applied to 3D objects with microscale thicknesses.

FIG. 8D is a photograph that illustrates an example of a conformally-coated 3D-printed structure coated with PS spheres according to various embodiments. The coating contains ~10 wt % of dye for ease of observation. These coatings were non-line-of-sight and made more uniform by increased distance and, therefore, were relatively insensitive to pointing error. Indeed, while coating, a spray nozzle was pointed away from the structures. This differs from electrostatic spray with a Bell-type sprayer, where the carrier gas transports the droplets together with the field. Because of this, a thickness-limited applicator would not need accurate or steady pointing, particularly at longer distances.

Figure 2B:
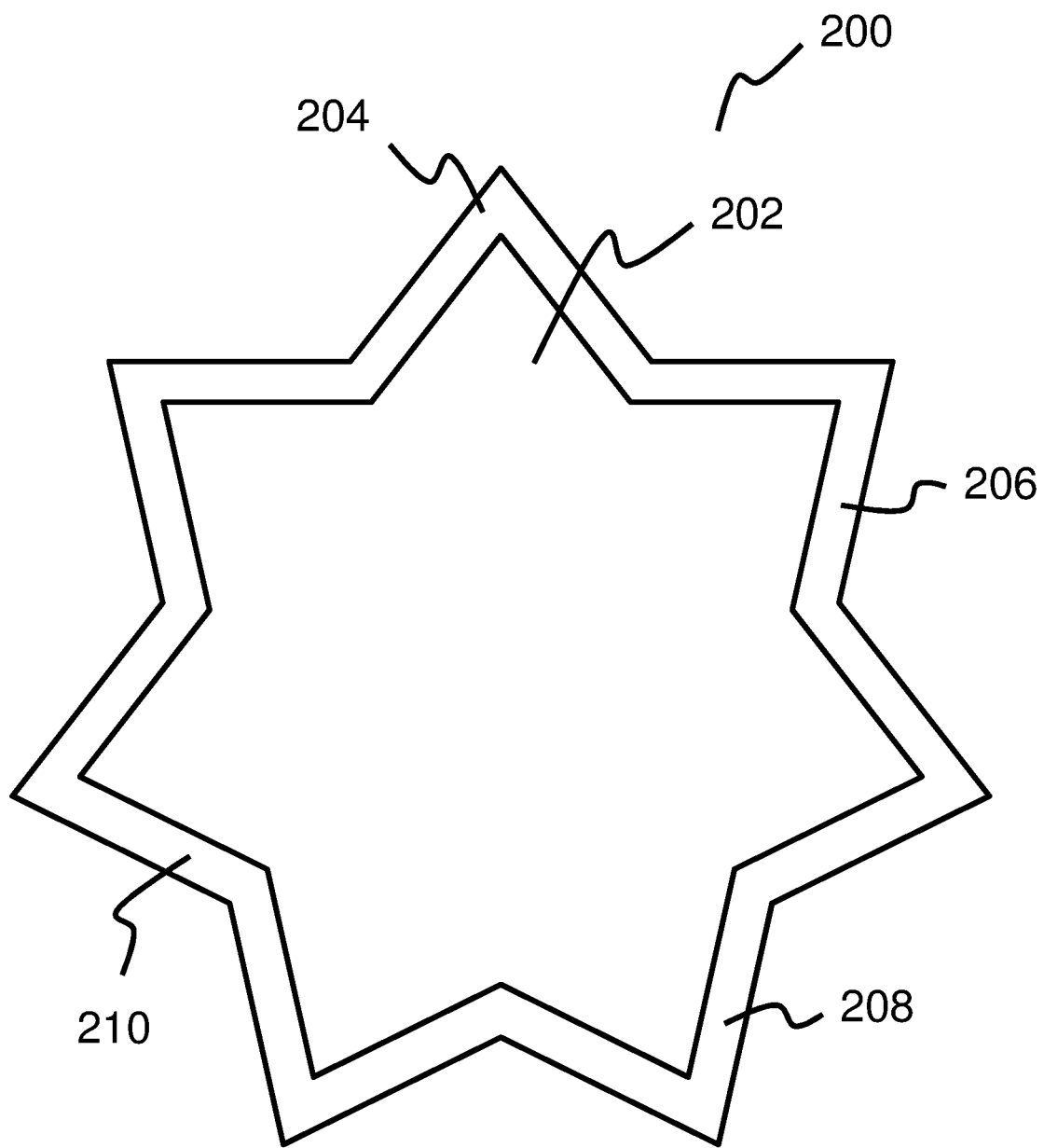
FIG. 2B is a schematic, cross-sectional diagram that illustrates an example of a conformally-coated structure according to various embodiments.

FIG. 2B is a schematic, cross-sectional diagram that illustrates an example of a conformally-coated structure 200 according to various embodiments. The conformally coated structure 200 may include an underlying structure 202 that is covered with a conformal coating 204. As illustrated, the conformal coating 204 coats the entire surface of the underlying structure 202 at the cross-section, but it will be readily understood by those having ordinary skill in the art that all or a portion of a surface of the underlying structure 202 may be selectively coated. The conformal coating 204 may have a consistent self-limiting thickness at a plurality of points along a surface of the conformal coating 204. For example, the conformal coating 204 may have a consistent self-limiting thickness at a first point 206, at a second point 208, and at a third point 210. The thickness at each of the plurality of points along the surface of the conformal coating 204 may vary within a range having a lower limit and/or an upper limit. The range may include or exclude the lower limit and/or the upper limit. The lower limit and/or upper limit may be selected from about 0.1, 0.5, 1, 5, 10, 15, 20, 25, 30, 35, 40, 45, 50, 51, 52, 53, 54, 55, 56, 57, 58, 59, 60, 61, 62, 63, 64, 65, 66, 67, 68, 69, 70, 71, 72, 73, 74, and 75 percent. For example, according to certain embodiments, the thickness at each of the plurality of points along the surface of the conformal coating 204 may vary by less than 50 percent, as described according to various embodiments, or any combination of lower limits and upper limits described.

According to various embodiments, the thickness of the conformal coating at any point along the surface of the conformal coating may be in a range defined as a deviation about an average thickness of the conformal coating across all points along the surface of the conformal coating. The deviation about the average thickness of the conformal coating may be a multiple of the average thickness. The multiple of the average thickness may be within a range having a lower limit and/or an upper limit. The range may include or exclude the lower limit and/or the upper limit. The lower limit and/or upper limit may be selected from about −0.5, −0.45, −0.4, −0.35, −0.3, −0.25, −0.2, −0.15, −0.1, −0.05, 0, 0.05, 0.1, 0.15, 0.2, 0.25, 0.3, 0.35, 0.4, 0.45, and 0.5. For example, according to certain embodiments, the multiple of the average thickness may be in a range of from about −0.5 to about 0.5, or any combination of lower limits and upper limits described. According to some embodiments, the thickness of the conforming at any point may be within +/−half of the average thickness of the conformal coating.

The self-limiting thickness required to repulse the incident spray may vary based on the materials employed. The thickness may generally be within a range having a lower limit and/or an upper limit. The range may include or exclude the lower limit and/or the upper limit. The lower limit and/or upper limit may be selected from about 0.001, 0.005, 0.01, 0.05, 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, 1000, 2000, 3000, 4000, 5000 micrometers. For example, according to certain embodiments, the thickness may generally be in a range of less than about 1 mm, less than about 100 micrometers, less than about 10 micrometers, less than about 1 micrometers, or less than about 0.1 micrometers, or any combination of lower limits and upper limits described.

Functional Morphologies

To obtain functional morphologies for target coatings, various embodiments utilize the mechanisms creating the diverse behaviors already displayed in SLED particularly with regards to (1) phase separation-altered and compositionally-altered mobility and (2) self-assembly of non-conductive and conductive particles under the electrostatic and hydrodynamic forces of evaporating ESD droplets. For example, according to various embodiments, the methods and compositions may result in a layer having a plurality of elongated strands. Each of the plurality of elongated strands may have at least one dimension less than 100 micrometers. For example, according to various embodiments, the methods and compositions may result in a layer having a plurality of spheroidal particles comprising the non-conductive polymer. Each of the plurality of spheroidal particles may have at least one dimension less than 100 micrometers.

Various embodiments employ the morphology formed by the droplets during drying to form thickness-limited coatings. At least two characteristic geometric families may be achieved: (1) spheroidal (e.g. circles, ellipsoids, and partial/complete shells) and (2) linear (e.g., wires). These structures arise from a combination of the electrostatic, hydrodynamic, and thermodynamic driving forces within the evaporating droplet. For purposes of explanation the following theories are provided; but the embodiments are not limited by the accuracy or completeness of these theories.

It appears that the observed morphologies may be understood as arising from heterogeneous (rounded) and homogeneous (linear) phase separation respectively. Applying this understanding to microscale droplets under strong electrostatic fields allows various embodiments to control the morphology and thereby the properties of the final coatings.

Figure 3A:
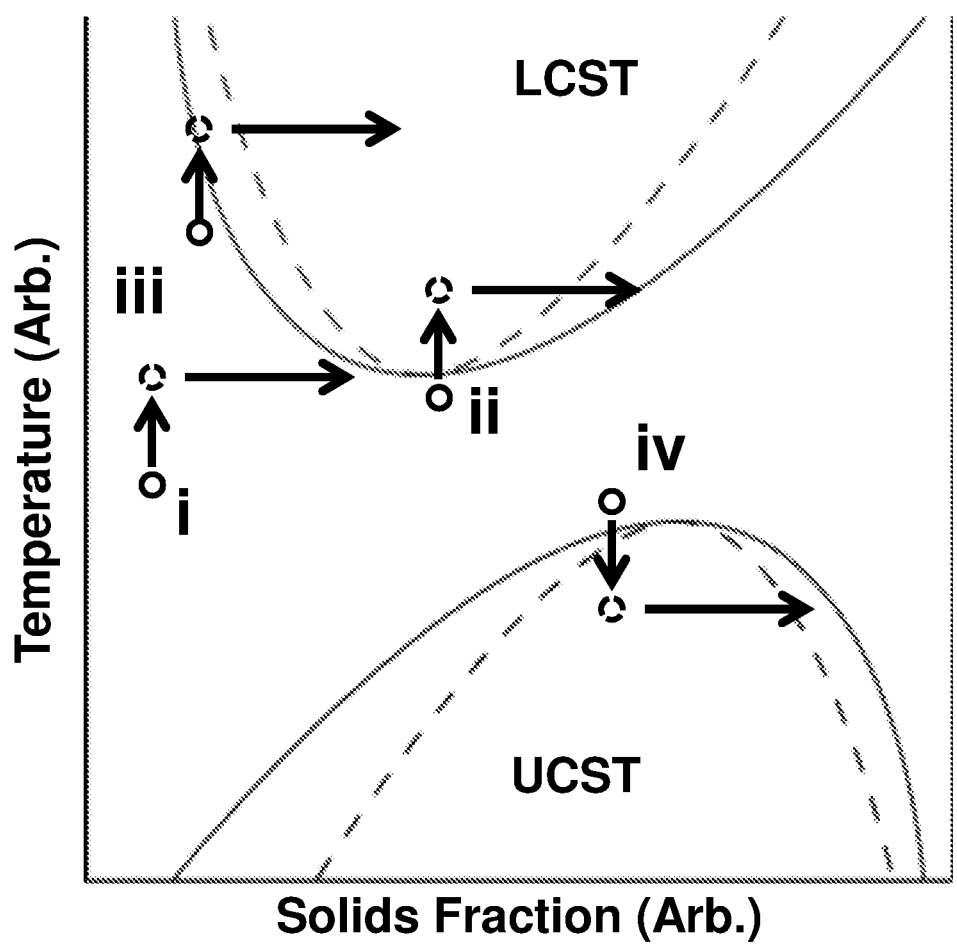
FIG. 3A is a schematic that illustrates an example of phase diagrams of solids fraction vs. temperature of polymer solution behavior, used according to various embodiments according to various embodiments.

According to various embodiments the deposited films may have a spherical shell surface morphology. For example, in the case of the PS-butanone sprays, the microstructure of the coatings may include a plurality of spherical shells. This microstructure may be understood by the evolution in phase space of a conventional evaporating polymer solution, which gradually progresses from a solvent-rich single phase through a two-phase region at the surface, heterogeneously generating a skin of polymer-rich phase that acts to immobilize the droplet, preventing charge reconfiguration. FIG. 3A is a schematic that illustrates an example of phase diagrams of solids fraction vs. temperature of polymer solution behavior, used according to various embodiments according to various embodiments. FIG. 3A indicates the state of the solution in the syringe, hollow symbols indicating the initial state at the substrate and arrows tracing the evolution. Path (i) is illustrative of PS-butanone and other conventional polymer solutions that progress maintain a single phase during drying at a heated substrate. Path (ii) is illustrative of MC-water/ethanol and other LCST systems that progress from single phase rapidly to two phases through a spinodal decomposition (shown as a dashed line) at a heated substrate. Path (iii) is illustrative of poly(N-isopropylacrylamide) (PNIPAM)-water/ethanol and other LCST systems that progress as the UCST systems in path (i). Path (iv) is illustrative of a path of agarose and other UCST systems that start from a warmed syringe and progress through spinodal decomposition at a cool or room temperature target.

Figure 3B:
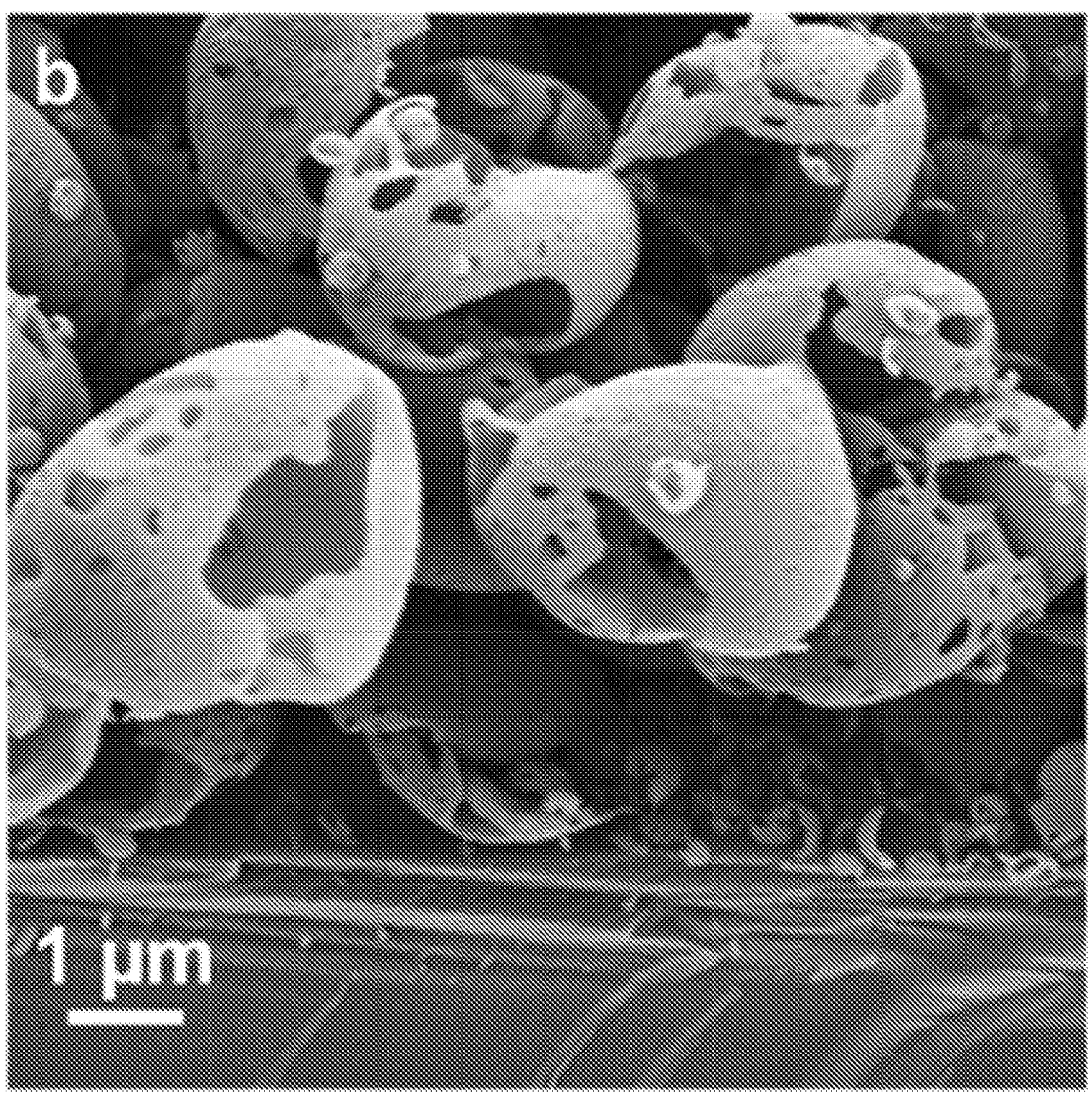
FIG. 3B is an angled scanning electron microscope image that illustrates an example of fractured shells resulting from 35k MW PS-butanone spray at high flow rate according to various embodiments.
Figure 3C:
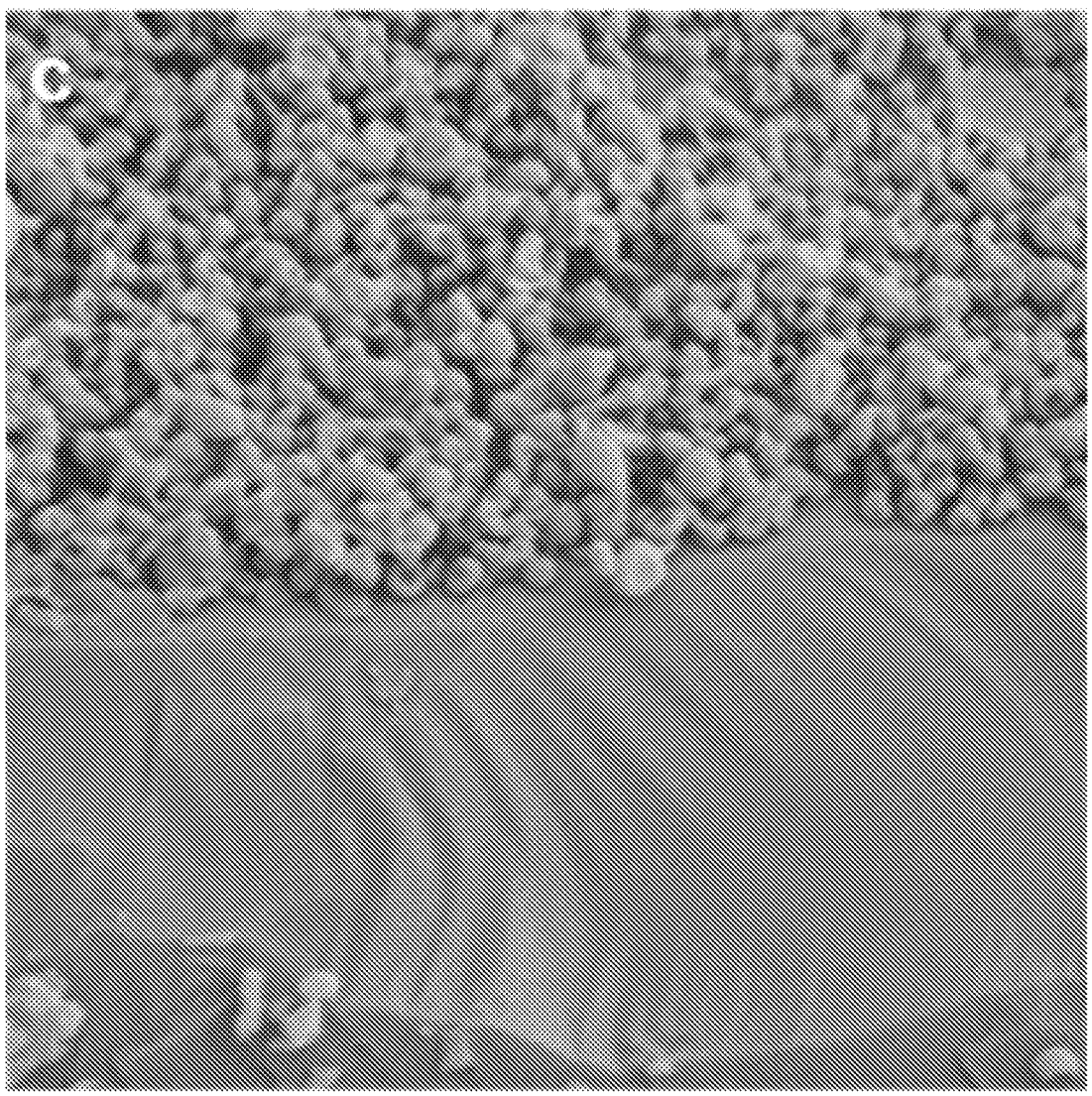
FIG. 3C is an angled scanning electron microscope image that illustrates an example of collapsed shells resulting from 7k MW PNIPAM-water/ethanol spray, which also illustrate the wide range of particle sizes possible through SLED according to various embodiments.
Figure 3D:
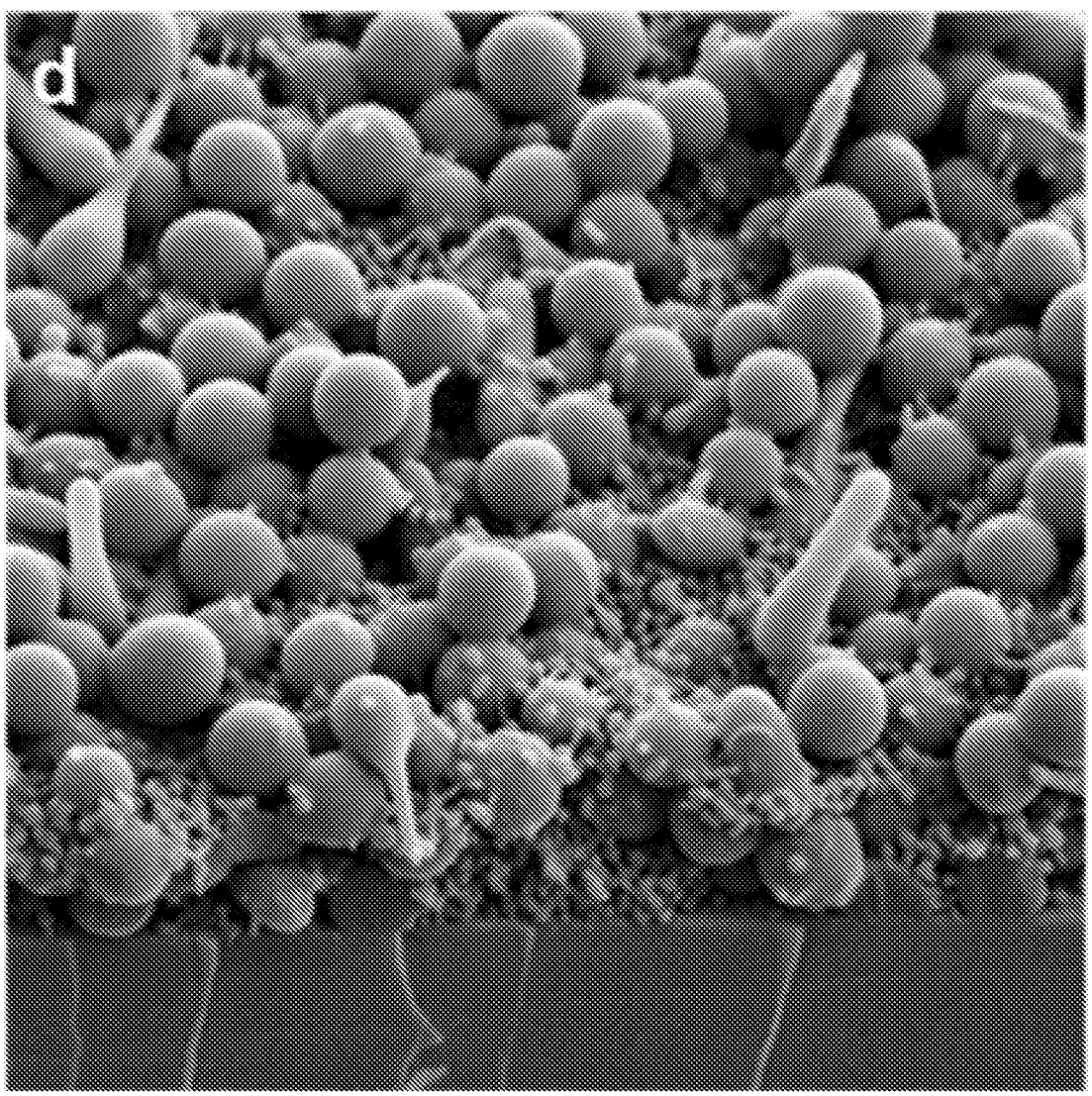
FIG. 3D is an angled scanning electron microscope image that illustrates an example of spheres arising from oligomeric sol gel-butanone spray according to various embodiments.
Figure 3E:
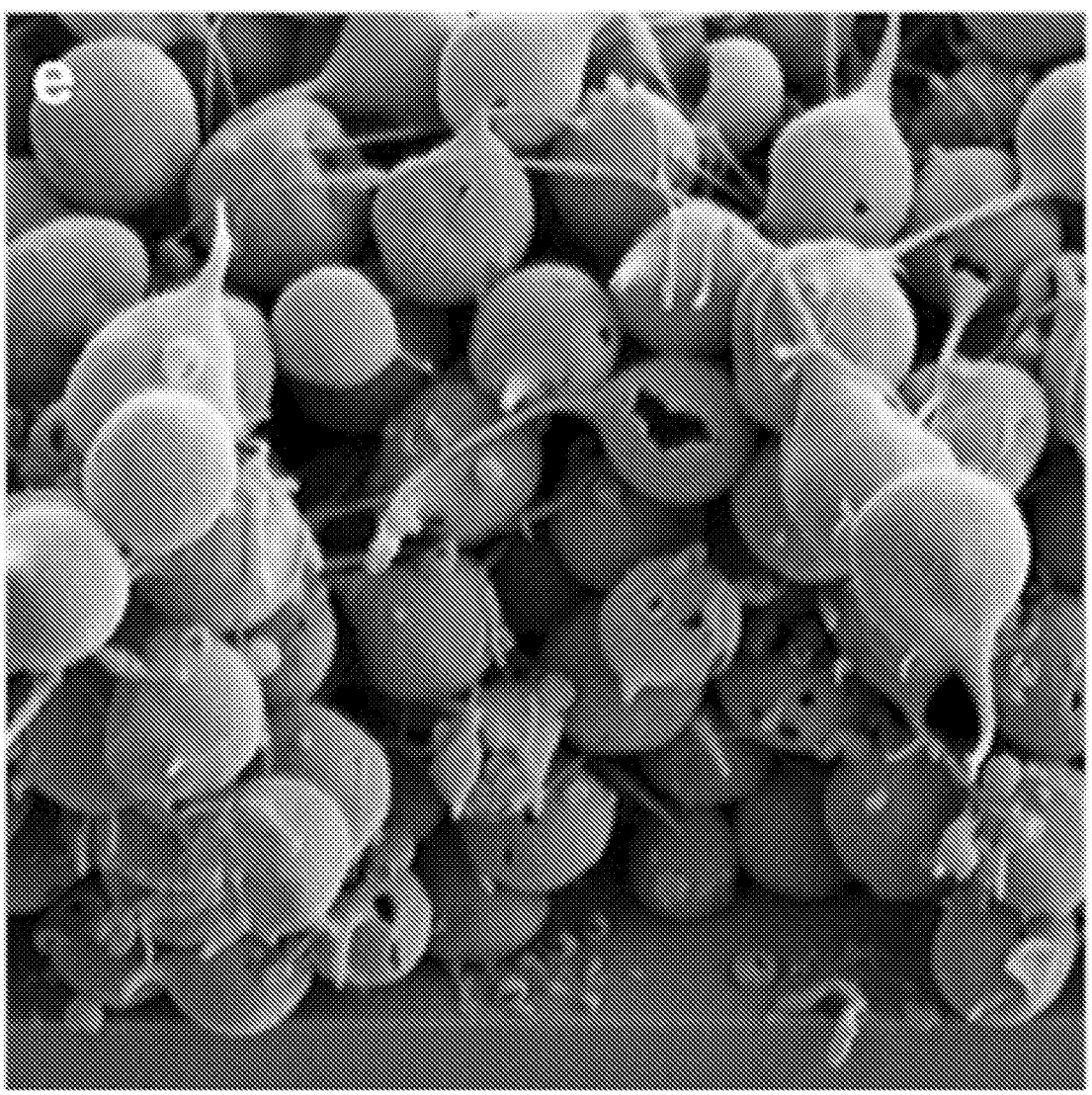
FIG. 3E is an angled scanning electron microscope image that illustrates an example of filled in shells resulting from PS/PI-butanone spray according to various embodiments.
Figure 3F:
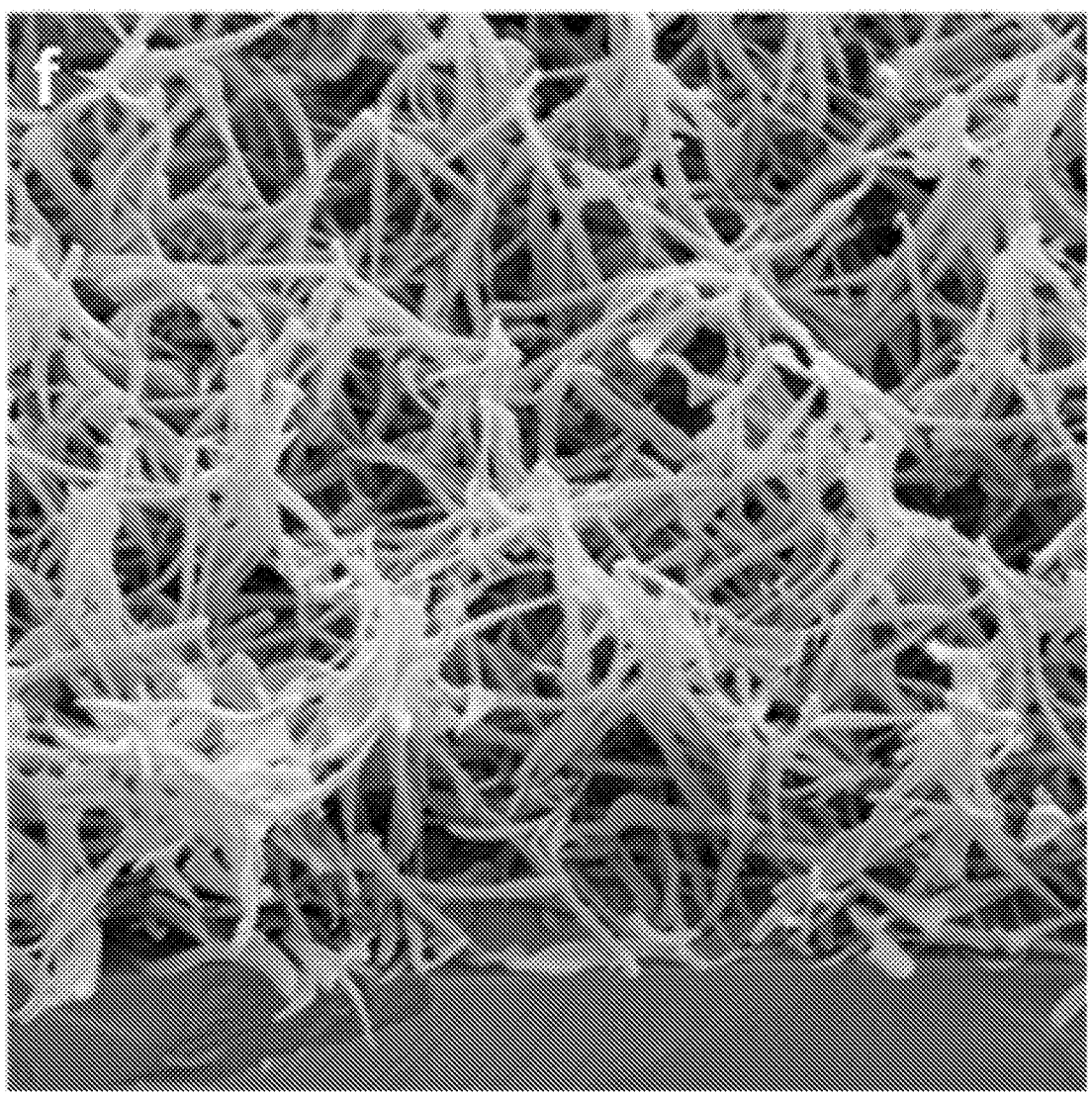
FIG. 3F is an angled scanning electron microscope image that illustrates an example of nanowires resulting from MC-water/ethanol spray, according to an embodiment according to various embodiments.

FIGS. 3B, through FIG. 3F show angled scanning electron microscope (SEM) images of characteristic spray results, according to various embodiments at different spray compositions. FIG. 3B is an angled scanning electron microscope image that illustrates an example of fractured shells resulting from 35k MW PS-butanone spray at high flow rate according to various embodiments. The specific example is: flow rate 1.5 ml/hr, temperature 35° C., 1 wt % 35k MW PS in 2-butanone. FIG. 3C is an angled scanning electron microscope image that illustrates an example of collapsed shells resulting from 7k MW PNIPAM-water/ethanol spray, which also illustrate the wide range of particle sizes possible through ESD according to various embodiments. The specific example is: flow rate 0.1 mL/hr, temperature 40° C. 1 wt % 7k MW PNIPAM in a 70 wt % water/30 wt % ethanol blend. FIG. 3D is an angled scanning electron microscope image that illustrates an example of spheres arising from oligomeric sol gel-butanone spray according to various embodiments. The specific example is: flow rate 0.5 mL/hr, temperature ~20° C., 1 wt % 87 mol % phenyltriethoxysilane: 13 mol % diphenyldiethoxysilane oligomeric silsesquioxane in 2-butanone. FIG. 3E is an angled scanning electron microscope image that illustrates an example of filled in shells resulting from PS/PI-butanone spray according to various embodiments. The specific example is: flow rate 0.63 mL/hr, temperature 35° C., PS/PI in 2-butanone. FIG. 3F is an angled scanning electron microscope image that illustrates an example of nanowires resulting from MC-water/ethanol spray, according to an embodiment according to various embodiments. The specific example is: flow rate 0.25 mL/hr, temperature 90° C., 1 wt % methylcellulose in a 70 wt % water/30 wt % ethanol blend.

Two ancillary characteristics of this spinodal decomposition mechanism are (1) that these shells were very brittle during formation and had a tendency to collapse at low polymer loading or large droplet (high flow rate) regimes, as shown in FIG. 3B, which, as already discussed, shows collapsed shells; and (2) that the results were sensitive to surface temperature, as an elevated temperature increased the ability to absorb solvent vapor and also increased the electrical conductivity of the shell (See: FIG. 8A). As discussed according to various embodiments, collapsible shells may be useful in thermally densifying the polymer film. Maintaining continuous shells is desirable for applications such as low-thermal conductivity coatings, where random, low-density structures have been demonstrated to possess highly superior properties as thermally-insulating aerogels. Brittleness of a polymeric structure for glassy polymers are, to some extent, related to the entanglement of the network, which is proportional to the molecular weight. Indeed, as MW decreases across different varieties of polymer, shells fill-in, then collapse, then either densify or flatten (See FIG. 3B, FIG. 3C, and FIG. 3D). Collapsing of shells may be employed to remove polymeric material according to certain embodiments, where densifying, flattening, and/or removing the polymeric material is desirable, such as to allow percolation of electrically conductive filler particles.

In addition to adjusting the molecular weight of the polymer or polymers in the polymeric solution, polymer blending in the spray process is another useful option, according to various embodiments, to manipulate shell morphologies. As discussed above, to achieve thickness-limited spray, the polymer must be sprayed below its softening point. This is only required, however, up to the point of structural fidelity. That is to say, it should be possible to incorporate polymer above its softening point as long as the final shell is immobile. This second polymer may plasticize the shell and patch gaps, as shown in the result in FIG. 3E of a PS/polyisoprene (PI) blend. What is compelling about this result is that polyisoprene alone would have sprayed as an electrowetting or charged melt spray, so there must be some composition at which the spray changes from one regime to the other. Such a phenomenon is not unique to PI.

In addition to spherical shell morphologies, nanowire morphologies, achievable according to various embodiments, present certain advantages over shell morphologies. One advantage is the surface-to-coating density ratio, which is much less for the wire coatings. A reduced surface-to-coating density represents a reduction in the materials usage for a given thickness of film and is useful for situations where a large amount of accessible surface is needed for, for example, chemically active coatings. When coulomb explosions occur, wire morphologies may form by the extrusion of a column of liquid which breaks up into smaller droplets until charge is rebalanced. As this may occur as the droplet is drying, columns are often seen extending from droplets (see FIG. 3E). Another example is electrospinning, where the whole spray is conducted at a higher polymer loading and thus viscosity, such that wire filaments are produced instead of droplets. Wire morphologies are achievable with a variety of polymeric solutions, including methylcellulose (MC)-water/ethanol sprays conducted at elevated surface temperature (FIG. 3F). This is the first instance of nanowires being produced by ESD. MC-water (the ethanol may be expected to evaporate quickly) is a lower critical solution temperature (LCST) polymer solution (FIG. 3Aii,iii). LCST solutions are characterized by phase separation on increasing temperature, in contrast to the more-ubiquitous upper critical solution temperature (UCST) systems (FIG. 3Ai,iv).

For the LCST polymer solutions this temperature is often about 40° C., or in a range of from about 20° C. to about 60° C. Without being bound by theory, in the case of MC, it appears as if electrospinning is occurring as the droplet approaches the surface. In essence, the LCST is occurring in a homogenous rather than heterogeneous manner, creating a viscous gel that acts like a highly-loaded polymer solution, which is then electrospun into nanowires. This may be understood by a rapid transition from a single phase to a two-phase inverse-spinodal on heating, leading to fine phase separation into solvent-rich and polymer-rich domains. Supporting this conclusion is that low-MW poly(N-isopropylacrylamide) (PNIPAM), another LCST system, did not form wires, indicating that the spinodal in this system was not achieved by the heating, and the shell formation mechanism instead occurred. If spinodal decomposition is desired for nanowires to form, this would explain why it has not yet been observed by others in the ESD community.

When mapping polymer blends, it is critical to also consider the interaction between the polymers in the blend. For example, PS and PI are a ubiquitous strongly-segregating polymer blend. Were they fully miscible, the behavior would instead be expected to mirror an effective lowering of the molecular weight. To test the effects of blending fully miscible systems, oligomeric sol gels may be employed, which may be prepared with softening temperatures that range over ~100° C., with the higher range displaying SLED at ambient spray conditions and the lower range displaying electrowetting spray. Employing oligomeric sol gels enable a comparison of the behavior of miscible and immiscible systems. The behavior of miscible and immiscible systems may also be compared to the intermediate case of a microphase separated system such as a block copolymer. Investigations of such systems have indicated that the majority phase dictates the SLED behavior. By blending with the high softening temperature component of the block copolymer, it may involve less doping than would otherwise be involved to transition to the SLED regime.

Tracking morphology as a function of solids loading and substrate temperature in MC-water sprays is helpful to understand the role of spinodal decomposition in forming wire morphologies. As temperature increases, the expectation is that the amount of MC required to form wires should decrease. Wires may be obtained in a UCST system by warming the spray and setting the target to ambient temperature to initiate a similar phase transitions in aqueous solutions of polymers such as gelatin or agarose. The advantage of such an approach, beyond confirmation of the mechanism, is that an ambient temperature target and warmed spray is a much easier scenario to achieve in a real engineering application.

The other advantage of spinodal decomposition for the purposes of mechanistic understanding is that, unlike other phase separations, spinodal decomposition does not have kinetic barriers. The practical implication of this is that spinodal processes may be easily simulated through the finite element method (FEM) using the Cahn-Hilliard equation. FEM simulations may be employed to develop a coupled phase, fluid, and electrostatic simulation platform to create predictive models of the nanowire geometries on a single droplet level. By simulating the two phases as a highly-viscous (polymer-rich) and non-viscous (solvent-rich) phase under the influence of electrostatic surface forces in air, the evolution of the wires may be modeled as a three-phase fluid-fluid separation using experimentally-determined droplet sizes and droplet charges determined by empirical models. Then, parameters of the phase separation may be used as fitting parameters to match the observed results. This may then be developed into a predictive model of future sprays.

Figure 4A:
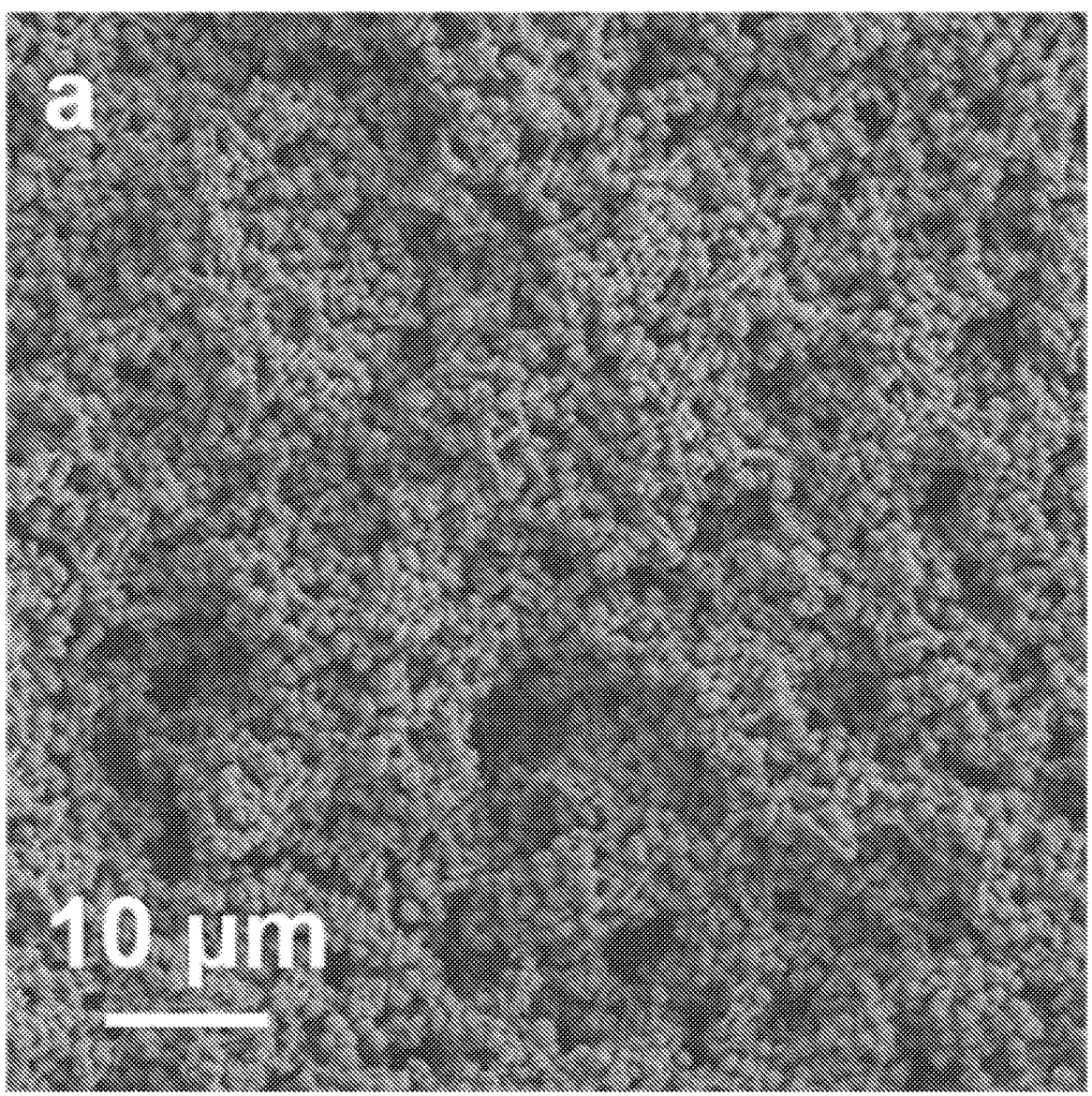
FIG. 4A is a scanning electron microscope (SEM) image that illustrates an example of morphologies of sol gels blended with about 85% PVC according to various embodiments.
Figure 4B:
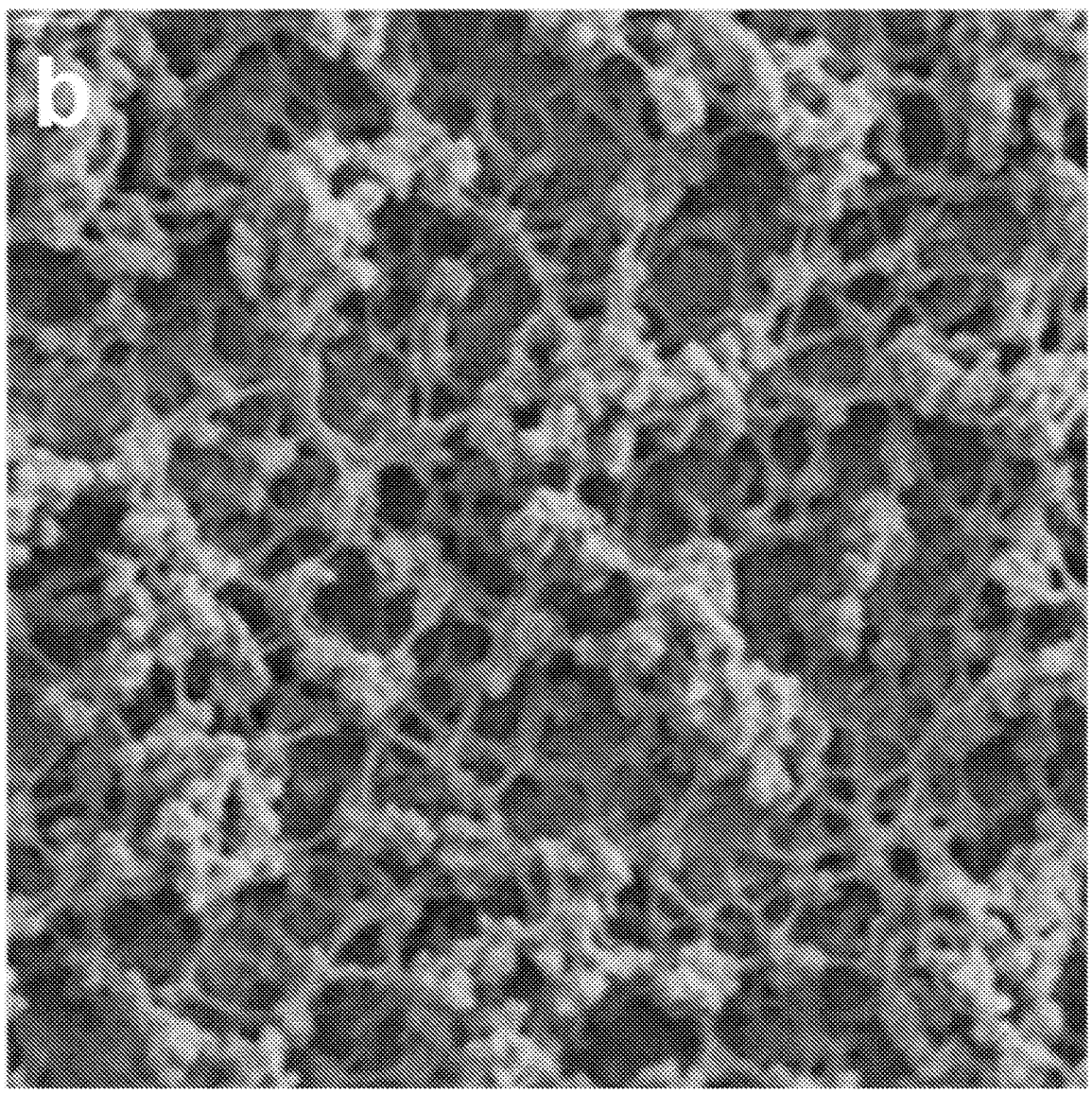
FIG. 4B is a scanning electron microscope (SEM) image that illustrates an example of example morphologies of sol gels blended with about 50% PVC zinc oxide nanoparticles according to various embodiments.

As is apparent in the above discussion, mobility of the spray in SLED is effective in both the context of fluid mobility (i.e. viscosity) and electrical mobility (i.e. conductivity) since both are mechanisms for the reconfiguration of charge. Loading a polymer solution with particulates, which, due to the dilute nature of ESD, may be easily done to a very high particle/pigment volume content (PVC), has the potential to affect both properties. Loading with non-conductive particles will have a large effect on the viscosity as even nanoparticles have extremely low diffusivities and, at high PVC, will result in jamming. In preliminary results with low softening point oligomeric sol gels mixed with zinc oxide nanoparticles, the nanoparticles may initiate the transition from smooth electro-wetted films to isolated droplet features as shown in FIG. 4A and even electro-spun wire, droplet mixes as shown in FIG. 4B. FIG. 4A is a scanning electron microscope (SEM) image that illustrates an example of morphologies of sol gels blended with about 85% PVC according to various embodiments. FIG. 4B is a scanning electron microscope (SEM) image that illustrates an example of example morphologies of sol gels blended with about 50% PVC zinc oxide nanoparticles according to various embodiments. According to various embodiments, solvent vapor swelling or temperature may be insufficient to add mobility to coatings immobilized by particulates, thereby temperature and humidity sensitivity may both be suppressed.

Figure 5A:
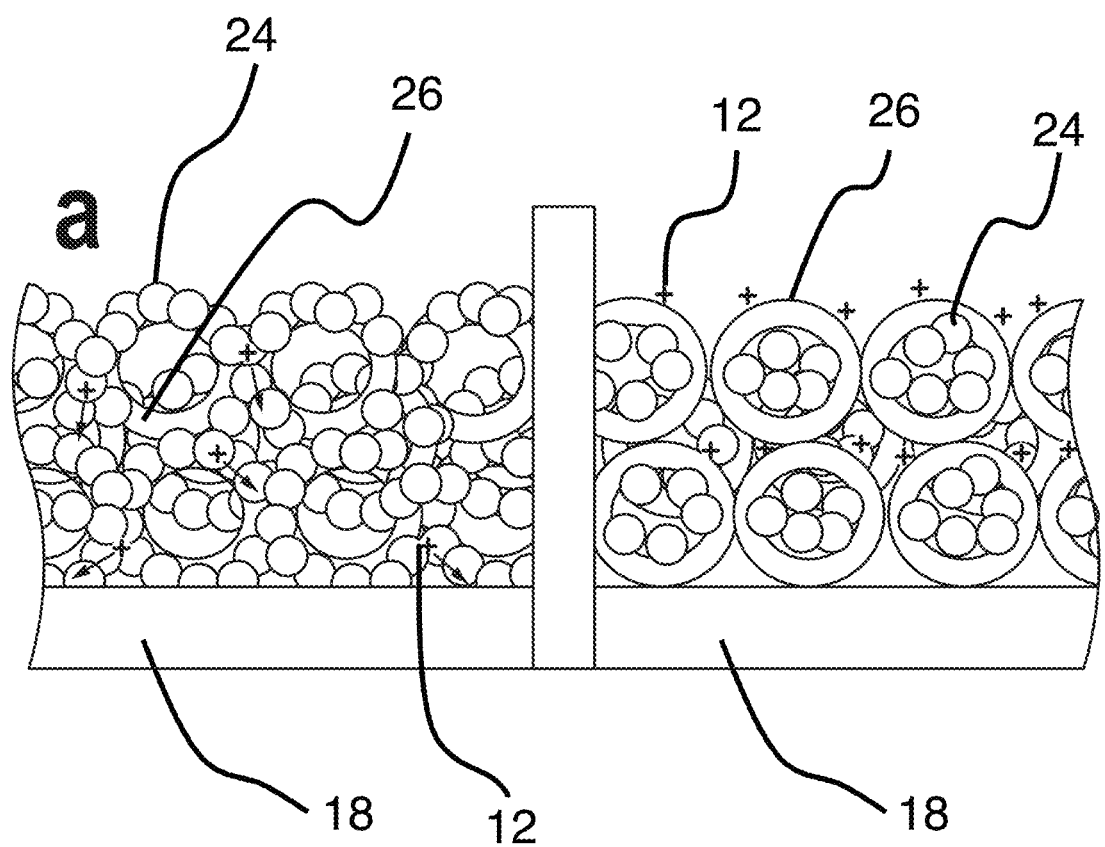
FIG. 5A is a schematic that illustrates an example of conductive fillers located at different regions of a thickness-limited spray particles on a substrate, according to various embodiments.

At sufficient loadings, conductive particles may also be employed to alter fluid mobility and/or to alter electrical mobility and/or to immobilize polymeric coatings. Conductive particles may also be utilized to affect the electrical conductivity of the resulting composite. Conductive particle or polymer sprays may be continuously deposited on substrates up to a high thickness due to their ability to dissipate and transport charge. To create a thickness-limited SLED of conducting particles, therefore, percolation of the particles into conducting networks is desirably suppressed in a similar fashion to the polymer blends discussed above. Electrical percolation in nanocomposites describes the PVC wherein the conductive fillers form a continuous network. This phenomenon may be employed for nanoparticles, platelets, and nanotubes, with effects such as the chemical functionality, agglomeration, and interpenetration of the structures being critical to the final performance. On a purely mathematical basis, percolation for random monodisperse spherical particles is expected to occur at a PVC of ~20% in 3D. As thickness-limited sprays possess low-density morphologies, they may be thought of as incorporating an additional non-conducting phase of air. It is likely that there is a PVC of conductive filler where the spray is thickness-limited due to a lack of percolation of the filler, but, upon thermal densification or removal of the polymer, the percolation threshold is exceeded. The pre-densified case, however, is not as simple as it may appear—while it is tempting to view pre-densified films as random distributions of binder, particles, and voids, none of these components may be considered as randomly distributed. As discussed above, in the binder-only case of thickness-limited polymer spray, the polymers form shells or nanowires as they phase separate from the solvent. As such, the void fraction could increase arbitrarily by thinning the polymer shell or wire with simultaneous guarantee of a continuous polymer network. The particles, on the other hand, could potentially reside (1) on the surface of the polymer. (2) distributed in the polymer, or (3) on the interior of a shell, depending on the relative surface affinities and mobility during morphological evolution as shown in FIG. 5A. FIG. 5A is a schematic that illustrates an example of conductive fillers located at different regions of a thickness-limited spray particles on a substrate, according to various embodiments.

Some Exemplary Conductive Particle Loadings

Figure 5B:
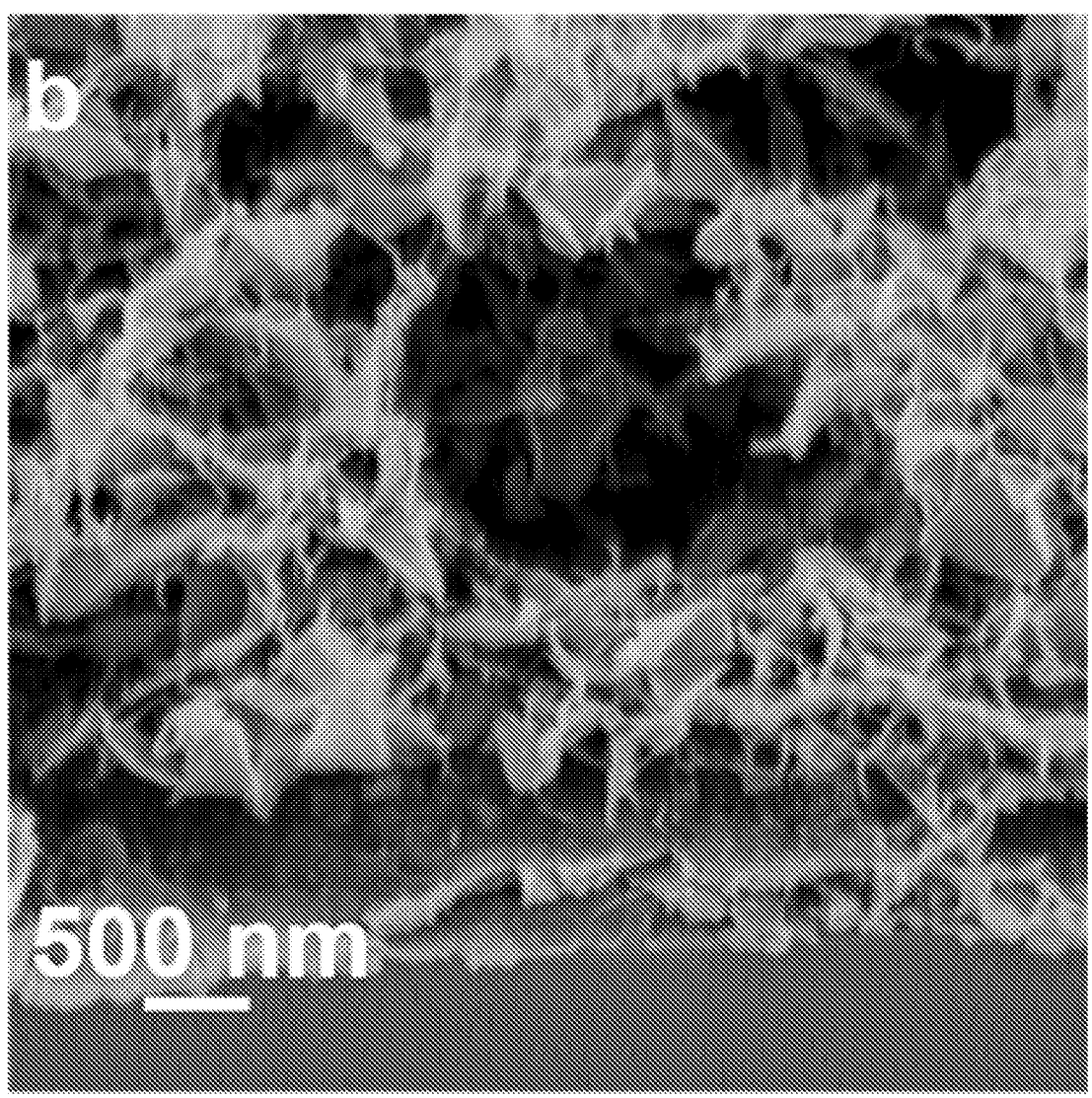
FIG. 5B is an angled scanning electron microscope (SEM) image that illustrates an example of ~70% PVC of gold nanoparticles in MC wires according to various embodiments.
Figure 5C:
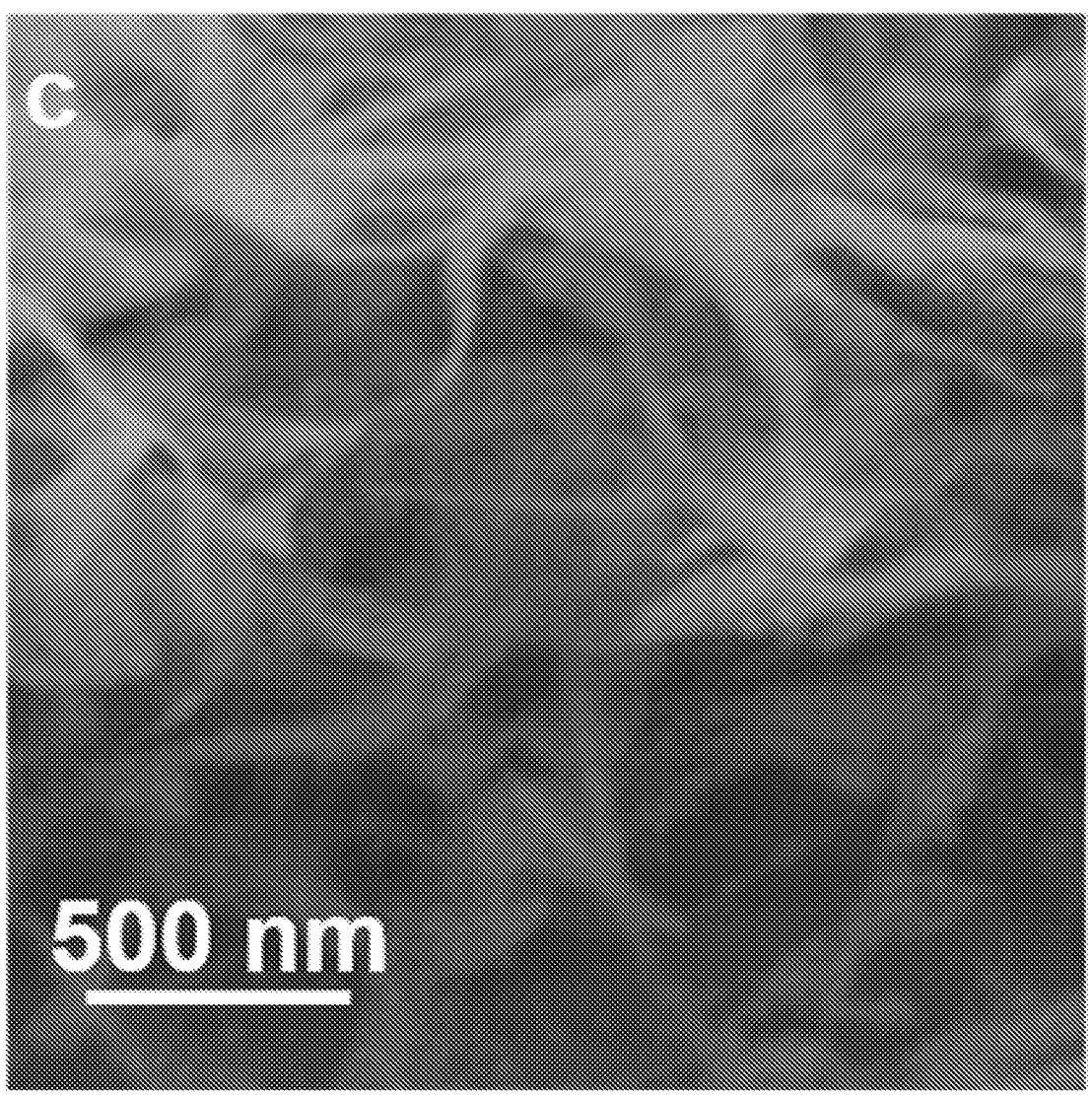
FIG. 5C is an angled scanning electron microscope (SEM) image that illustrates an example of ~20% PVC of gold nanoparticles in MC wires according to various embodiments.
Figure 5D:
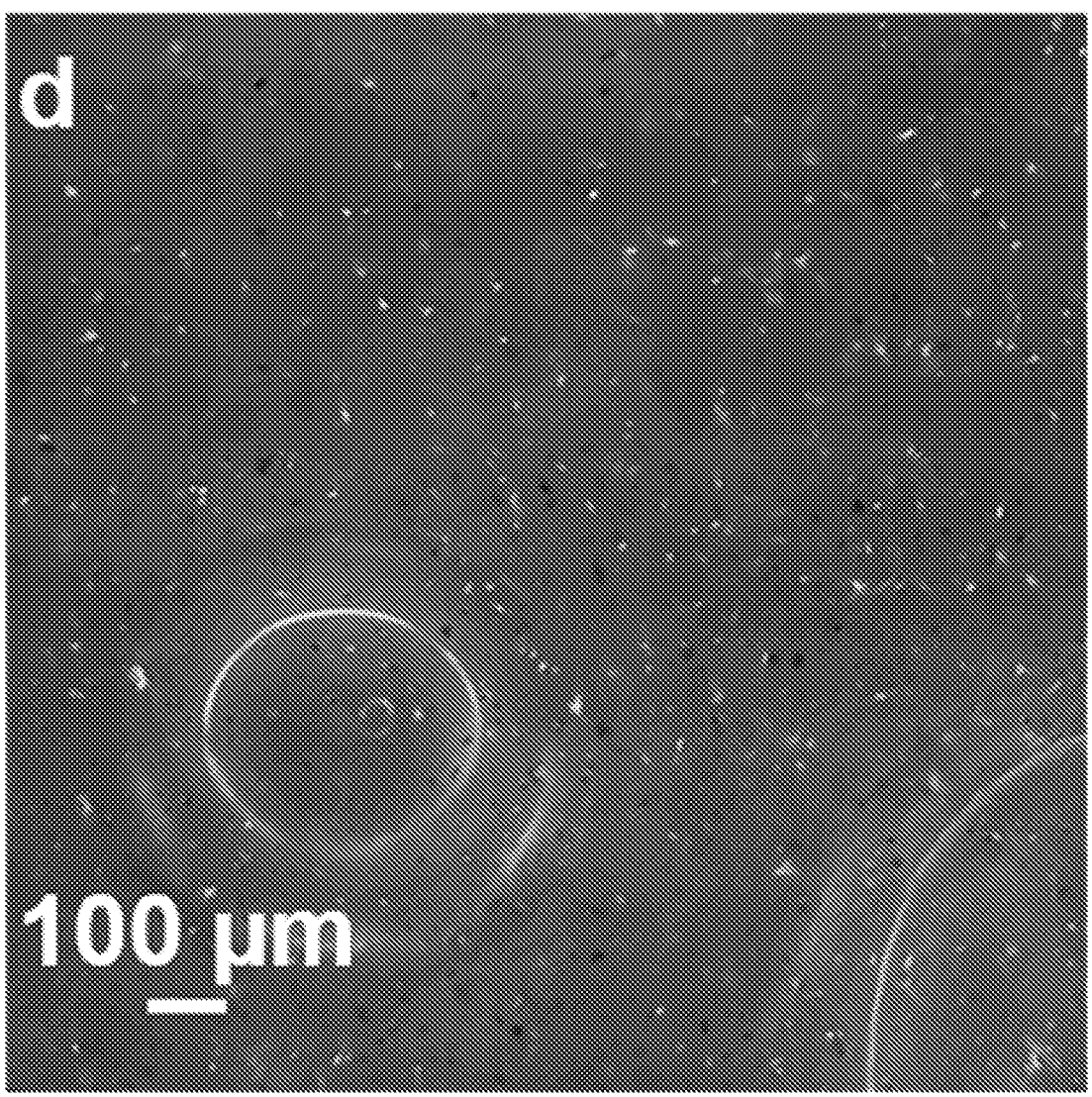
FIG. 5D is an optical microscope image that illustrates an example of PS coating with copper microflakes deposited via SLED and thermally smoothed according to various embodiments.
Figure 6A:
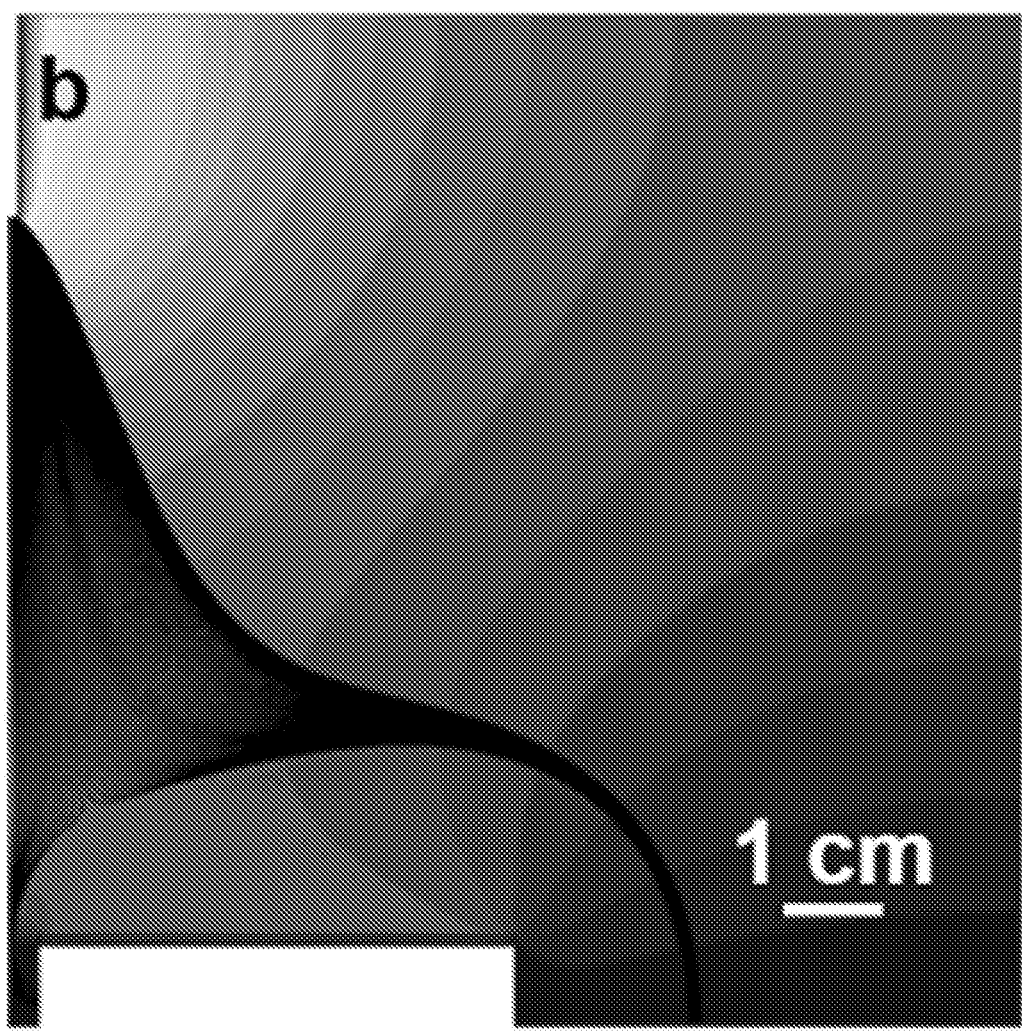
FIG. 6A is a radially-symmetric finite element method (FEM) simulation that illustrates an example of electric field lines for SLED targeted at a hole in a metal film according to various embodiments.
Figure 6B:
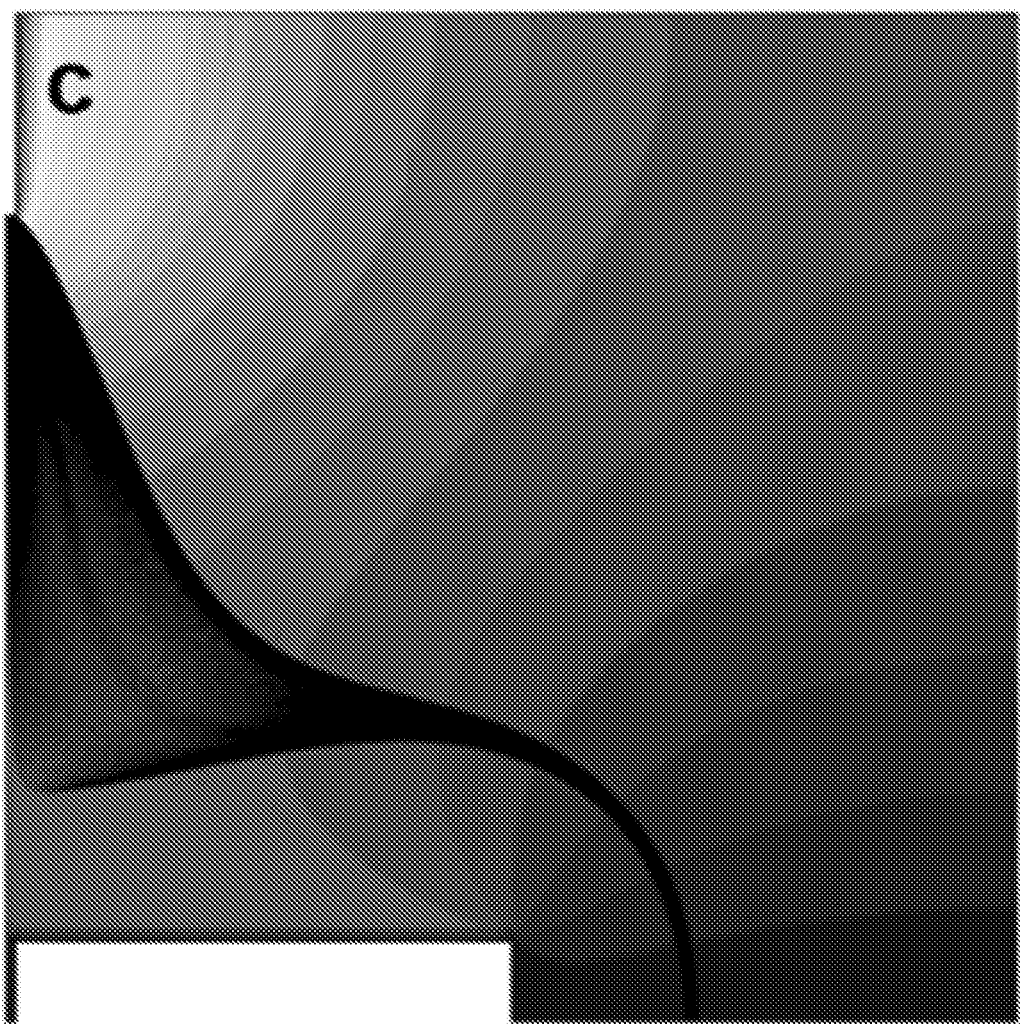
FIG. 6B is a radially-symmetric FEM simulation that illustrates an example of electric field lines for SLED targeted at a hole in a metal film according to various embodiments.
Figure 6C:
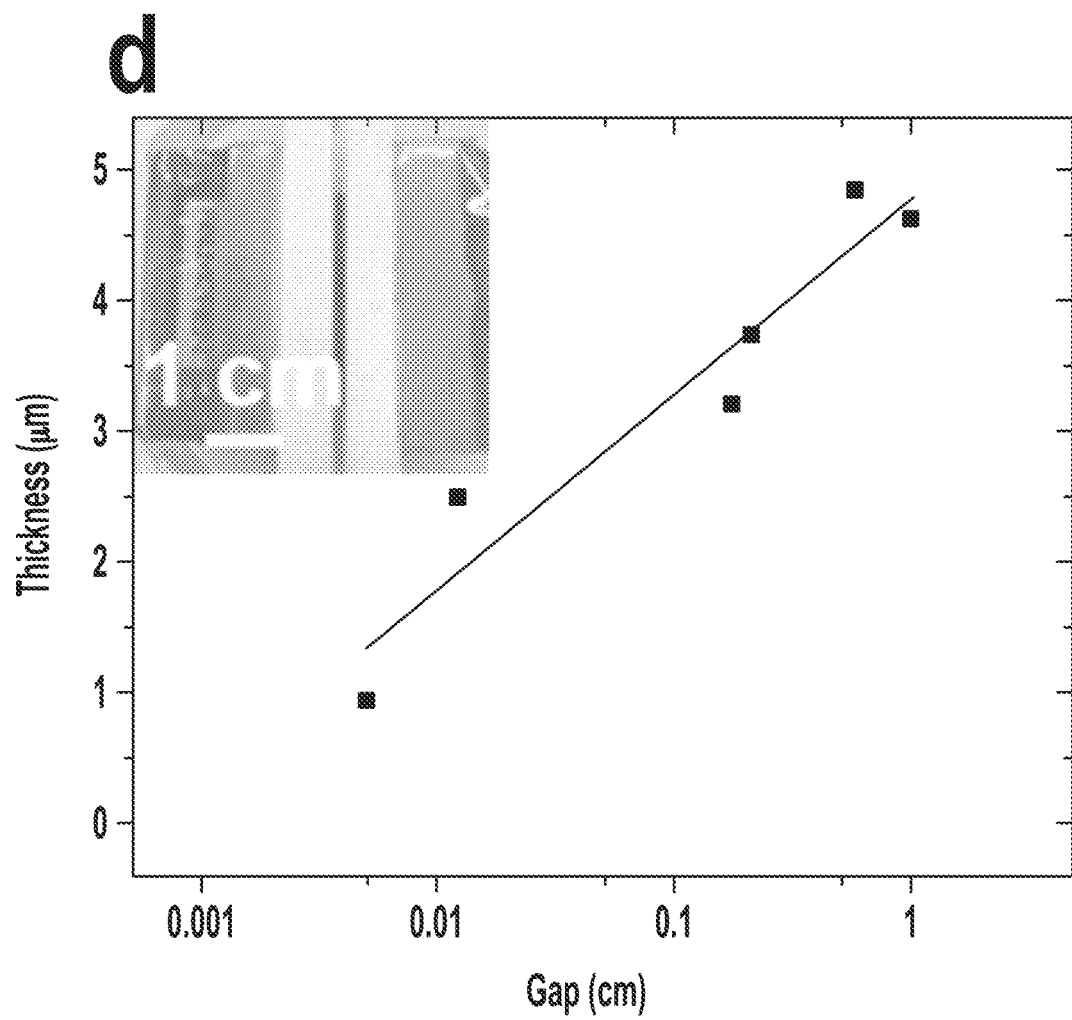
FIG. 6C is a chart that illustrates an example of PS-butanone thickness inside of a vice after 8 mg PS spray mass as a function of the vice gap shown in a semilog scale, with logarithmic fit as guide to the eye, according to various embodiments.

FIG. 5A shows conductive fillers 24 located at different regions of a thickness-limited spray particles 26 on a substrate 18. If the fillers favor the outside of the shell (left), percolation is likely, while it is possible for percolation not to occur if the fillers favor the inside of the shell (right). If percolation is likely, then the conductive fillers 24 will suppress charges 12, inhibiting a thickness-limiting function. If percolation is not likely, charges 12 will be exposed at the surface of the spray particles 26, allowing for a thickness-limiting function. FIG. 5B is an angled scanning electron microscope (SEM) image that illustrates an example of ~70% PVC of gold nanoparticles in MC wires according to various embodiments. FIG. 5C is an angled scanning electron microscope (SEM) image that illustrates an example of ~20% PVC of gold nanoparticles in MC wires according to various embodiments. FIG. 5D is an optical microscope image that illustrates an example of PS coating with copper micro-flakes deposited via ESD and thermally smoothed according to various embodiments. Flakes are well distributed and qualitatively appear to favor flat alignment.

By favoring sprays that create thin hollow shells and particle separation to the interior of the shell, percolation may be avoided during the spray. At the same time, particle loading may be selected to ensure that the final densified coating will be electrically conductive. Beyond merely achieving this effect, it may even be possible to achieve a much higher loading of conductive filler than is necessary for percolation. This means that SLED may be used for, for example, statically dissipative or electromagnetic-shielding coatings, with carbon, metal oxide, or metal fillers. Finally, many common fillers are anisotropic quasi-1D (e.g., carbon nanotubes, chopped glass fibers) or quasi-2D (e.g., exfoliated or unexfoliated graphite, aluminum, copper, or mica) microparticles. These fillers may be of a commensurate size with the carrier droplets and, therefore, may be used to affect the evolution of the polymer particulates. Utilizing such sprays without percolation before thermal treatment, presents an opportunity to assist with orientation of the fillers as the charged tubes and platelets will want to organize in such a way to maximize their proximity to the electrode (e.g., with their finite axis pointed out-of-plane) and minimize their proximity to other particles. Utilizing such sprays will also allow for even greater filling as aligned sheets may be packed to nearly complete density without percolation. According to various embodiments, an even greater filling as aligned sheets may be packed to nearly complete density without percolation.

Commercial gold nanoparticles and metal flakes as well as MXene nanoparticles may be utilized as conductive particles. MXenes are a class of two-dimensional inorganic compounds, for example, 2D titanium carbide, $Ti_3C_2$ nanoparticles. These materials consist of few atoms thick layers of transition metal carbides, nitrides, or carbonitrides. MXenes combine metallic conductivity of transition metal carbides and hydrophilic nature because of their hydroxyl or oxygen terminated surfaces. MXene materials are attractive since they may be dispersed without extra functionalization in aqueous and organic solvents and are a good anisotropic contrast for gold nanoparticles and a good nanoscale contrast for metallic microparticles. Various embodiments relate to coating complex surfaces with MXenes, these embodiments open up opportunities in high-efficiency catalytic coatings in addition to the other conductive coating properties. Various embodiments relate to thickness-limited sprays of up to a PVC of conductive MXene nanoparticles of about 70%, or from about 50% to about 90%, or at any PVC beyond the percolation limit for random packing. These sprays may be converted to conductive layers after removal and/or densification of the polymer. Other embodiments, as shown in FIG. 5C, employ gold nanoparticle-loaded MC nanowires. Still other embodiments relate to filling with microscopic metallic flakes, as shown in FIG. 5D. Flake-loaded sprays suffered from settling, however, the flakes did appear to be orienting parallel to the substrate on smoothing of the film.

Non-Conductive Particle Loading

Non-conductive particle loading may also be used to influence the phase space of SLED. Non-conductive particle solutions may include but are not limited to functionalized zirconia (for organic solutions) or dispersed silica (for aqueous solutions), as additives to the polymer sprays. Such non-conductive particles have the benefits of being affordable and obtainable in shelf-stable loadings of about 8 to about 20% PVC, which will allow for formulation of ESD solutions without dispersion issues. Addition of non-conductive particles may be used to stabilize the SLED. For example, thermal sensitivity in PS-butanone sprays may be reduced, and/or wires may be stabilized in MC-water/ethanol sprays in a shell-forming regime, and/or sensitivity to humidity may be reduced in water/ethanol sprays. Additionally, for the spinodal spray FEM model outlined above, the morphology of particulate sprays may be predicted by incorporating a third, completely immobile, phase into the model.

For sprays on silicon, if the top oxide layer exceeds a certain thickness, the electrowetting sprays may be converted to charged melt. This represents a gradual crossover in the effective resistance of the target material from surface conductive to surface insulating. Similar effects may occur when comparing thickness on various metallic surfaces, where the thick barrier oxide present on, for example, aluminum may lead to a different asymptotic thickness than deposition on stainless steel, which in turn may be different than a polished, highly-conductive aluminum surface. This is important when considering application of coatings in-field on surfaces with various levels of aging.

Figure 7A:
FIG. 7A is an example illustrating a schematic diagram of an electrospray deposition of an insulating polymer solution according to an electrowetting regime.
Figure 7D:
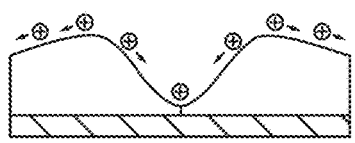
FIG. 7D is an example illustrating a schematic diagram of an electrospray deposition of an insulating polymer solution according to a charged melt regime.
Figure 7G:
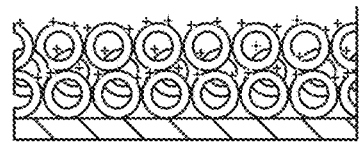
FIG. 7G is an example according to various embodiments illustrating a schematic diagram of an electrospray deposition of an insulating polymer solution according to a charged melt regime.
Figure 7B:
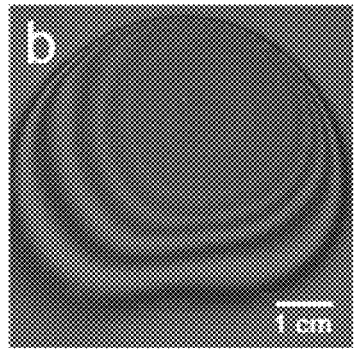
FIG. 7B is an example illustrating a top-down optical image of an electrospray deposition of an insulating polymer solution according to an electrowetting regime.
Figure 7E:
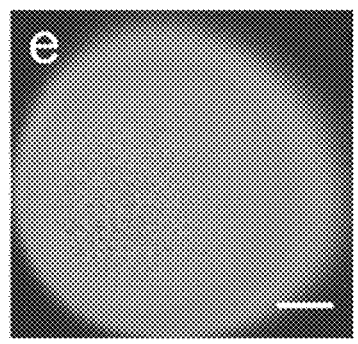
FIG. 7E is an example illustrating a top-down optical image of an electrospray deposition of an insulating polymer solution according to a charged melt regime.
Figure 7H:
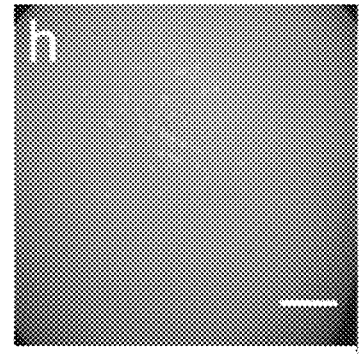
FIG. 7H is an example according to various embodiments illustrating a top-down optical image of an electrospray deposition of an insulating polymer solution according to a charged melt regime.
Figure 7C:
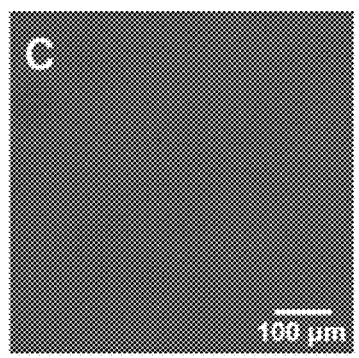
FIG. 7C is an example illustrating a top-down optical image of an electrospray deposition of an insulating polymer solution according to an electrowetting regime.
Figure 7F:
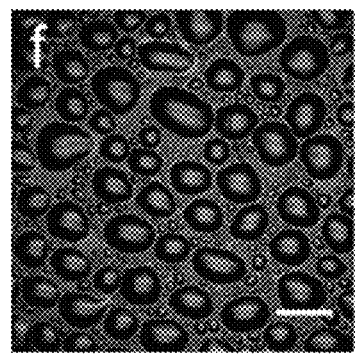
FIG. 7F is an example a top-down optical image of an electrospray deposition of an insulating polymer solution according to a charged melt regime.

Considerations Regarding the Electric Field

FIG. 6A is a radially-symmetric FEM simulation that illustrates an example of electric field lines for ESD targeted at a hole in a metal film according to various embodiments. At these conditions (6 kV/cm field and 6 microCoulombs per square meter, $\mu C/m^2$ of charge), a 6 millimeter, mm, hole results in the field lines contacting the side wall of the hole, suggesting that spray would coat the interior surface. FIG. 6B is a radially-symmetric FEM simulation that illustrates an example of electric field lines for ESD targeted at a hole in a metal film according to various embodiments. The same conditions as FIG. 6A, but with a 2 mm hole that shows field lines avoiding the hole. This suggests that the interior would not be coated. In both simulations, the metal is coated with charge on the top surface. FIG. 6C is a chart that illustrates an example of PS-butatone thickness inside of a vice after 8 mg PS spray mass as a function of the vice gap shown in a semilog scale, with logarithmic fit as guide to the eye, according to various embodiments.

Coating 3D objects with microscale thicknesses as shown in FIG. 8C and FIG. 8D demonstrates the capabilities of the SLED technique to follow complex surfaces. A geometry that exemplifies the limits of complexity of 3D surface that may be coated is that of a hole through a conducting plate, as preliminarily simulated in FIG. 6A and FIG. 6B. Lacking any surface charge, the SLED process will progress to the closest surface first. In this way, it is likely that the surface of the plate will be coated before the interior walls of the hole. Now, with the initial condition of the coated surface, the spray either progresses into the hole, or finds regions further along the surface to coat. Clearly, there must be a transition size where the hole goes from being the next coated region (FIG. 6A) to never being coated (FIG. 6B). There is some evidence of this progressing as a smooth transition in the coating of the statues shown in FIG. 8C and FIG. 8D, where the spray would avoid or thin in certain regions surrounded by many features. If the transition is in fact smooth, then there will be a gradual shift from (1) coating the inside surface to (2) gradient coating of the inside surface to (3) partial or no coating of the inside surface. This is only one of the relevant considerations when considering the deposition. Another arises from the fact that electric fields have a tendency to focus at sharp corners, which leads to buildup of spray. Finally, as the geometries reduce in scale, the droplet size may become commensurate with the feature curvature or even the size of entries. This will result in a flow rate dependence in the ability for droplets to enter features as specified by Equation 1 above. Spray of polished stainless steel vice plates, as a function of reducing plate gap, (FIG. 6C) has revealed that sprays may infiltrate mm-scale gaps without change in coating thickness, but that at smaller gaps, screening effects emerge.

Some Major Regimes of Electrospray Deposition

Figure s 7A, 7B, 7C, 7D, 7E, 7F, 7G, 7H, and 7I summarize major regimes of electrospray deposition of an insulating polymer solution shown schematically and in top-down optical images of characteristic results.

According to an electrowetting regime of electrospray deposition of an insulating polymer solution, the solution has enough mobility to spread along the surface and to dissipate charge. FIG. 7A is an example illustrating a schematic diagram of an electrospray deposition of an insulating polymer solution according to an electrowetting regime. FIG. 7B is an example illustrating a top-down optical image of an electrospray deposition of an insulating polymer solution according to an electrowetting regime. FIG. 7C is an example illustrating a top-down optical image of an electrospray deposition of an insulating polymer solution according to an electrowetting regime.

According to a charged melt regime of electrospray deposition of an insulating polymer solution, the solution and charge may be less mobile and may form electrohydrodynamic instabilities to allow conduction through the film by localized thinning. FIG. 7D is an example illustrating a schematic diagram of an electrospray deposition of an insulating polymer solution according to a charged melt regime. FIG. 7E is an example illustrating a top-down optical image of an electrospray deposition of an insulating polymer solution according to a charged melt regime. FIG. 7F is an example a top-down optical image of an electrospray deposition of an insulating polymer solution according to a charged melt regime.

Because of the charged nature of the droplets, electrospray deposition of continuous films requires continuous dissipation of the delivered charge. Therefore, there is an inherent contradiction to spraying insulating coatings onto conductive surfaces, since even a thin layer of insulator should "clad" the conductive surface and stop the spray in a thickness-limited fashion. Despite this, there are countless examples of insulating coatings being sprayed to mm-thickness. One need look no further than electrostatic painting as employed by all major automotive and aerospace companies. Both the electrowetting and the charged melt regimes rely on flow-enabled charge transport to redistribute charges spatially until such time as they can dissipate through diffusive conduction or ambient humidity. This flow either flattens the fluid (electrowetting) or forms cellular instabilities (charged melt). Electrowetting and charged melt regimes cover a large majority of reported results for polymer SLED and all electrostatic spray of paints and waterborne pesticides, explaining the lack of SLED effects in these results.

Figure 7I:
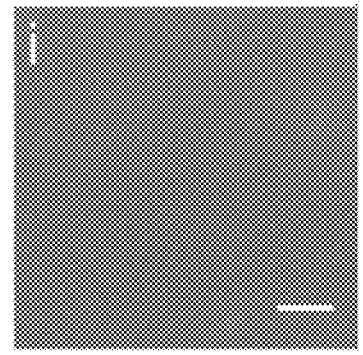
FIG. 7I is an example according to various embodiments illustrating a top-down optical image of an electrospray deposition of an insulating polymer solution according to a charged melt regime.

Various embodiments relate to a thickness-limited SLED regime of electrospray deposition of an insulating polymer solution. In such a regime, charge cannot dissipate and repels arrival of further material, resulting in rapid spreading of uniform sparse films that can be densified into microscale coatings. FIG. 7G is an example according to various embodiments illustrating a schematic diagram of an electrospray deposition of an insulating polymer solution according to a charged melt regime. FIG. 7H is an example according to various embodiments illustrating a top-down optical image of an electrospray deposition of an insulating polymer solution according to a charged melt regime. FIG. 7I is an example according to various embodiments illustrating a top-down optical image of an electrospray deposition of an insulating polymer solution according to a charged melt regime. To access the thickness-limited regime, the polymer-loaded droplets, which need to be insulating in nature, arrive as a "dry" solvent-free spray (or have a dry surface at the substrate) at a temperature below their softening temperature such as to not allow for interfacial charge transport. These drying droplets create a loosely-connected porous film that can be densified by heat treatment as with other powder sprays. It should be noted that these particles are slightly fused together by the solvent, diminishing the powder losses observed in similar phenomena that occur in electrostatic spray.

FIG. 8A is an example according to various embodiments illustrating central thickness as a function of time for PS sprayed from butanone at 35° C. (blue trace), 70° C. (red trace), and 100° C. (green trace), as compared to a charged melt spray (magenta trace). SLED behavior is evident in the lower-temperature sprays at an onset of ~4 mg. Because of the charge buildup, the newly-arriving spray is repelled by particles that previously arrived. According to various embodiments, polymer films of about 2 to about 4 μm may be obtained with a high degree of process repeatability, but with sensitivity to temperature. Furthermore, according to various embodiments, at a given temperature, the coating thickness may grow only as a function of the polymer mass delivered and may be relatively insensitive to other parameters, most notably solids loading and flow rate. FIG. 8B is an example according to various embodiments illustrating central thickness for PS-butanone spray as a function of flow rate for 4 mg of total PS spray mass at 35° C. (blue data) and 70° C. (red data) displaying the stability of the thickness-limited effect.

A critical implication of accessing the thickness-limited regime is that it allows for a much greater ability to coat 3D structures with high uniformity. FIG. 8C is an example according to various embodiments illustrating a photograph of a pewter statue conformally coated with a PS film before (left) and after (right) thermal leveling. FIG. 8C shows a result of a 3D statue possessing a PS coating with a narrow range of from about 4 to about 17 μm of coating thicknesses before and after leveling. These coatings were non-line-of-sight and made more uniform by increased distance and, therefore, were relatively insensitive to pointing error. Indeed, while coating, the needle was pointed away from the structures. This differs from the industrially-practiced electrostatic spray, where the combined effects of the carrier gas and electric field transports the droplets. Because of this, a thickness-limited applicator would not need accurate or steady pointing, particularly at longer distances. FIG. 8D is an example according to various embodiments illustrating a photograph of coatings applied to 3D objects with microscale thicknesses, demonstrating the capabilities of thickness-limited SLED technique to follow complex 3D surface structures.

Additive manufacturing (AM) may be employed to provide a previously unattainable level of control over the structures in three dimensions. More recently, using stimuli-responsive materials in additive manufacturing has created new opportunities to dynamically tune shapes and properties of a printed material without changing its chemical compositions. This approach has been recently termed 4D printing, with the 4th dimension being time. However, it is an inherently serial process—to integrate multi-functionality into a single 3D structure, complex processes are required to pattern the individual components, making it challenging to precisely control and program materials behaviors, particularly at the micro- and nanoscales. Meanwhile, the incorporation of active materials into the entire build can be wasteful since many functionalities, such as sensing, actuation, and optical displays, often require only a surface-level response.

Various embodiments combine self-limiting electrospray deposition (SLED), a sub-technique of electrospray deposition (ESD), and stereolithography or nozzle-based additive manufacturing (AM) of active materials. This represents a new paradigm of 3D printing, allowing seamless integration of multifunctionality and programmed active actuation and passive environmental responses, all dictated by functional surface coatings. Materials for 3D printing may include polymers, monomers, and oligomers formed thermoplastically or crosslinked with chemical additives, such as polylactic acid, acrylonitrile butadiene styrene copolymer, nylons, polyethylene terephthalate, high-density polyethylene, polycarbonate, thermoplastic urethane, poly(ethylene glocol) diacrylate (PEGDA), 1,6-hexanediol diacrylate, poly (ethylene glocol) dimethacrylate, poly acrylic acid, poly(N-isopropylacrylamide), polyacrylamide, tert-butyl acrylate, bisphenol A ethoxylate, dimethacrylate, bisphenol A ethoxylate diacrylate, benzyl methacrylate, poly(urethane) acrylate, di(ethylene glycol) dimethacrylate, gelatin, alginate, chitosan, chitosan; metals and alloys as inks powders or filaments, such as aluminum, copper, titanium, nitanol incolnel, eGaIn, Field's metal, galinstan, magnesium, silver, gold, platinum-based bulk metallic glasses, zirconium-based bulk metallic glasses, gold-based bulk metallic glasses, and Ti-6Al-4V; and ceramic powders, alumina, silica, titiania, silicon nitride, silicon carbide, barium strontium titanate, zirconia titanate, barium titanate.

By separating the surface and bulk patterning, sophisticated logic can be incorporated by synergistic spray-print coupling to pre-program responsive materials with feedback loops. For example: sensing coatings from e.g. metallic or ceramic nanoparticles providing environmental information to control electronics; shape changing porous coatings from e.g. thermal gels or shape memory polymers to initiate surface thermo- and optomechanical actuation or regulate solvomechanical bulk responses like a valve. A demonstration of the first steps of such regulation is shown in FIG. 12, where a sprayed coating comprising polystyrene and polystyrene-block-polybutadiene-block-polystyrene copolymer (commercial KRATON D1102) with a small amount of red dye in a 1:1 ratio onto a 3D printed structure formed of polyethylene glycol diacrylate (PEGDA 250) crosslinked with commercial photoinitiators and sensitizers in a stereolithographic fashion is actuated in a 4D manner. The yellow trace and image represent the swelling behavior of an uncoated sample and the red trace and image represent the swelling behavior of a coated structure when placed from an environment of 50% relative humidity into an environment of 80% relative humidity. The coating changes both the extent and rate of humidity-induced actuation. The next step in such a process would be to add a responsive element to the coating such that it could change its mechanical or mass-transport properties to change the extent and rate of swelling respectively.

Self-Limiting Electrospray Deposition and Additive Manufacturing

Various embodiments provide methods and devices that incorporate self-limiting electrospray deposition into additive manufacturing as a post-processing method to add coatings to 3D printed structures. Such embodiments may provide various functional coatings, including, but not limited to: anti corrosion barriers, anti-fouling films, photoactive films, mechanically active films, porous coatings, and combinations thereof. Various embodiments provide sprays that can cover complex 3D surfaces with porous polymer coatings. The densified thickness of these coatings can be as low as about 1 μm, which is well below the resolution of most additive manufacturing techniques. Such embodiments provide the first spray approach that is compatible specifically with 3D objects. Other advantages and applications include adding corrosion barriers to metal components produced by additive manufacturing, adding anti-inflammatory or other medicines to medical implants produced by additive manufacturing, toughening the interface of fused deposition modeling (FDM) printed parts. Furthermore, other more exploratory applications exist, including but not limited to sensing and catalysis, such as adding highly active catalytic nanoparticles to printed scaffolds.

FIG. 9 is an example according to various embodiments illustrating a method 90 and device 91 for post-print spray of a structure 92. The device 91 may apply a spray 93 to the structure 92. The structure 92 may be a 4D structure, meaning that it could be formed of a material that changes shape in response to a stimulus, such as thermo-responsive or humidity-responsive materials, including humidity-responsive polymers as described according to various embodiments. As already described according to various embodiments the structure 92 may be coated using thickness-limited, electrospray deposition. The structure 92 may be an electrically conductive target and the method 90 may include exposing the structure 92 to an incident spray 93 comprising a thermo-responsive polymer solution, in the presence of an electric field. As described according to various other embodiments, the method 90 may further include allowing the solution temperature to deviate toward the surface temperature of the structure 92 to a deposited temperature at which the non-conductive polymer is immobile. The method may further include allowing the non-conductive polymer to accumulate on the structure 92 to form a layer, having a thickness sufficient to repulse the incident spray 93.

The thermo-responsive polymer solution may be a blend of polymer solutions that are individually not compatible with the method, but when blended, are compatible with the method. According to various embodiments the blends of thermo-responsive polymer solution may include a first solution of some organic molecule that would not produce a thickness-limited spray and a second solution that acts to modify the behavior of the first solution during evaporation, by, for example, increasing the glass transition of the solid ingredient of the first solution. The first solution may be a trehalose in ethanol and water mix solution. Trehalose is a sugar consisting of two molecules of glucose. It is also known as mycose or tremalose. Some bacteria, fungi, plants and invertebrate animals synthesize it as a source of energy, and to survive freezing and lack of water. Trehalose may also have notable ability to stabilize the protein structure and biomembranes of sperm in a dry state. The trehalose solution may include about 80% by volume of ethanol. The trehalose solution may include less than about 1% by mass of trehalose. The second solution may be a genomic salmon sperm DNA in ethanol and water solution. The genomic salmon sperm DNA solution may include about 80% ethanol by volume. The genomic salmon sperm DNA solution may include about less than 1% by mass of the genomic salmon sperm DNA. Overall, the solution may include ethanol in an amount of from about 20 to about 100 percent by weight; water in an amount of from about 0 to about 95 percent by weight; a sugar in an amount of from about 0 to about 5 percent by weight; and a DNA component in an amount of from about 0 to about 5 percent by weight.

FIG. 10 shows evidence of self-limiting behavior being enhanced at an optimal blending, at point 1, of the thermo-responsive polymer solution described above comprising ethanol, water, a trehalose solution, and a genomic salmon sperm DNA solution when the thicknesses of films sprayed for one hour were normalized by the total mass of materials sprayed.

FIG. 11 is an example according to various embodiments illustrating a chart showing results obtained for a sprayed coating comprising polystyrene and polystyrene-block-polybutadiene-block-polystyrene copolymer with a small amount of red dye in a 1:1 ratio on a 3D printed structure formed of polyethylene glycol diacrylate crosslinked with commercial photoinitiators and sensitizers in a stereolithographic fashion is actuated in a 4D manner;

Various embodiments provide methods and devices for thickness-limited electrospray additive manufacturing. The methods and devices according to such embodiments incorporate self-limiting electrospray deposition (SLED) into 3D printing or additive manufacturing. These embodiments make the additive manufacturing process inherently more efficient. Efficiency improvements include decreased manufacturing time by the elimination of steps as well as a reduction in material waste. These embodiments also impart desirable benefits to the manufactured item not otherwise obtainable, including but not limited to an improved coating uniformity.

Micro/nanoscale conformal coatings can be applied in either the molecular or condensed state. Molecular deposition techniques, such as electrodeposition, vacuum deposition, atomic layer deposition, or chemical vapor deposition, generally require either a fluid bath or high-vacuum to apply and may also require high-temperature precursor processing. This offsets their cost-benefit considerations and limits the size of the component that can be coated. Condensed deposition techniques, such as dip coating, spin coating, and brush or blade coating struggle with 3D surfaces and result in capillary or shadowing effects. Various embodiments provide the capability to deposit precise micro/nanoscale coatings onto 3D surfaces in a non-bath/vacuum method, representing a huge cost savings for these coatings.

Coating Non-Conductive Targets

According to various embodiments, the inverse problem of conductive coatings on insulating surfaces is additionally of interest. This is a common issue in electroplating, where the metallization of insulating surfaces, such as polymers, is possible, but requires the application of a thin layer of conductive material, such as electroless silver or a colloidal paint. The requisite charge transport for SLED processes is much less than electroplating, as evidenced by the use of electrostatic spray in the coating of plants with pesticides. In such systems, the absorbed water at the surface of the plant is sufficient to dissipate the charge. This is because the charge density of SLED is much less than electroplating (~1 micoAmperes per square centimeter, $\mu A/cm^2$, vs. ~1 milli-Amperes per square centimeter, $mA/cm^2$). Thickness-limited sprays may be used to coat hydrogel materials (See: FIG. 8D), provided that the hydrogel is infused with ionized water. To this end, according to various embodiments, making insulating surfaces compatible for SLED may be achieved by using much thinner coatings of conductive material than required for electrodeposition or even through the use of a hydrophilic layers infused with ionized water.

Any of the methods described herein may be modified to include a step of making the surface compatible with SLED by soaking the target in a conductive liquid or exposing the target to a conduction-inducing environment.

Figure 12A:
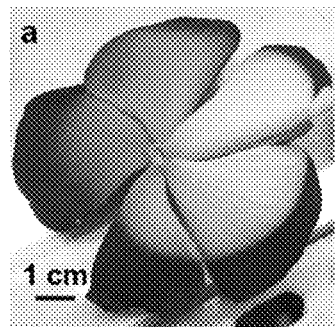
FIG. 12A is an example according to various embodiments, illustrating coatings on water-infused living substrates, in this case a flower.
Figure 12B:
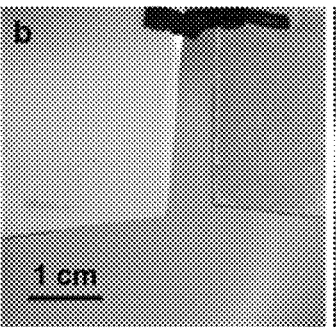
FIG. 12B is an example according to various embodiments, illustrating a side-by-side comparison of a hydrophilic polymer surface (silane-modified polyethylene terephthalate), which may be coated in ambient humidity, and a hydrophobic polymer (polyimide) that is not coated.
Figure 12C:
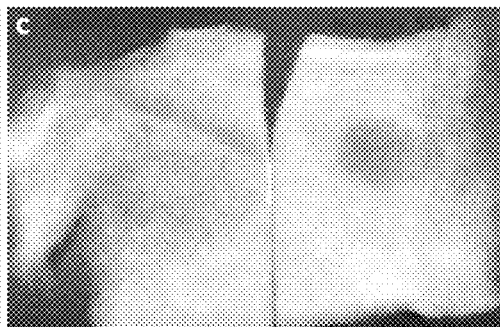
FIG. 12C is an example according to various embodiments, illustrating an insulating surface of rayon cloth being made more compatible with SLED by increasing the ambient humidity as may be seen by the smaller size of the spray spot.

FIGS. 12A, 12B, 12C show examples of hydrophilic surfaces infused with water or effected by humidity. FIG. 12A is an example according to various embodiments, illustrating the ability to form SLED coatings on water-infused living substrates, in this case a flower. FIG. 12B is an example according to various embodiments, illustrating a side-by-side comparison of a hydrophilic polymer surface (silane-modified polyethylene terephthalate), which may be coated in ambient humidity, and a hydrophobic polymer (polyimide) that is not coated. FIG. 12B demonstrates that it is not a universal behavior that materials may be made more compatible with SLED by increasing the ambient humidity. FIG. 12C is an example according to various embodiments, illustrating an insulating surface of rayon cloth being made more compatible with SLED by increasing the ambient humidity as may be seen by the smaller size of the spray spot. This phenomenon has been previously reported for conductive surfaces, but not insulating surfaces.

EXAMPLES

The following examples are put forth to provide those of ordinary skill in the art with a complete disclosure and description of how to perform the methods, how to make, and how to use the compositions and compounds disclosed and claimed herein. Efforts have been made to ensure accuracy with respect to numbers (e.g., amounts, temperature, etc.), but some errors and deviations should be accounted for. The purpose of the following examples is not to limit the scope of the various embodiments, but merely to provide examples illustrating specific embodiments. While a majority of these tests have been conducted with thermoset resin, the success of a laminate transfer has also been demonstrated. All of these SNT transfers have passed standard scotch tape test and the coating interface has so far appeared to be more mechanically durable than the substrates.

Example 1

Figure 13A:
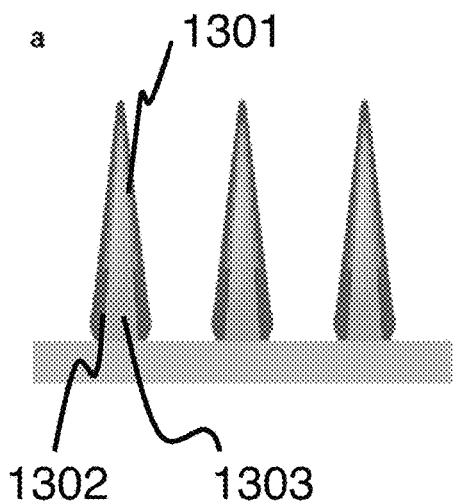
FIG. 13A is an example according to various embodiments illustrating a schematic cross section of a two-layer spray on 3D object.
Figure 13B:
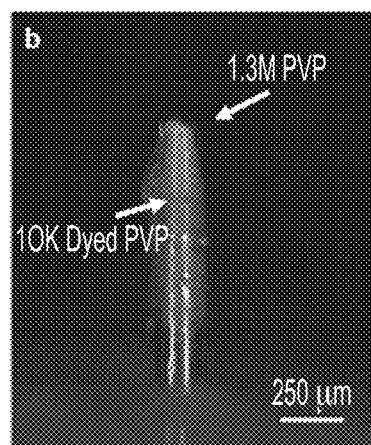
FIG. 13B is an example according to various embodiments illustrating 3D spray of two different molecular weights of PVP.
Figure 13C:
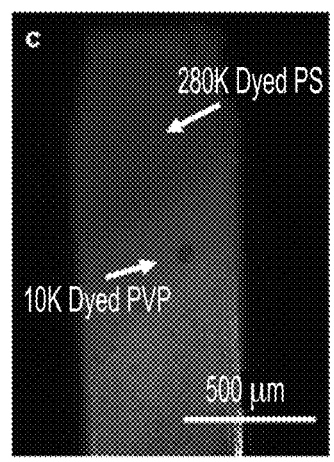

This example demonstrates that multilayer sprays may be sprayed onto 3D geometries. FIG. 13A is an example according to various embodiments illustrating a schematic cross section of a two-layer spray on 3D object 1303. The object 1303 may be coated with a first layer 1301 and a second layer 1302. Additional layers may also be applied using the techniques described according to various embodiments. FIG. 13B is an example according to various embodiments illustrating 3D spray of two different molecular weights of PVP. FIG. 13B is an example according to various embodiments illustrating 3D spray using PS and then PVP.

Example 2

Figure 10:
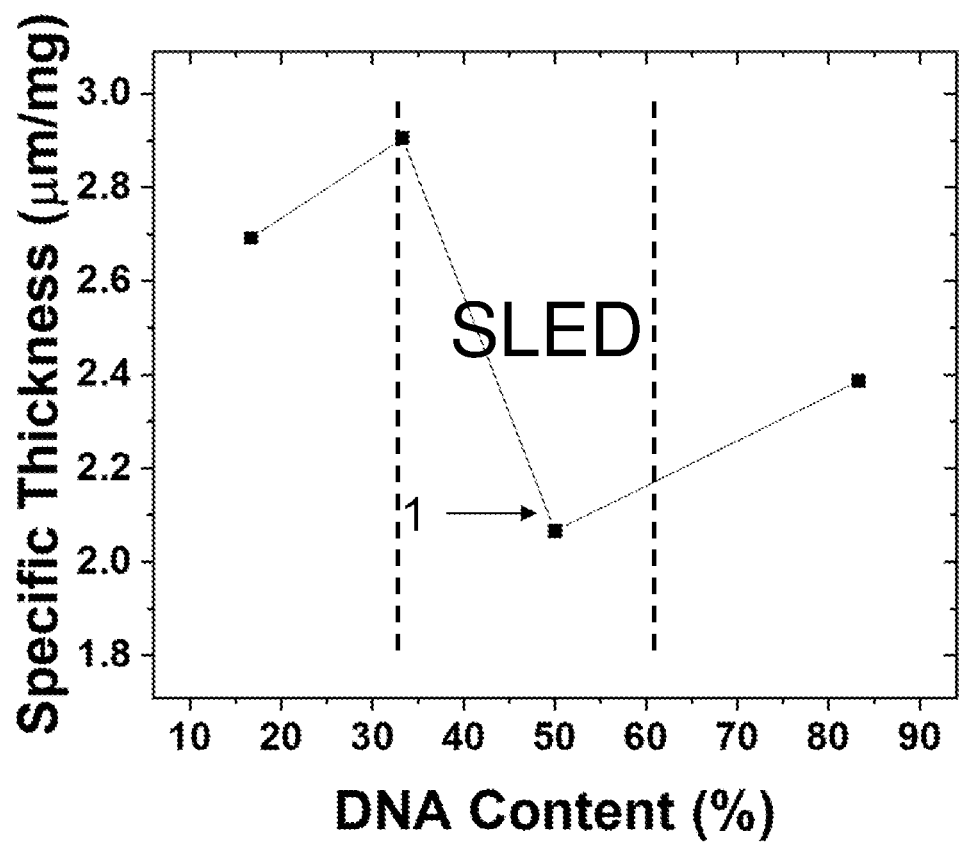
FIG. 10 is an example according to various embodiments illustrating a chart showing evidence of self-limiting behavior being enhanced at an optimal blending.
Figure 11:
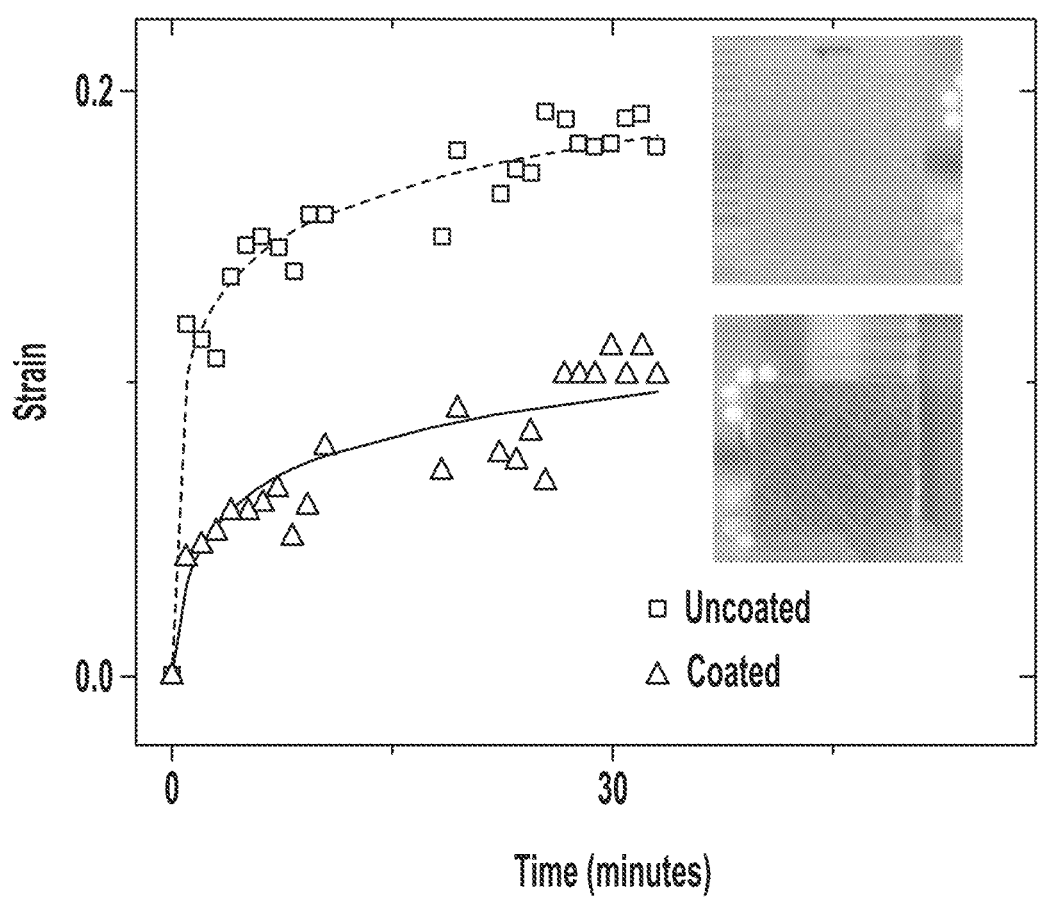
FIG. 11 is an example according to various embodiments illustrating a chart showing results obtained for a sprayed coating comprising polystyrene and polystyrene-block-polybutadiene-block-polystyrene copolymer with a small amount of red dye in a 1:1 ratio on a 3D printed structure formed of polyethylene glycol diacrylate crosslinked with commercial photoinitiators and sensitizers in a stereolithographic fashion is actuated in a 4D manner.
Figure 14:
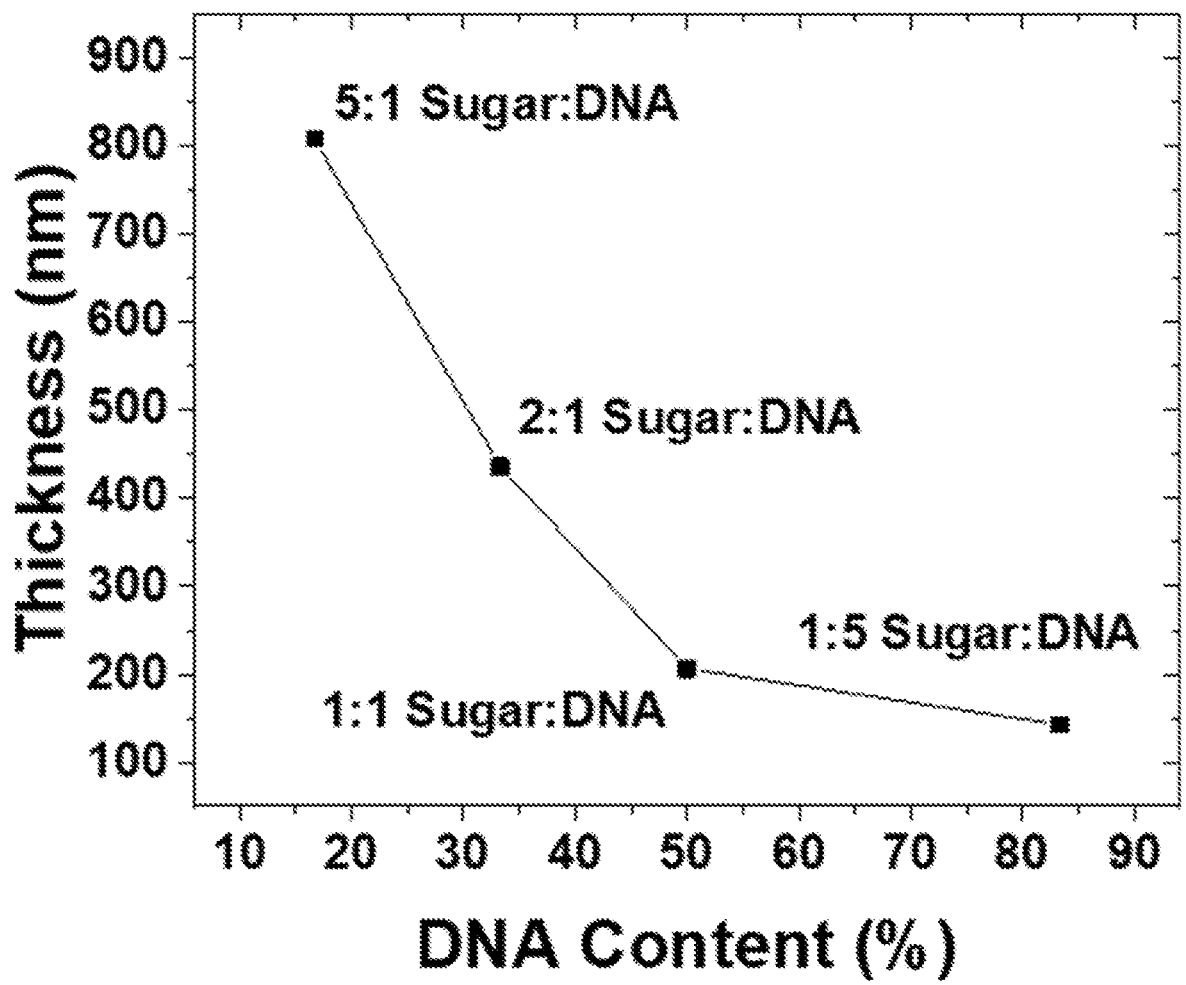
FIG. 14 is an example according to various embodiments illustrating a chart of thickness versus DNA content.

One purpose of this example is to demonstrate that according to various embodiments the spray solution may be a blend of components that are individually not capable of being electrosprayed to form a self-limiting layer, but when blended, are capable of being electrosprayed to form a self-limiting layer. According to various embodiments the blends of thermo-responsive polymer solution may include a first solution of some organic molecule that would not produce a thickness-limited spray and a second solution that acts to modify the behavior of the first solution during evaporation, by, for example, increasing the glass transition of the solid ingredient of the first solution. The first solution may be a trehalose in ethanol and water mix solution. Trehalose is a sugar consisting of two molecules of glucose. It is also known as mycose or tremalose. Some bacteria, fungi, plants and invertebrate animals synthesize it as a source of energy, and to survive freezing and lack of water. Trehalose may also have notable ability to stabilize the protein structure and biomembranes of sperm in a dry state. The trehalose solution may include about 80% by volume of ethanol. The trehalose solution may include less than about 1% by mass of trehalose. The second solution may be a genomic salmon sperm DNA in ethanol and water solution. The genomic salmon sperm DNA solution may include about 80% ethanol by volume. The genomic salmon sperm DNA solution may include about less than 1% by mass of the genomic salmon sperm DNA. Overall, the solution may include ethanol in an amount of from about 20 to about 100 percent by weight; water in an amount of from about 0 to about 95 percent by weight; a sugar in an amount of from about 0 to about 5 percent by weight; and a sperm DNA component in an amount of from about 0 to about 5 percent by weight. FIG. 14 is an example according to various embodiments illustrating a chart of thickness versus DNA Content. FIG. 10 is an example according to various embodiments illustrating specific thickness versus DNA Content.

Example 3

Figure 15A:
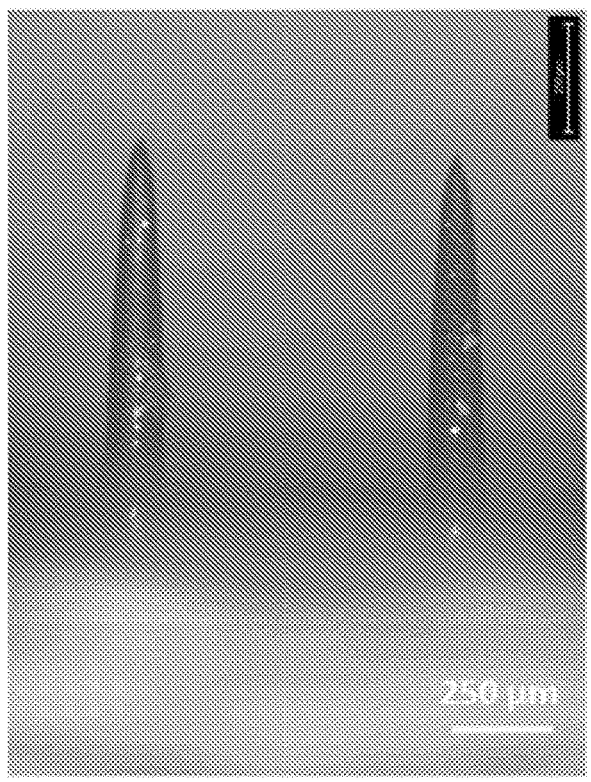
FIG. 15A is an example according to various embodiments illustrating the results obtained by electrospraying 100 μg of DNA.
Figure 15B:
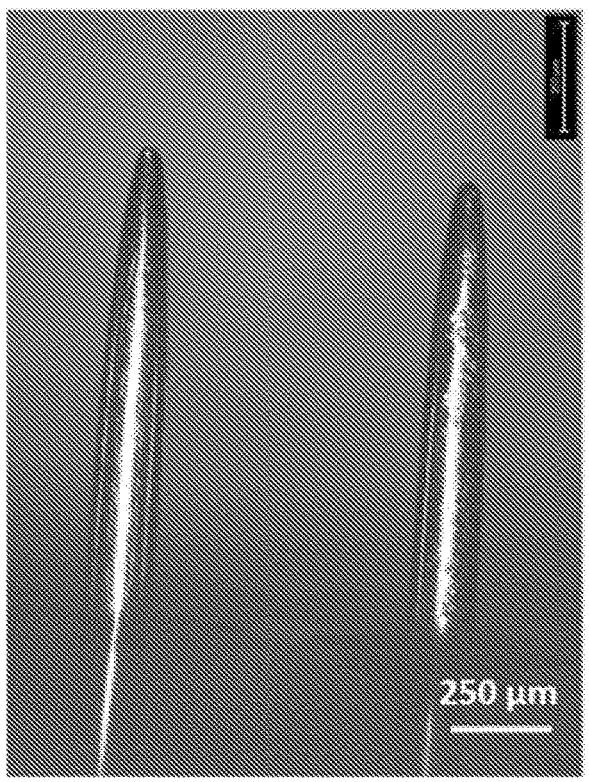
FIG. 15B is an example according to various embodiments illustrating the results obtained by electrospraying 2:1 by mass trehalose and Salmon DNA onto a 3D surface with a small quantity of dye and 50 μg of DNA.

One purpose of this example is to demonstrate that according to various embodiments the spray solution may be a blend of components that are individually not capable of being electrosprayed to form a self-limiting layer, but when blended, are capable of being electrosprayed to form a self-limiting layer. FIG. 15A is an example according to various embodiments illustrating the results obtained by electrospraying 100 μg of DNA. FIG. 15B is an example according to various embodiments illustrating the results obtained by electrospraying 2:1 by mass trehalose and salmon sperm DNA onto a 3D surface with a small quantity of dye and 50 μg of DNA. By comparing FIG. 15A and FIG. 15B, it can be seen that the coating of FIG. 15B, comprising 2:1 by mass trehalose and salmon sperm DNA, is much thicker than the pure DNA spray for even double the total DNA mass, where the coating can only be seen as a blue residue due to the high mobility of the electrowetting spray on arrival.

Figure 15C:
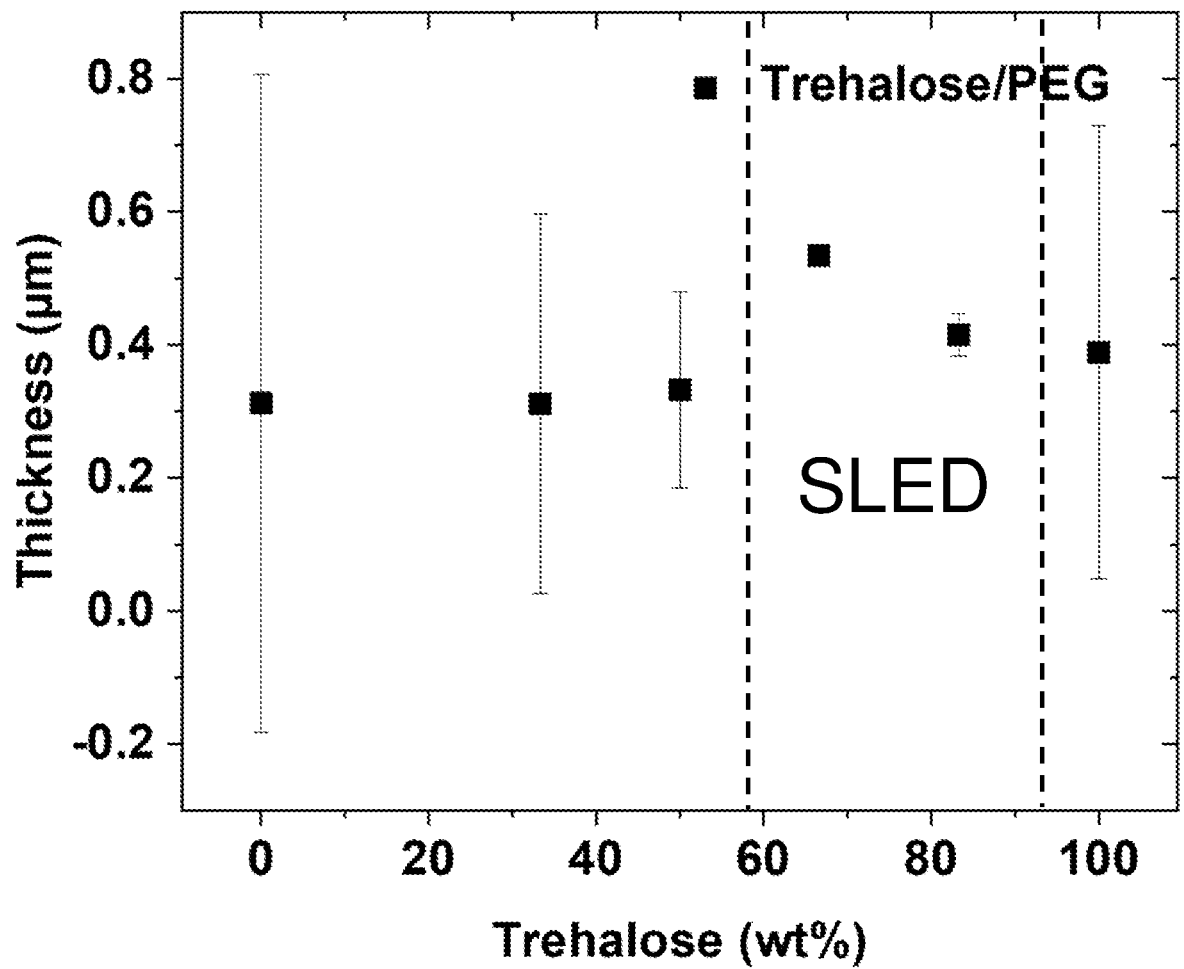
FIG. 15C is an example according to various embodiments illustrating a chart of thickness versus trehalose content.

To show that this behavior is not unique to the specific blend, trehalose and poly(ethylene glycol) (PEG, Sigma Adrich 400 Da) were diluted in water/ethanol (60 wt %/40 wt %) in separate 1 wt % solutions for spray. These two precursor solutions were mixed and sprayed in different ratios (1:0, 5:1, 2:1, 1:1, 1:2, 0:1). The spray voltage was controlled ~6.4 kilovolts and the focusing ring's voltage was between 2.6 kilovolts ~2.8 kilovolts. All samples were sprayed on silicon wafer (10 cm diameter) at 0.2 milliliters/hour for 30 min with a spray distance of 4 cm. Samples were post-smoothed for 30 seconds by treatment in a water bath after spraying for measuring thickness. A Filmetrics reflectometer (Filmetrics 40EX) was used for measuring thickness of blend films by scanning 100 points across the central centimeter the sprayed thin film samples. These results are reported in FIG. 15C. The roughness in these measurements for pure trehalose and high PEG fractions is indicative of non-self-limiting behaviors, revealing a narrow range of self-limiting compositions, likely due to disturbance of the crystal structure of the trehalose by blended PEG.

Example 4

One purpose of this example is to demonstrate multilayer templated sprays. According to various embodiments, a pre-existing polymer layer may affect the SLED coating thickness to manufacture bilayer coatings. Various embodiments allow the creation of near-field masks through the use of pre-deposited polymer coatings of differing, patterned thicknesses. As example polymer pre-layers, this example presents polystyrene (PS) deposited through spin coating and parylene C thin films deposited through chemical vapor deposition, both on silicon wafers. PS is a commodity polymer that has been repeatedly employed for SLED and laser dewetting experiments as a glassy polymer that can be easily processed and parylene is a ubiquitous polymer for highly-controlled conformal coatings. Sprays of poly(vinyl pyrrolidone) PVP, which was selected for its high glass transition (~170° C.), were sprayed onto these films. To also demonstrate the effects of in-plane templating, microhole arrays with different widths formed in a PS thin film were made by laser processing and sprayed with 1 wt % PVP in ethanol.

The SLED system was set up in the controllable humidity chamber where the humidity in chamber was set to 10~20% and chamber's temperature was maintained at 27° C. Spray solution was loaded into a disposable syringe (NORM-JECT®, 6 mL) and delivered by syringe pump, as the liquid passed through the stainless-steel needle, the power supply provided an adjustable high voltage and then the charged drops were deposited onto the collection substrate using the steel ring's focusing. A 10 cm circular silicon wafer (University Wafer, Inc., N/Ph) was clipped to a grounded wire placed underneath the polymer chip to prevent charge buildup in the surrounding area. All silicon wafers were cleaned by ethanol and acetone and reused after each spray.

The microhole array on PS thin film was prepared by laser dewetting. A 35 nm gold film was sputtered a on a 1-mm thick glass substrate using an Anatech Ltd Hummer X gold sputter. A 1400 nm PS film was then spun. The thickness of the 1400 nm PS film was the thickest film that can be easily dewetted, using a 20 wt % solution in PGMEA and post-baked for 10 minutes at 70° C. for smoothing and removal of residual solvent. Laser dewetting was carried out using 532 nm continuous wave light from a Laser Quantum Opus 6W diode laser controlled by a MATLAB program and custom optical setup. The laser was shuttered by a Isomet IMAD-T110L-1.5 acousto-optic modulator, circularly polarized and passed through a series of optics, including a final 0.25 numerical aperture objective lens to focus the spot onto the gold heating layer. A green dielectric mirror was placed before the objective to feed into a camera to allow imaging during experiments with a red light source placed above the sample. A partially-reflecting mirror was placed in the beam path before the objective lens to reflect light into a Thorlabs S121C power meter which read the laser's power output. The samples rested on a Mad City Labs MCL-MOTNZ stage with a 1"×1" lateral movement fitted with a piezo-controlled axial stage with 200 nm range. This stage allowed for translation in 3 axes when FLaSk dewetting. The dot array was dewetted by pulsing the laser at 1-second intervals with powers ranging from 40-150 mW.

Figures 16A, 16B:
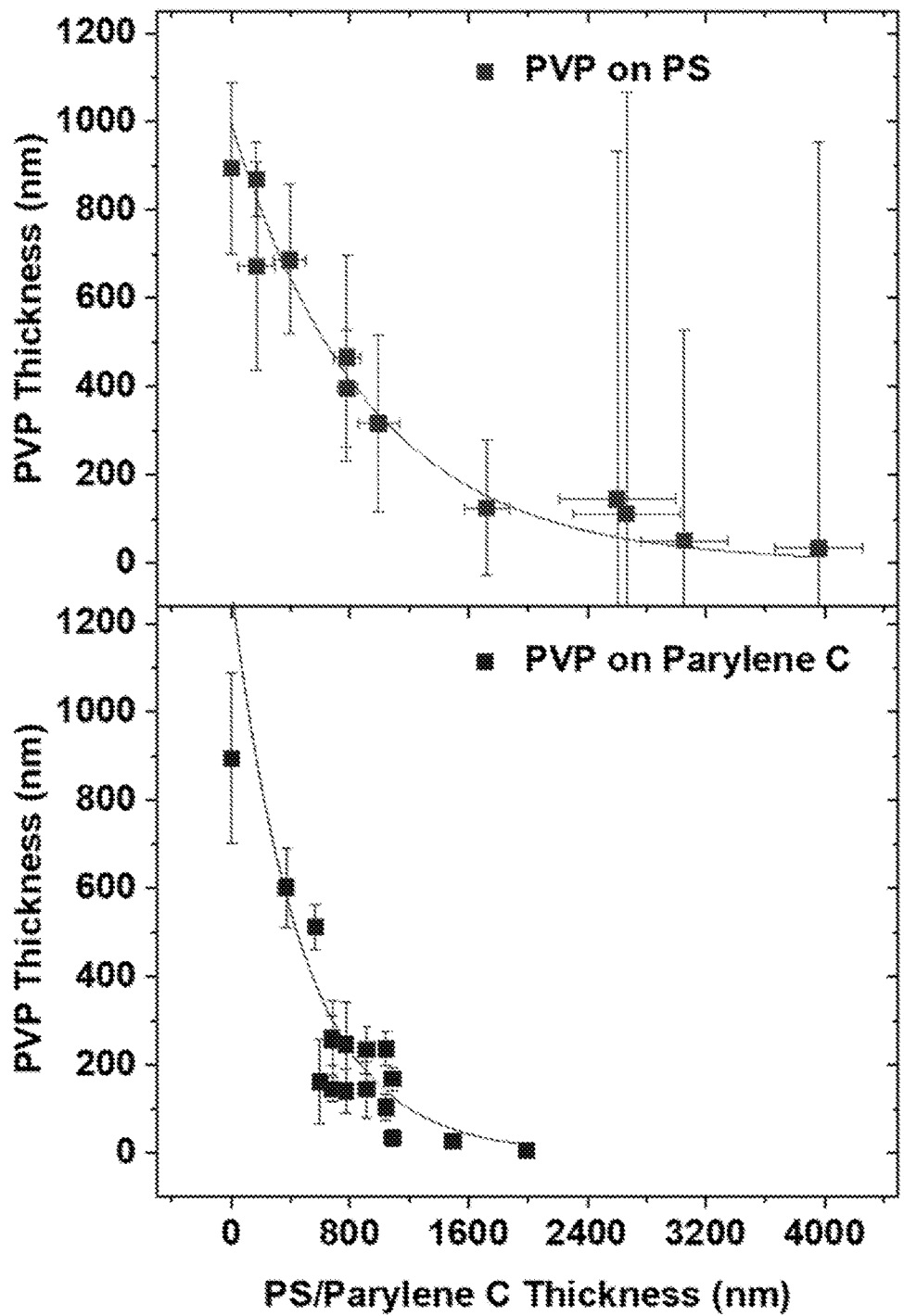
FIG. 16A is an example according to various embodiments illustrating 1 wt % PVP sprayed at 0.1 mL/hr for 60 min in humidity chamber at 27° C. with different thickness of PS-on-silicon substrates.
FIG. 16B is an example according to various embodiments illustrating 1 wt % PVP sprayed at 0.1 mL/hr for 60 min on Parylene C-on-silicon substrates with different thickness.

To evaluate the size of the laser hole features before and after spray, a Dimension ICON atomic force microscope (AFM) was employed in tapping mode with an 18 kHz silicon tip. FIG. 16A is an example according to various embodiments illustrating 1 wt % PVP sprayed at 0.1 mL/hr for 60 min in humidity chamber at 27° C. with different thickness of PS-on-silicon substrates. At thick PS thicknesses, the PVP becomes difficult to distinguish from the roughness of the sample leading to large deviations in the apparent thickness. The red trace is an exponential decay fit of y=995.4 nm*exp(−x/917.2 nm). FIG. 16B is an example according to various embodiments illustrating 1 wt % PVP sprayed at 0.1 mL/hr for 60 min on Parylene C-on-silicon substrates with different thickness. Due to the conformal nature of vapor deposition, the horizontal error bars are not visible. The blue trace is an exponential decay fit of y=1279.8 nm*exp(−x/470.2 nm).

Figure 17A:
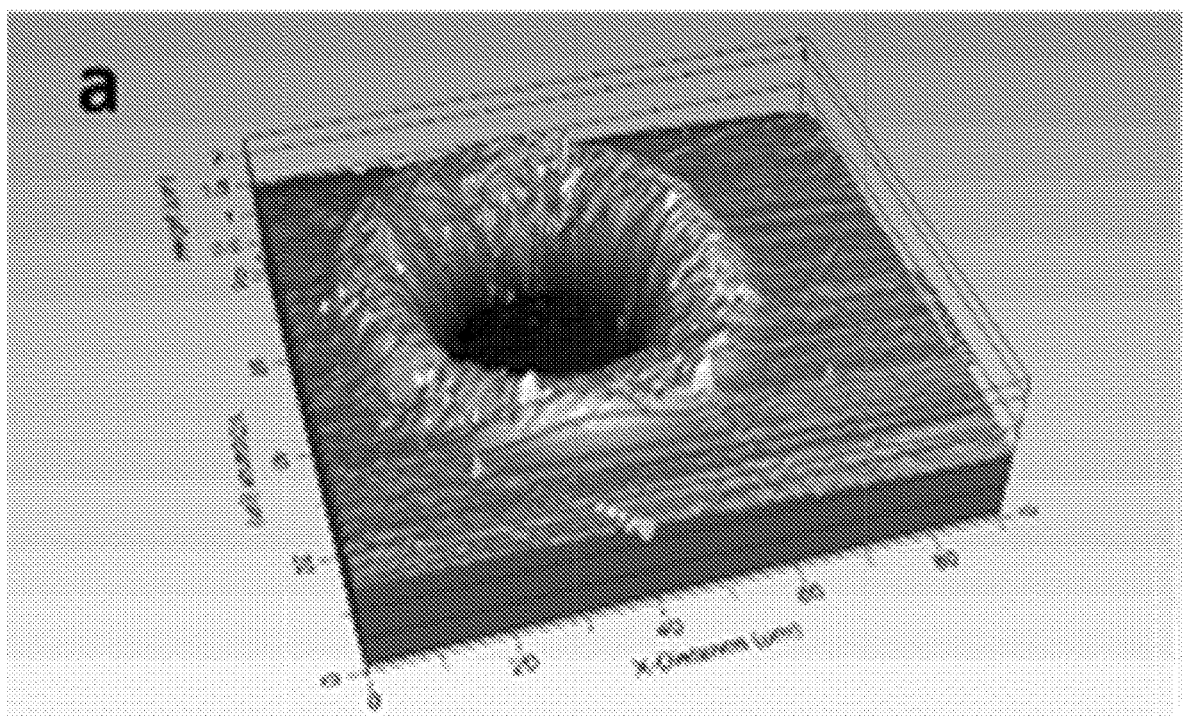
FIG. 17A is an example according to various embodiments illustrating a 3D map of a 90 mW laser feature before spray with PVP.
Figure 17B:
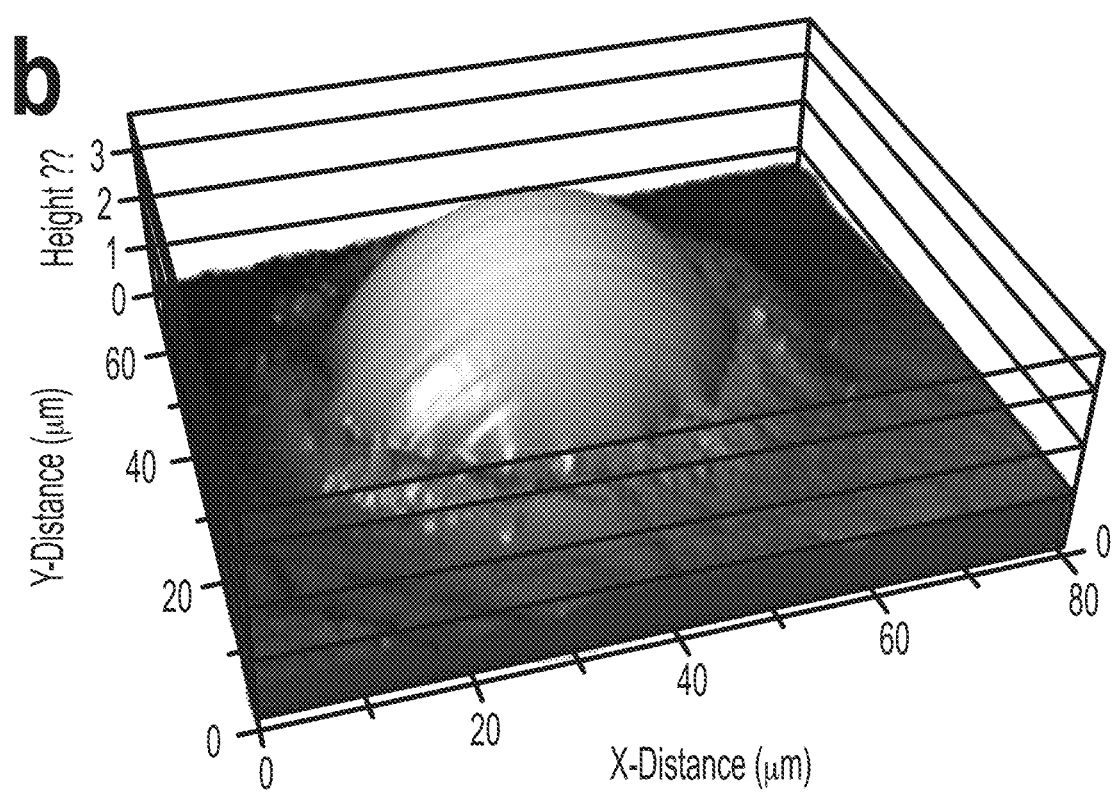
FIG. 17B is an example according to various embodiments illustrating a 3D map, of a 90 mW laser feature after spray with PVP.
Figures 17C, 17D:
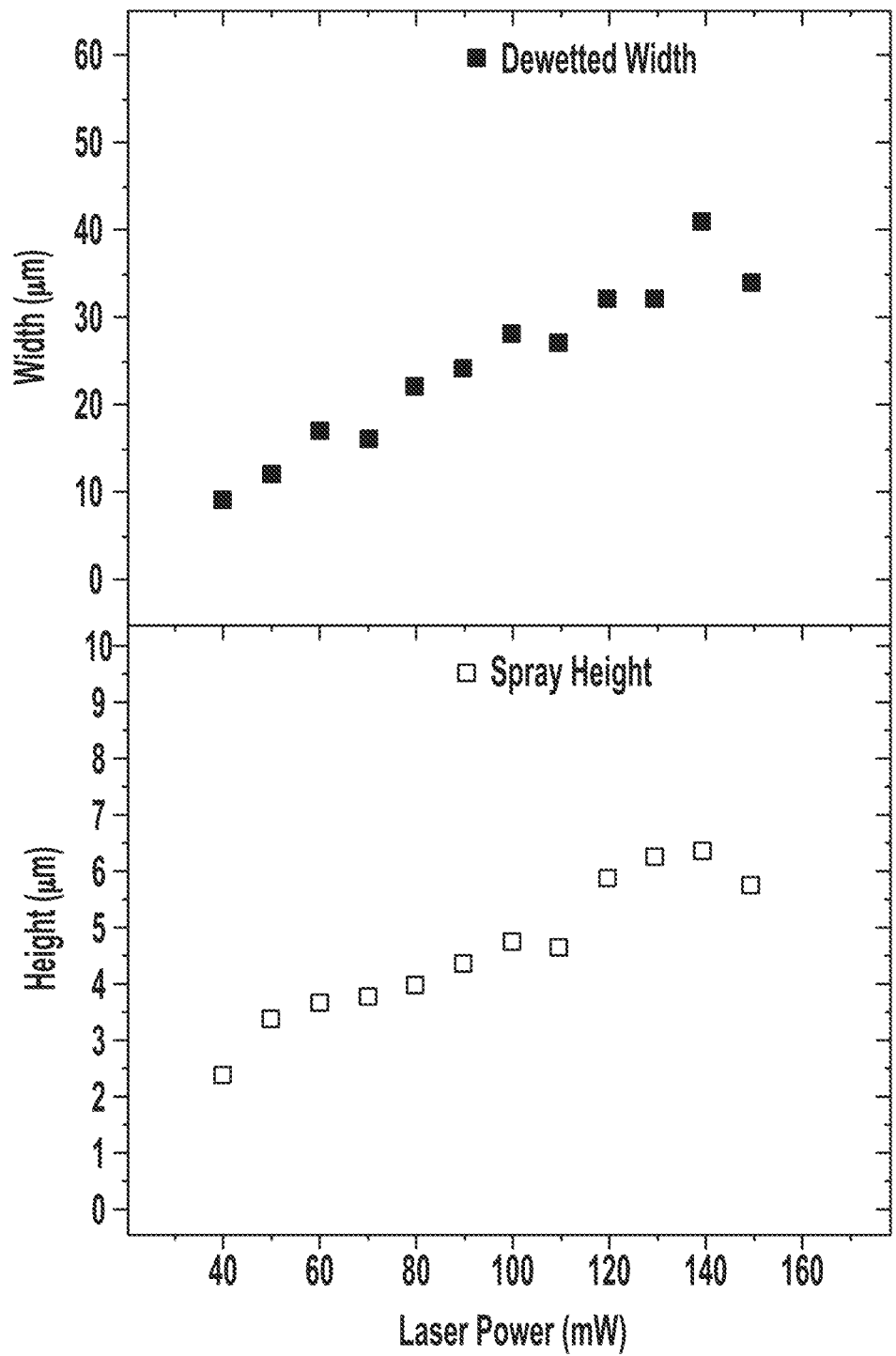
FIG. 17C is an example according to various embodiments illustrating the width of the dewetted feature plotted against laser writing power determined from AFM profiles.
FIG. 17D is an example according to various embodiments illustrating the height of the PVP spray feature after smoothing in ethanol vapor determined from AFM profiles.

FIG. 17A is an example according to various embodiments illustrating a 3D map of a 90 mW laser feature before spray with PVP. FIG. 17B is an example according to various embodiments illustrating a 3D map, of a 90 mW laser feature after spray with PVP. FIGS. 17A and 17B were plotted with ProfilmOnline. FIG. 17C is an example according to various embodiments illustrating the width of the dewetted feature plotted against laser writing power determined from AFM profiles. All dewetted features extended to the bottom of the gold film. FIG. 17D is an example according to various embodiments illustrating the height of the PVP spray feature after smoothing in ethanol vapor determined from AFM profiles.

While the polymer thickness increases, the ability to dissipate charges through the thickness of the film decreases and results in thinner sprayed PVP films. Interestingly, the thickness at which the PVP coating becomes negligible on PS is very similar to the 2000~3000 nm coating thickness that was observed to be the SLED coating for PS sprays onto silicon after densification. This supports a conclusion that the SLED thickness is less a dynamic process than inherent to the conductivity of the polymer and that the other observed changes in thickness have more to do with thermal and solvent-related effects.

For Parylene C deposition, the thickness decrease of PVP thin films occurs more rapidly. These results are not surprising because the bulk resistivity of PS, ~$10^{15}$ Ohm-cm, is less than that of Parylene C. ~$10^{17}$ Ohm-cm. Both results confirm, however, that the SLED thickness occurs once a specific total film resistivity is reached and that the thickness of a predeposited layer can be used as an effective means to control the thickness of a second spray. As described according to various embodiments, this thickness can also be utilized to measure the resistivity of insulating substrates.

Example 5

One purpose of this example is to demonstrate that the characteristic effect shown in FIGS. 16A and 16B, for example, can also be utilized as a means of metrology in multiple ways. One embodiment would be a means to measure thickness of a material with a known bulk resistivity by measuring the SLED coating thickness deposited on it. Here, curves as shown in FIGS. 16A and 16B would be used to develop an empirical relation or a look up table of SLED thickness as a function of bulk resistivity and coating thickness. Another embodiment could similarly be measuring the resistivity of a layer of unknown material of known thickness by the same approach, where the thickness could be measured by optical profilometry, cross-sectional measurement, or some other means. The same approach could be employed to evaluate materials with different surface conductivity by grounding them to a conductive material. All of these approaches be employed to evaluate materials with spatially-varying resistivity, thickness, or surface conductivities, where thicker SLED coating would indicate a more conductive (thinner) region. Relevant examples are films or monoliths polymer composites loaded with electrically conductive fillers, where SLED thickness could indicate the conductivity and furthermore uniformity of the composite.

To show the effects of in-plane confinement, we employed the laser dewetted sample. While the sprayed PVP was clearly much thicker in the dewetted regions than on the mask, the effects of the in-plane confinement were also apparent in the variation in height. Two important things to note are that the thickness within the dewetted regions are much higher than the PVP self-limiting thickness and also that overall curvature, even in the smallest dewetted feature is quite small. This indicates that the charge buildup from the surrounding mask is at first focusing the spray to create taller features and then creates a repulsive charge that arrests the spray, leading to the observed increasing height with increasing dewetted width. Interestingly, the undensified regions may have an aspect ratio reaching or exceeding 1, though this will be more difficult to measure by AFM and will require different analysis to confirm.

Example 6

One purpose of this example is to demonstrate a method of repairing a flaw in a layer according to various embodiments. Scratches and cracks in coatings represent highly-relevant embodiments of repairs that can be made by SLED, where these defects represent localized paths to ground. According to various embodiments, a SLED coating can be repaired by a second SLED coating; however, some amount of residue may be present on the surface surrounding the repaired films. Ideally, this repair should occur without affecting the surrounding region.

Since insulating surfaces must first build up charge before repelling future charges and acting as a focusing stencil, this would make routine area-limited repair impractical as it would (1) waste material and (2) continuously build unwanted and rough layers of the repair material. To prevent this, pretreatment with a spray of the same polarity as the SLED spray is a viable approach in coating repair. By spraying the part with charged solvent that is then evaporated, the majority of surface will repel further spray. The defects, however, can dissipate the charge as they are direct routes to the bulk of the conductor.

To create these examples, Polystyrene (PS, Sigma Aldrich 35 KDa) was diluted in 2-Butanone as 1 wt % spray solution. To differentiate the first spray and the second spray, 0.1 wt % Rhodamine B dye and copper blue dye were added into the diluted solution separately for electrospray. The first spray was completed with copper blue-dyed PS solution and collected on the silicon wafer (10 cm diameter) at 0.5 milliliters/hour for 15 min at room temperature. The spray voltage was controlled as ~5.4 kilovolts with the focus ring's voltage between 2.3 kilovolts~2.5 kilovolts. The spray distance was 4 cm from tip of spray needle to the substrate. A thin scratch line of around 0.5 mm width and 3 cm length was made in the center of first spray film and then optionally sprayed directly with pure ethanol solvent for 5 min using the same experimental spray parameters. After the optional ethanol spray, PS with Rhodamine B dye was sprayed another 15 min on the scratched film with the same control condition of first spray. An optical microscope (Leica) was employed for characterizing the surface of scratched film before and after the second spray.

FIG. 18A is an example according to various embodiment illustrating a schematic cross-section of a SLED coating 1801 on an object 1805 having a scratch 1803. FIG. 18B is an example according to various embodiment illustrating a schematic cross-section of the SLED coating 1801 on the object 1805 having a scratch repaired with a repair layer 1807 deposited by SLED. The repair is shown as leaving a residue 1809 on unscratched portions of the coating 1801. FIG. 18C is an example according to various embodiment illustrating a reflective optical microscope image of a SLED coating having a scratch, that corresponds with the cross-section schematic shown in FIG. 18A. FIG. 18D is an example according to various embodiment illustrating a reflective optical microscope image of a SLED coating having a scratch repaired with a repair layer deposited by SLED, that corresponds with the cross-section schematic shown in FIG. 18B, being done without the optional ethanol spray.

FIG. 19A is an example according to various embodiment illustrating a schematic cross-section of a SLED coating 1903 on an object 1901 having a scratch 1905 after a charge 1907 has been applied to the coating 1903. FIG. 19B is an example according to various embodiment illustrating a schematic cross-section of the SLED coating 1903 having a scratch repaired with a repair layer 1909 deposited by SLED. FIG. 19C is an example according to various embodiment illustrating a reflective optical microscope image of a SLED coating having a scratch, that corresponds with the cross-section schematic shown in FIG. 19A. FIG. 19D is an example according to various embodiment illustrating a reflective optical microscope image of a SLED coating having a scratch repaired with a repair layer deposited by SLED, that corresponds with the cross-section schematic shown in FIG. 19B, being done with the optional ethanol spray.

Example 7

One purpose of this example is to demonstrate SLED of multi-component solutions. PS (molecular weight (MW)=35 kDa and 850 kDa, Sigma Aldrich), KRATON® D1102 styrene-butatiene-styrene block copolymer (PolyOne GLS) a polymeric solid epoxy novolac resin, specifically SU-8 (EPON™ Resin SU-8) were used as received from the manufacturer. A polyamide, VERSAMID® 125, which is a reactive amide resin from Gabriel Chemical was used as a curing agent and soy oil (Sigma Aldrich) as an immiscible liquid to make SU-8 composites. 2-butanone (>99%, Sigma Aldrich) was used as received as the carrier solvent.

The setup included four components: a syringe pump, a stainless needle (Sai Infusion, 20 gauge, 1.5") and a steel focused ring (inner diameter of 2 cm and an outer diameter of 4 cm) with two high-voltage power supply, a 10 cm circular collection silicon wafer within one 1 cm×1 cm silicon chip in the center on the hotplate. The wafer was clipped with ground wire during spray.

Silicon wafer and chips were cleaned and degreased by acetone and ethanol before spray. To get SLED for polymer and its composites samples, 2-Butanone was used as an All the samples were sprayed for 60 min at a spray distance to 4 cm, with flow rate of 0.5 mL/hr at 35° C. The driving voltage was maintained at around 5.4 kV. The focused ring was set ~1 cm above the needle and hold with 2.7 kV. Taylor-cone jet spray was achieved for all experiments in this study. Condensed PS and KRATON composites films were made by post thermal treatment at 120° C. after spraying. To smooth SU-8 and VERSAMID®125 films for measuring thickness, samples were heat at 80° C. for a few seconds.

A microscopic reflectometer (Filmetrics F40) and a motorized stage (Zaber E13F33E) were used for measuring thickness. To examine the self-limiting regime of samples, the mapping profile was collected using 200 points in alignment which covers the center of spray spot which has been reported in our self-limiting study. The center 1 cm was used for calculating the central thickness. Thicknesses of chip samples were mapped by 100 points. 10×10 mm square with 1 mm distance. The concentration of precursor solutions was fixed at 1 vol % by adjusting composites with different volume fractions using their density.

Figure 20A:
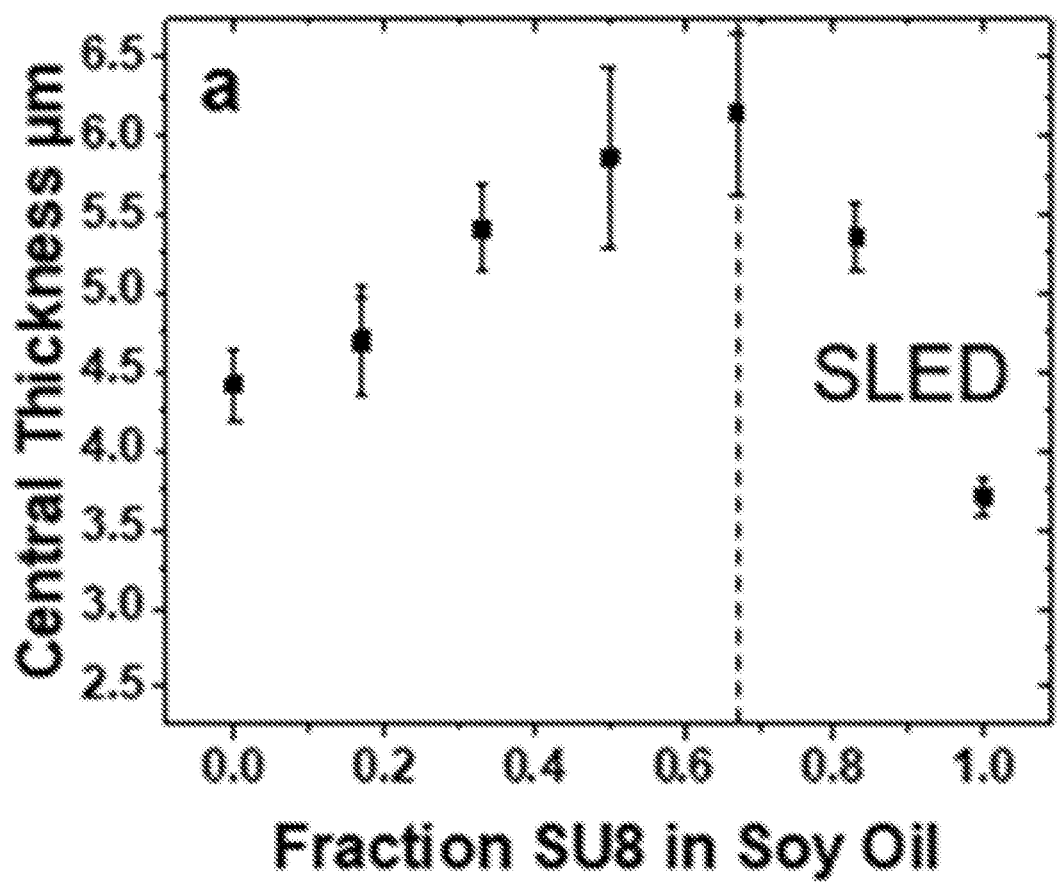
FIG. 20A is an example according to various embodiments illustrating a chart of central thickness vs fraction of a polymeric solid epoxy novolac resin in Soy Oil.

FIG. 20A is an example according to various embodiments illustrating a chart of central thickness vs fraction of a polymeric solid epoxy novolac resin (SU-8) in Soy Oil. FIG. 20A shows that a blend with soy oil reveals that there can be a transition to thick charged melt when an electrowetting material is blended with an immiscible SLED material.

Figure 20B:
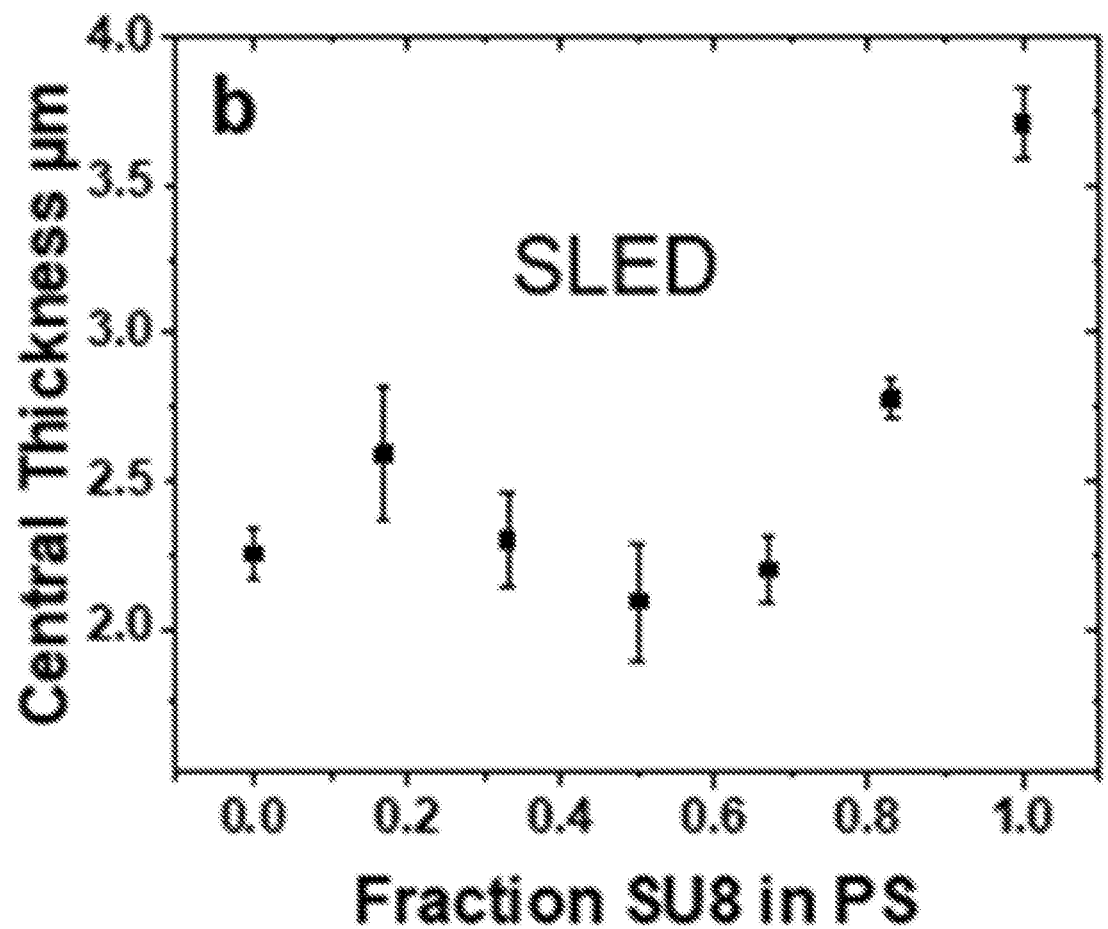
FIG. 20B is an example according to various embodiments illustrating a chart of central thickness vs fraction of a polymeric solid epoxy novolac resin in polystyrene (PS)

FIG. 20B is an example according to various embodiments illustrating a chart of central thickness vs fraction of a polymeric solid epoxy novolac resin (SU-8) in polystyrene (PS). FIG. 20B shows that a blend with PS reveals that blending immiscible SLED materials can result in non-monotonic changes to the SLED thickness that leads to thinner SLED thickness.

Figure 20C:
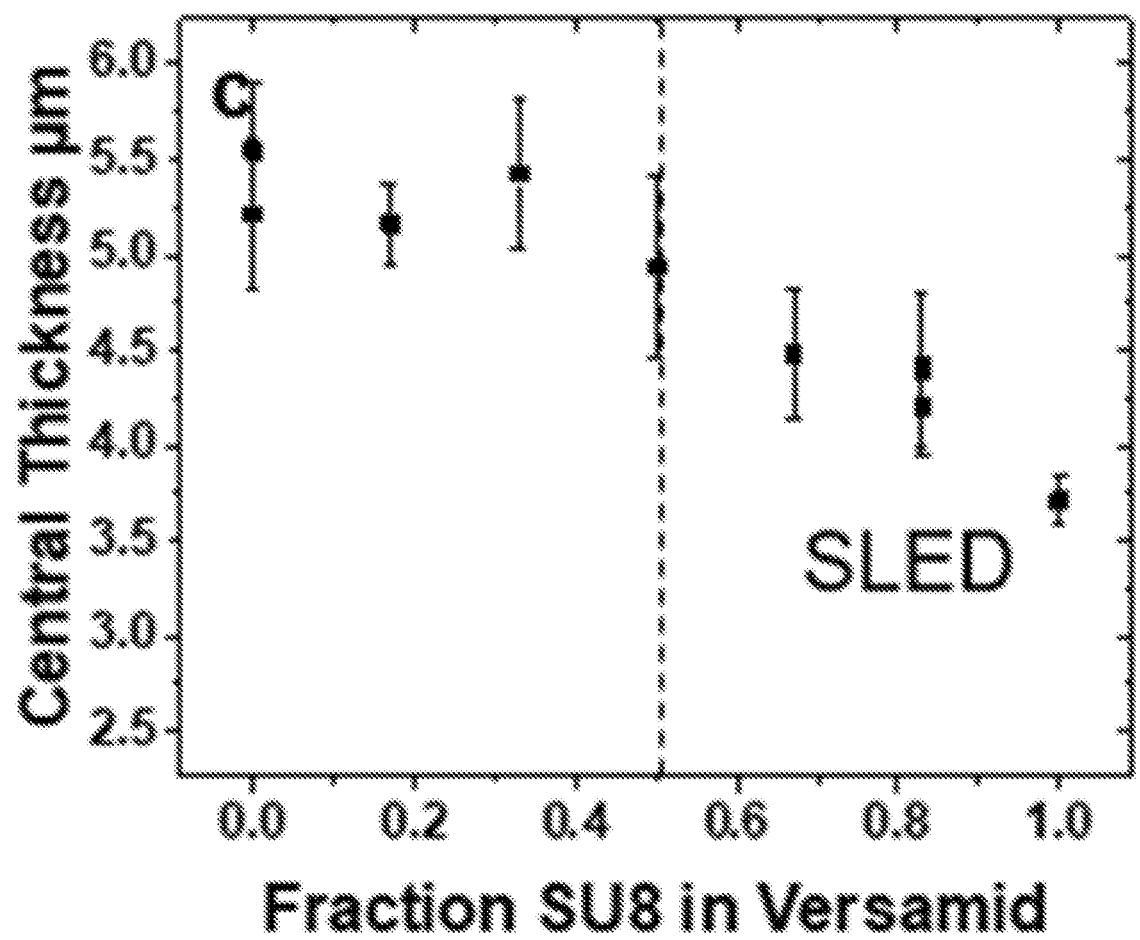
FIG. 20C is an example according to various embodiments illustrating a chart of central thickness vs fraction of a polymeric solid epoxy novolac resin in polyamide resin.

FIG. 20C is an example according to various embodiments illustrating a chart of central thickness vs fraction of a polymeric solid epoxy novolac resin (SU-8) in polyamide resin. FIG. 20C shows that a blend with Versamid reveals that charged melt materials when blended with a SLED material can result in a limited region of SLED films that were observed to crosslink in this case making a film that could not be removed with solvent at the 0.5 and 0.66 SU-8 fractions.

Figure 21A:
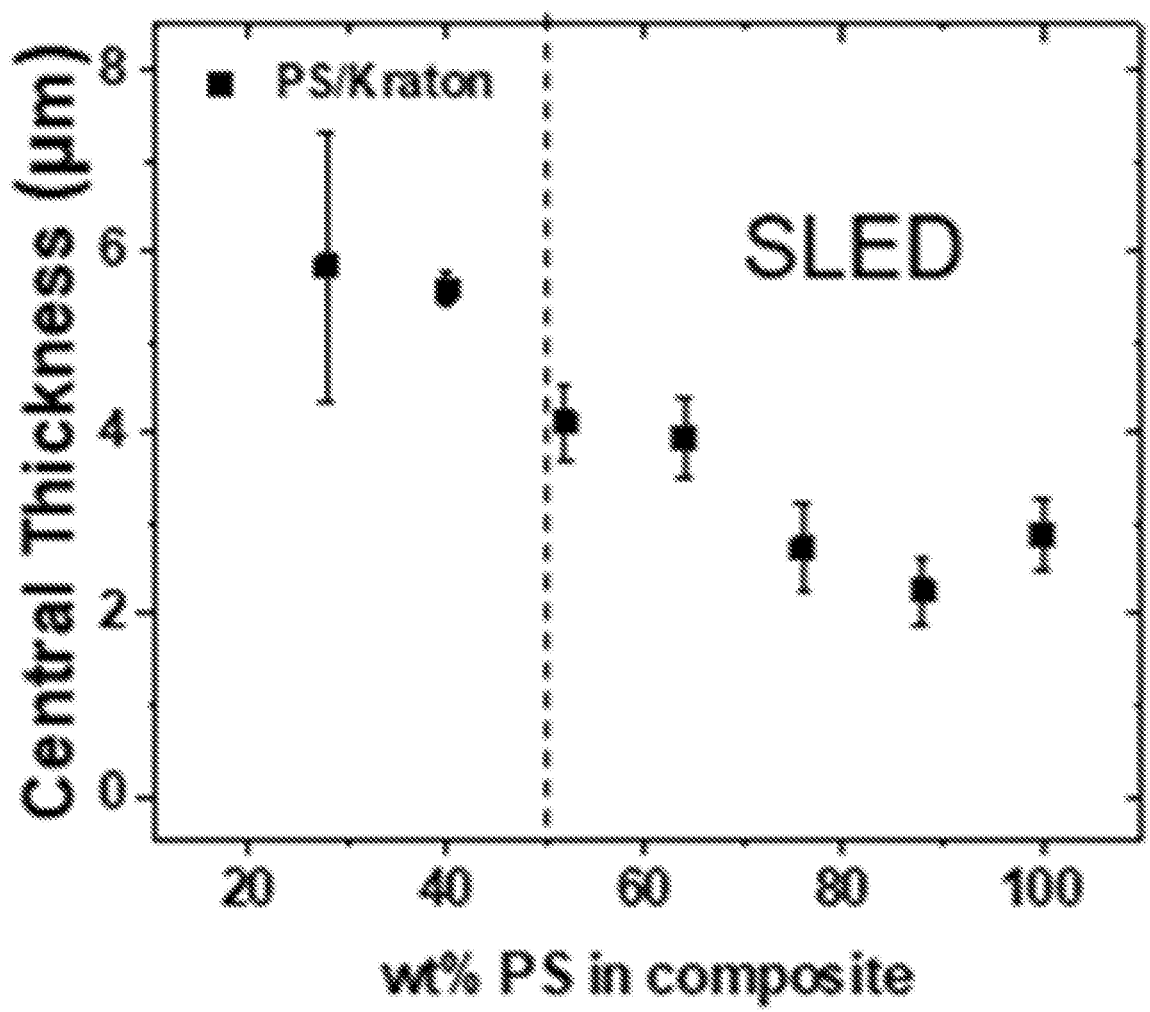
FIG. 21A is an example according to various embodiments illustrating a chart of central thickness vs fraction of a polystyrene (PS) in KRATON® D1102 styrene-butatiene-styrene block copolymer.

FIG. 21A is an example according to various embodiments illustrating a chart of central thickness vs fraction of a polystyrene (PS) in KRATON® D1102 styrene-butatiene-styrene (SBS) block copolymer. This KRATON blend reveals that microphase separation in the block copolymer may lead to more discrete steps.

Figure 21B:
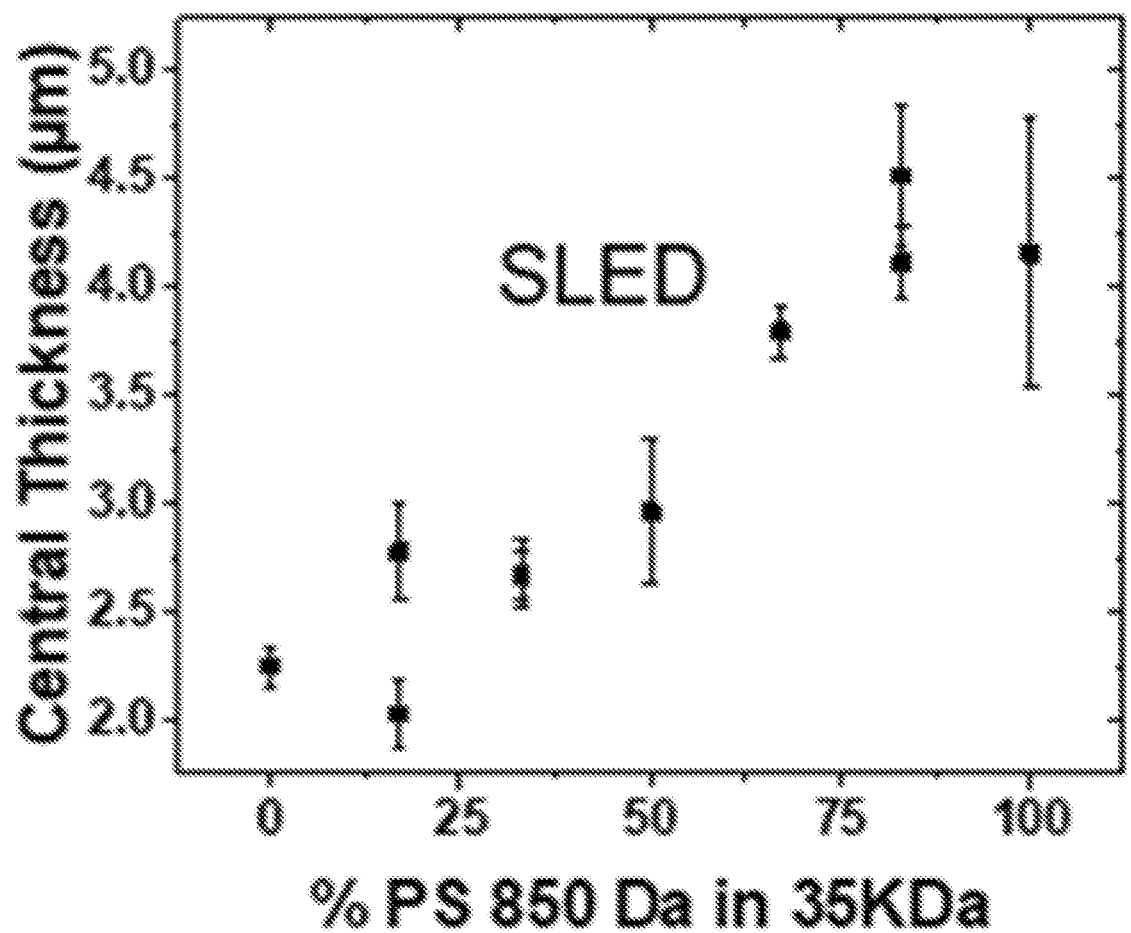
FIG. 21B is an example according to various embodiments illustrating a chart of central thickness vs fraction of a blend of PS having a molecular weight of 850 kDa with a PS having a molecular weight of 35 kDa.

FIG. 21B is an example according to various embodiments illustrating a chart of central thickness vs fraction of a blend of PS having a molecular weight of 850 kDa with a PS having a molecular weight of 35 kDa. This blends of two molecular weights reveals a smooth transition in thickness that may be attributed to changes in the glass transition temperature of the mixed molecular weight blend.

Example 8

One purpose of this example is to illustrate the morphologies obtained for a variety of spray formulations according to various embodiments.

Figure 22A:
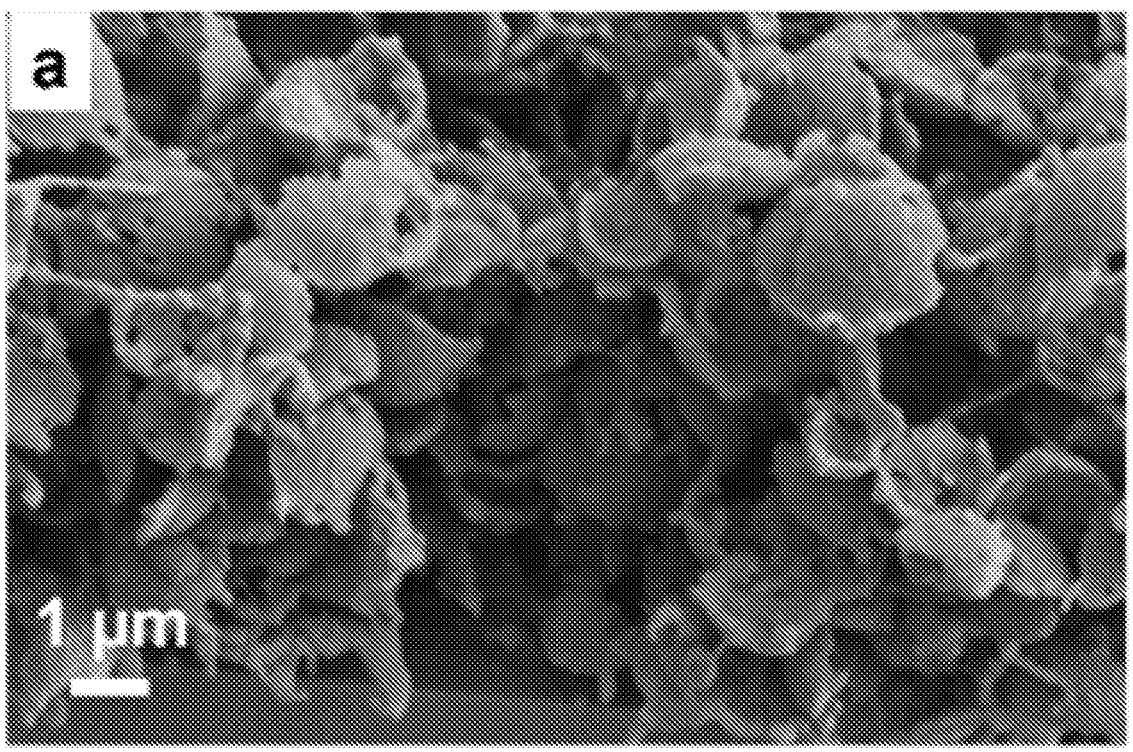
FIG. 22A is an example according to various embodiments illustrating a tilted SEM image showing the surface morphology obtained by performing a self-limiting electrospray deposition (SLED) of a spray comprising polystyrene (PS) and an KRATON® SBS block copolymer in a 1:1 ratio by mass.

FIG. 22A is an example according to various embodiments illustrating a tilted SEM image showing the surface morphology obtained by performing a self-limiting electrospray deposition (SLED) of a spray comprising polystyrene (PS) and an KRATON® SBS block copolymer composition. This demonstrates the change in morphology by blending as compared to PS only spray in FIG. 3B.

Figure 22B:
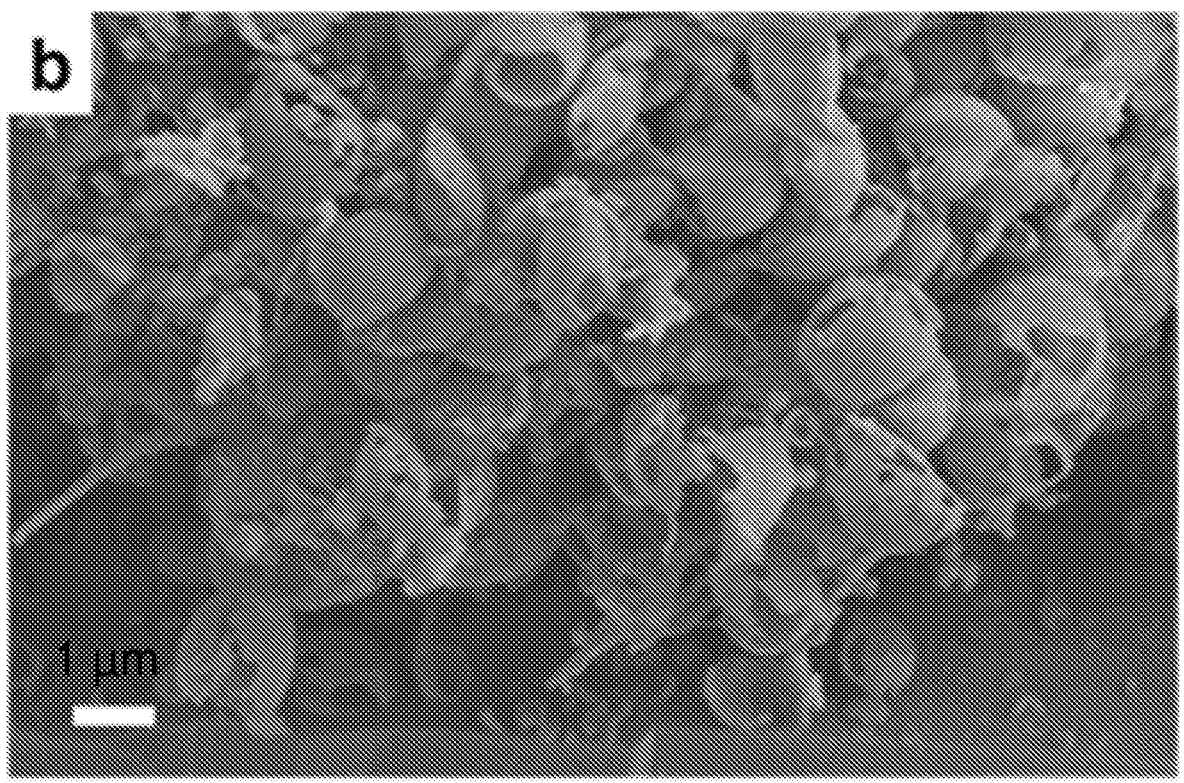
FIG. 22B is an example according to various embodiments illustrating a tilted SEM image showing the surface morphology obtained by performing a self-limiting electrospray deposition (SLED) of a spray comprising PS and a plurality of carbon nanotubes (CNT)

FIG. 22B is an example according to various embodiments illustrating a tilted SEM image showing the surface morphology obtained by performing a self-limiting electrospray deposition (SLED) of a spray comprising PS and a plurality of carbon nanotubes (CNT).

Figure 22C:
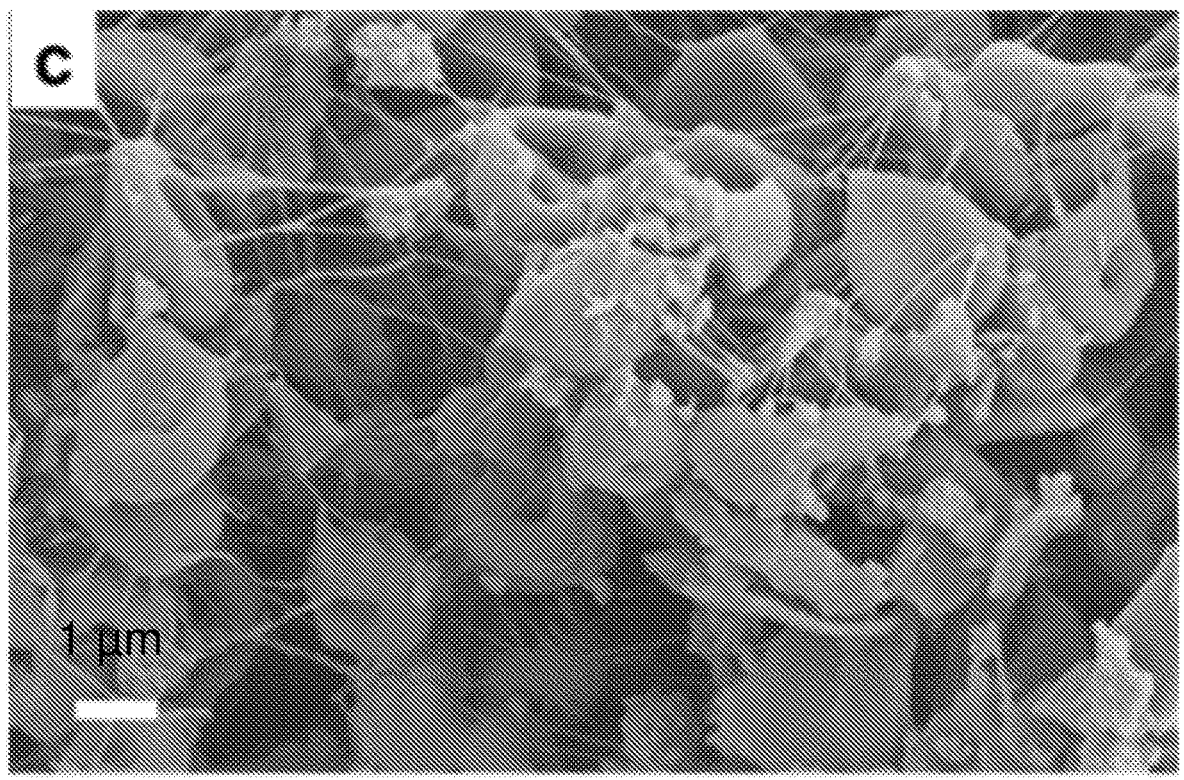
FIG. 22C is an example according to various embodiments illustrating a tilted SEM image showing the surface morphology obtained by performing a self-limiting electrospray deposition (SLED) of a spray comprising a nylon copolymer and a plurality of hydroxyapatite nanoparticles.

FIG. 22C is an example according to various embodiments illustrating a tilted SEM image showing the surface morphology obtained by performing a self-limiting electrospray deposition (SLED) of a spray comprising a nylon copolymer and a plurality of hydroxyapatite nanoparticles.

Figure 22D:
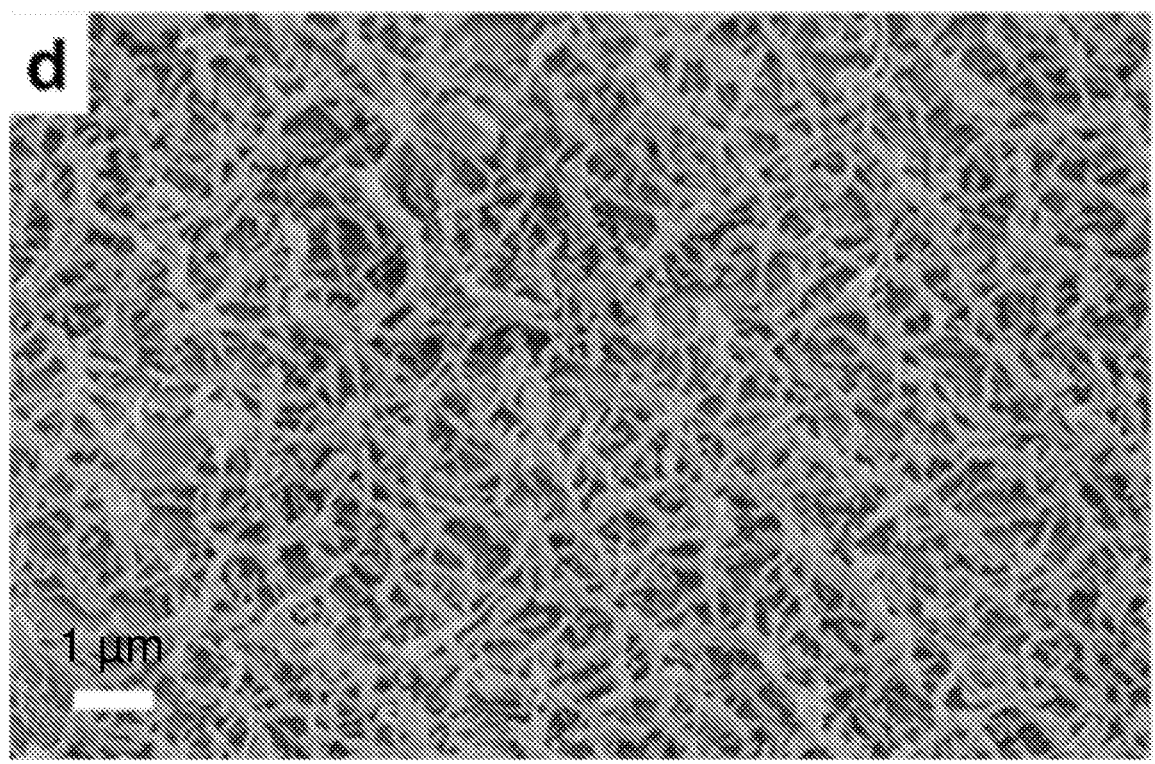
FIG. 22D is an example according to various embodiments illustrating a tilted SEM image showing the surface morphology obtained by performing a self-limiting electrospray deposition (SLED) of a spray comprising methyl cellulose and a plurality of silica nanoparticles.

FIG. 22D is an example according to various embodiments illustrating a tilted SEM image showing the surface morphology obtained by performing a self-limiting electrospray deposition (SLED) of a spray comprising methyl cellulose and a plurality of silica nanoparticles.

Figure 22E:
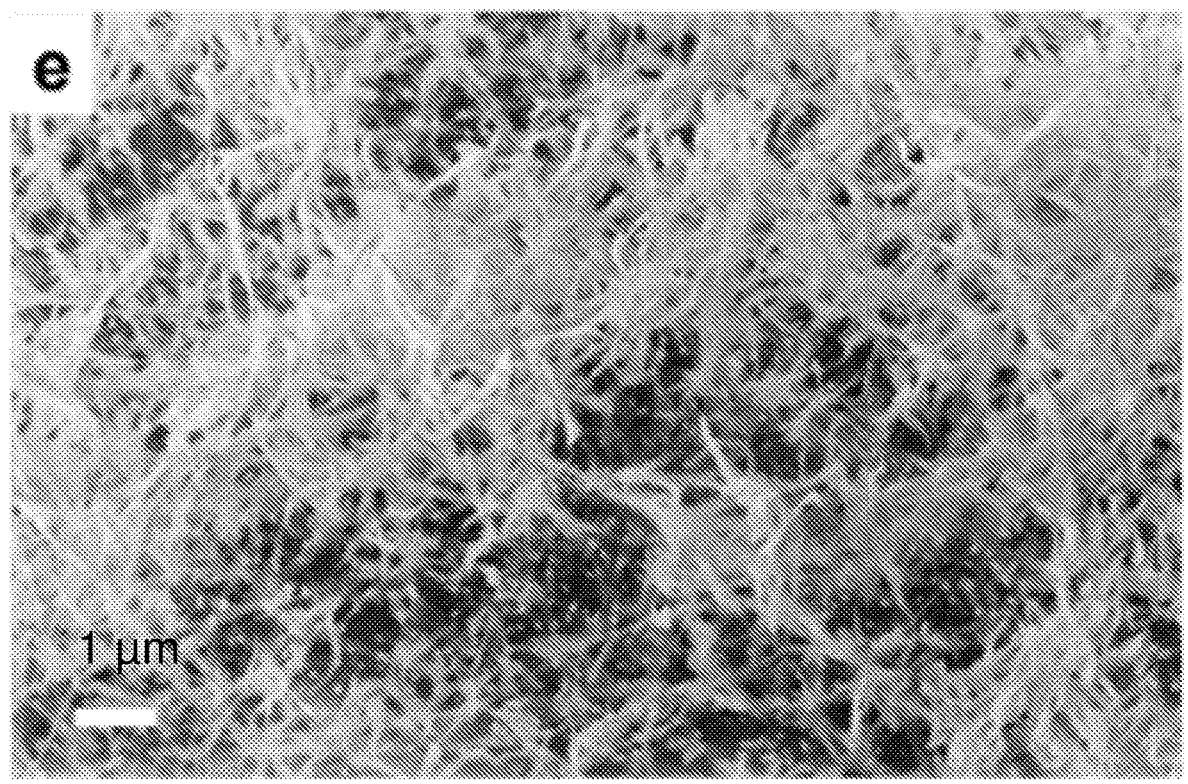
FIG. 22E is an example according to various embodiments illustrating a tilted SEM image showing the surface morphology obtained by performing a self-limiting electrospray deposition (SLED) of a spray comprising methyl cellulose and a plurality of gold nanoparticles.

FIG. 22E is an example according to various embodiments illustrating a tilted SEM image showing the surface morphology obtained by performing a self-limiting electrospray deposition (SLED) of a spray comprising methyl cellulose and a plurality of gold nanoparticles at an estimated 20% loading by volume.

Figure 22F:
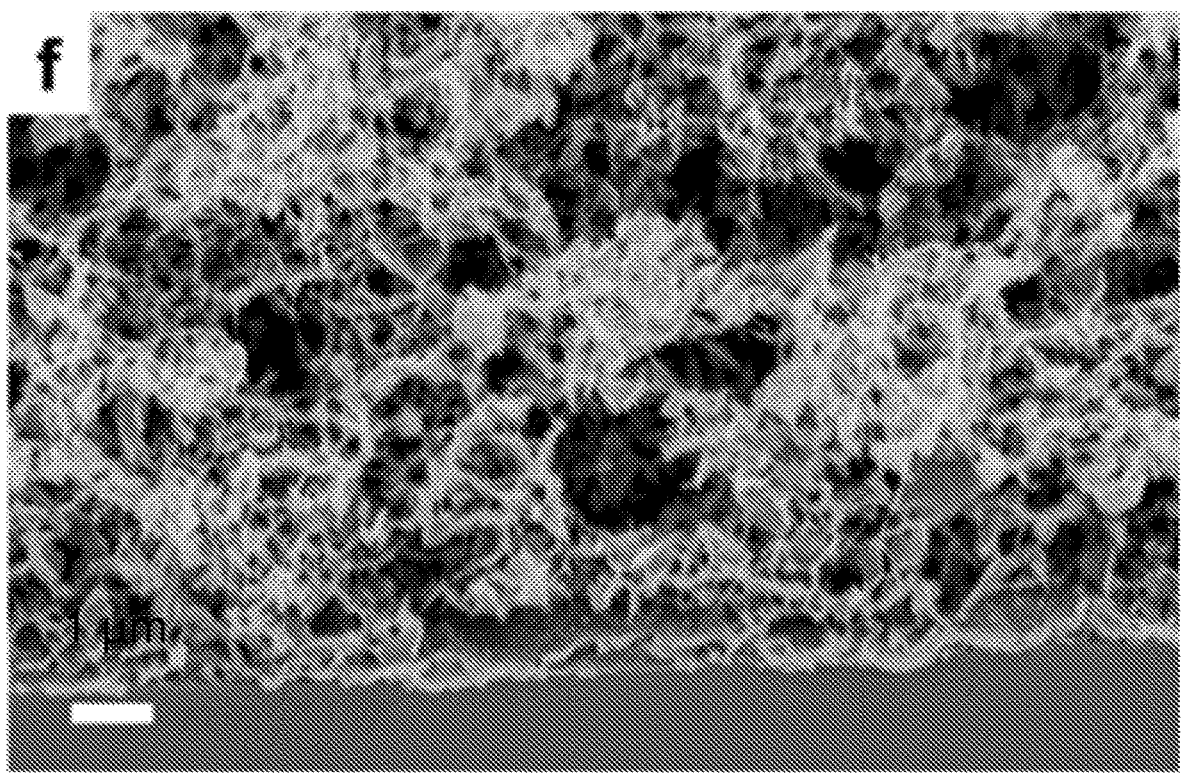
FIG. 22F is an example according to various embodiments illustrating a tilted SEM image showing the surface morphology obtained by performing a self-limiting electrospray deposition (SLED) of a spray comprising methyl cellulose and a plurality of 2D MXene nanoparticles.

FIG. 22F is an example according to various embodiments illustrating a tilted SEM image showing the surface morphology obtained by performing a self-limiting electrospray deposition (SLED) of a spray comprising methyl cellulose and a plurality of 2D MXene nanoparticles at an estimated 70% loading by volume. This coating could be burned at 500° C. for around one hour to create a conductive surface coating.

Example 9

One purpose of this example is to illustrate results obtained for a variety of spray formulations comprising methyl cellulose (MC) and a variety of other and other biocompatible materials, according to various embodiments. Blends of methyl cellulose and a variety of other and other biocompatible materials sprayed from a 3:2 blend by volume of water and ethanol. The blends are evaluated by spot area, with a larger spot area indicating a more self-limiting spray.

Figure 23A:
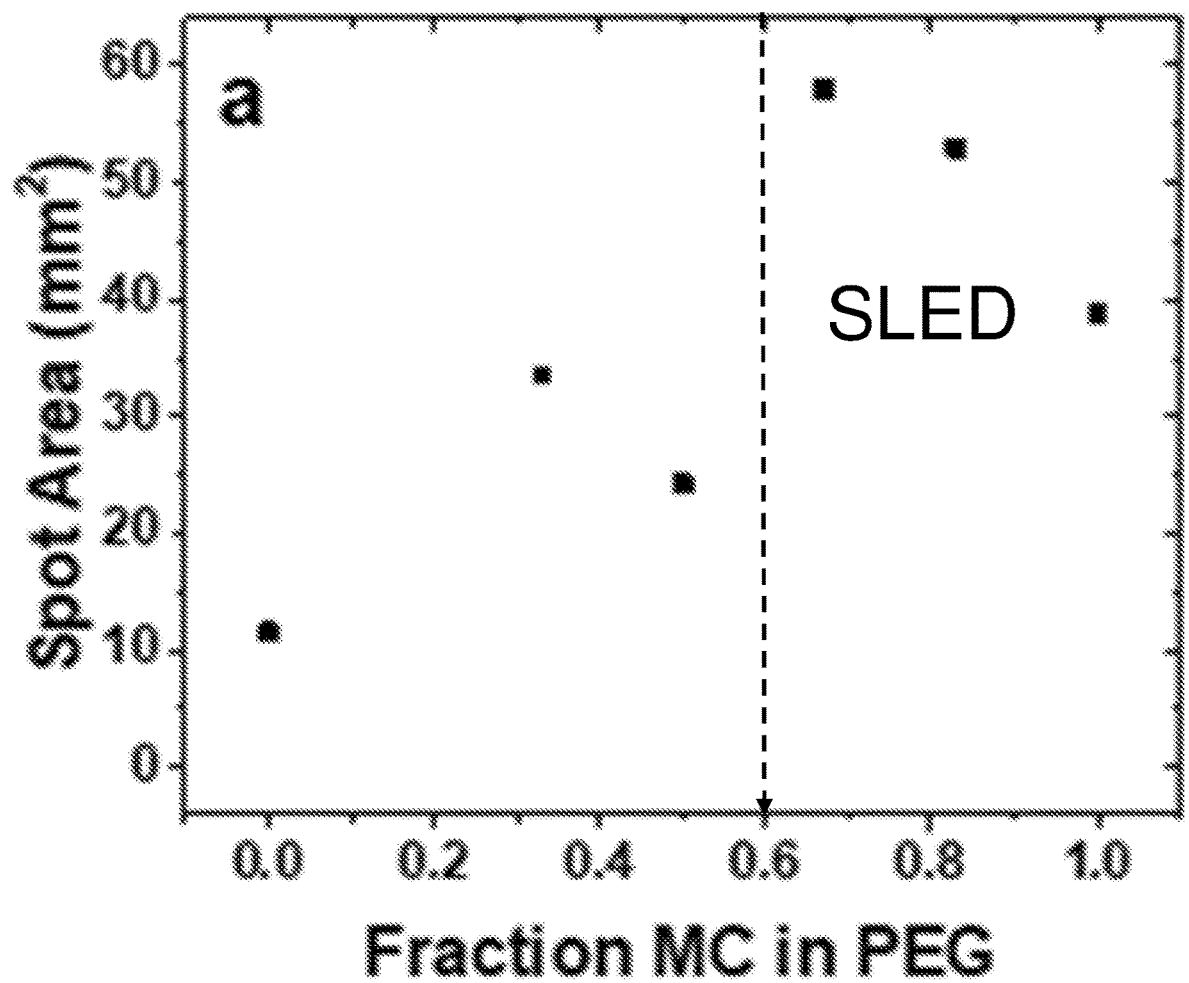
FIG. 23A is an example according to various embodiments illustrating a chart plotting spot area versus fraction of methylcellulose and PEG.
Figure 23B:
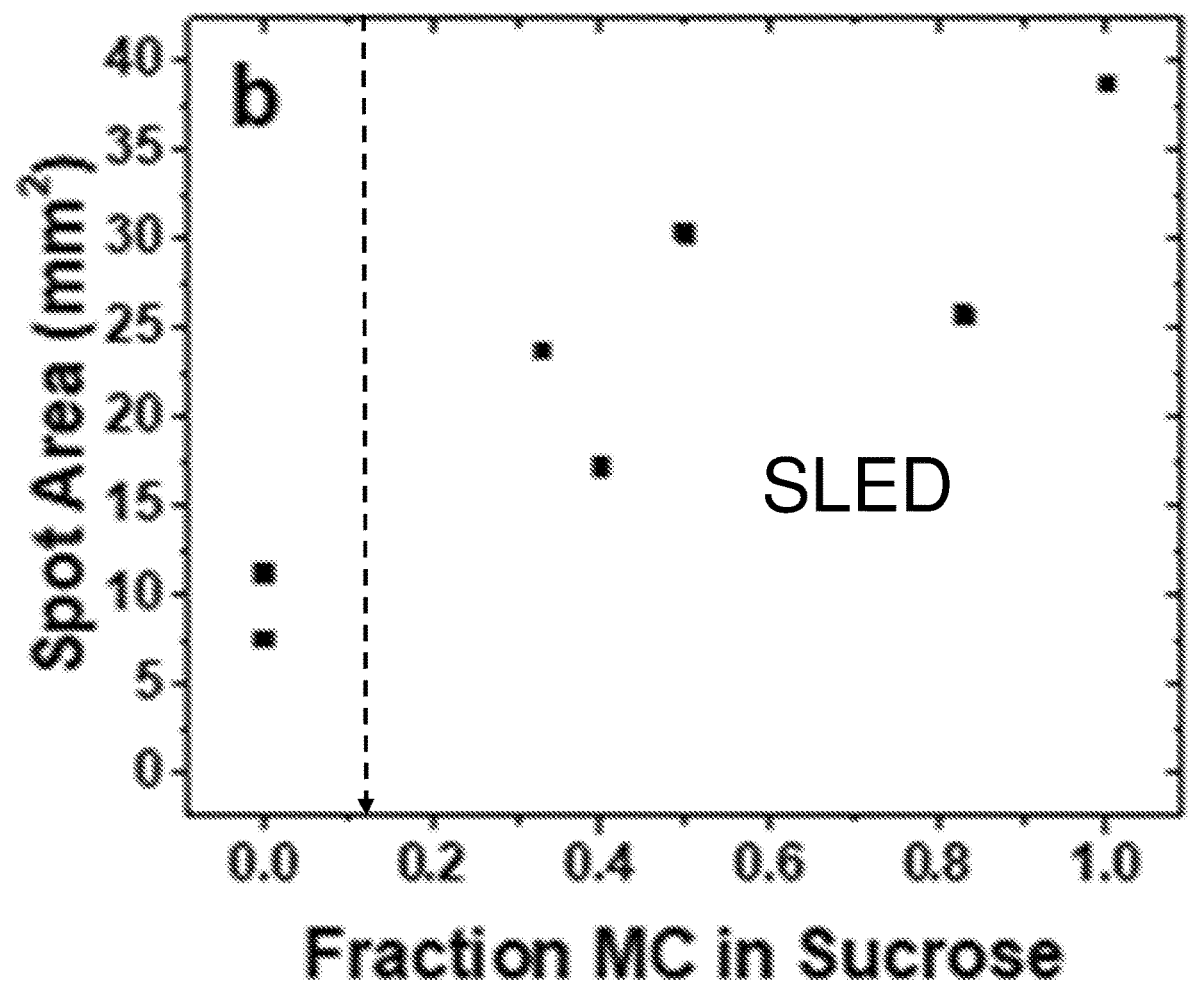
FIG. 23B is an example according to various embodiments illustrating a chart plotting spot area versus fraction of methylcellulose and sucrose.
Figure 23C:
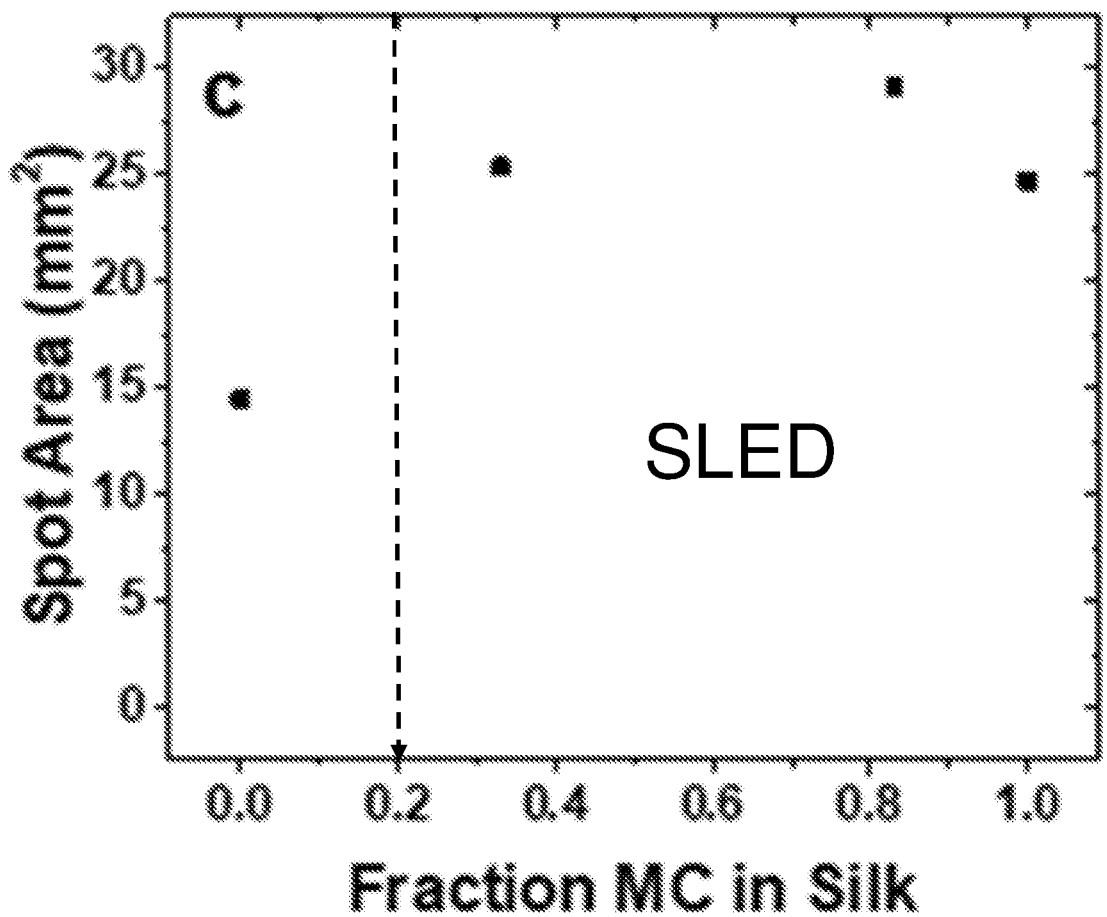
FIG. 23C is an example according to various embodiments illustrating a chart plotting spot area versus fraction of methylcellulose and silk.
Figure 24:
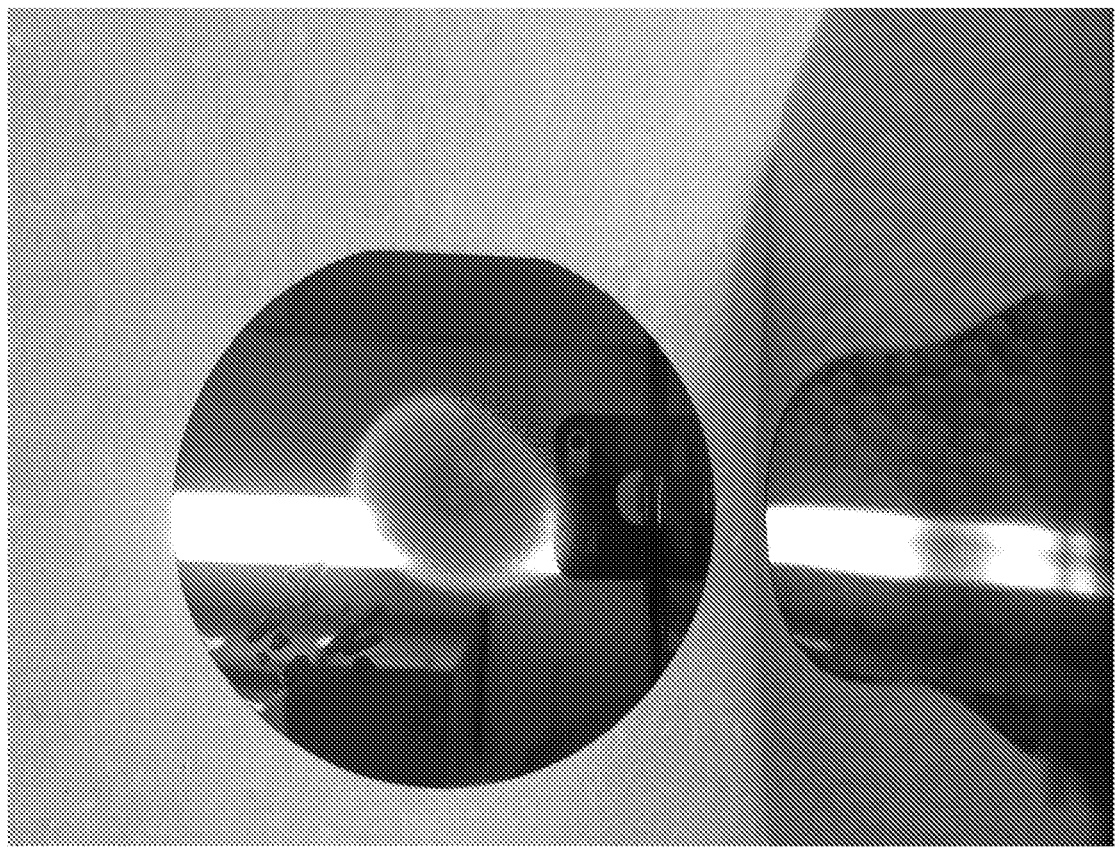
FIG. 24 is an example according to various embodiment illustrating an image of an SLED coating obtained from a 2:1 blend of 1 wt % PVP-functionalized silver nanoparticles and 1 wt % nitrocellulose sprayed from 2-butanone.

FIG. 23A is an example according to various embodiments illustrating a

29. Weiss, F. M.; Topper, T.; Osmani, B.; Peters, S.; Kovacs, G.; Muller, B. *Adv. Electron. Mater.* 2016, 2, (5), 8.
30. Guo, Q.; Mather, J. P.; Yang, P.; Boden, M.; Mather, P. T. *PLOS ONE* 2015, 10, (6), e0129960.
31. Rietveld, I. B.; Kobayashi, K.; Yamada, H.; Matsushige, K. *Journal of Colloid and Interface Science* 2006, 298, (2), 639-651.
32. Novak, S.; Johnston, D. E.; Li, C.; Deng, W.; Richardson, K. *Thin Solid Films* 2015, 588, 56-60.
33. Chavhan, M. P.; Ganguly, S. *Industrial & Engineering Chemistry Research* 2016, 55, (38), 10073-10083.
34. Leeuwenburgh, S.; Wolke, J.; Schoonman, J.; Jansen, J. *Journal of Biomedical Materials Research Part A* 2003, 66A, (2), 330-334.
35. Kim, J.-Y.; Kim, E.-K.; Kim, S. S. *Journal of Colloid and Interface Science* 2013, 392, 376-381.
36. Kim, J. W.; Yamagata, Y.; Kim, B. J.; Higuchi, T. *Journal of Micromechanics and Microengineering* 2009, 19, (2), 025021.
37. Al-Milaji, K. N.; Zhao, H. *Applied Surface Science* 2017, 396, 955-964.
38. Burkarter, E.; Saul, C. K.; Thomazi, F.; Cruz, N. C.; Roman, L. S.; Schreiner, W. H. *Surface and Coatings Technology* 2007, 202, (1), 194-198.
39. Hou, X.; Choy, K.-L. *Surface and Coatings Technology* 2004, 180-181, 15-19.
40. Krella, A. K.; Sobczyk, A. T.; Krupa, A.; Jaworek, A. *Mechanics of Materials* 2016, 98, 120-133.
41. Hwang, D.; Lee, H.; Jang, S.-Y.; Jo, S. M.; Kim, D.; Seo, Y.; Kim, D. Y. *ACS Applied Materials & Interfaces* 2011, 3, (7), 2719-2725.
42. Li, Q.; Church, J. S.; Naebe, M.; Fox, B. L. *Composites Part A: Applied Science and Manufacturing* 2016, 90, 174-185.
43. Tang, J.; Gomez, A. *Aerosol Science and Technology* 2017, 51, (6), 755-765.
44. Lei, L.; Kovacevich, D. A.; Nitzsche, M. P.; Ryu, J.; Al-Marzoki, K.; Rodriguez, G.; Klein, L. C.; Jitianu, A.; Singer, J. P. *ACS Applied Materials & Interfaces* 2018, 10, (13), 11175-11188.
45. Cazaux, J. *Journal of Electrostatics* 2007, 65, (12), 764-774.
46. Hoburg, J. F. *IEEE Transactions on Industry Applications* 1982, (6), 666-672.
47. Bodnár, E.; Rosell-Llompart, J. *Journal of Colloid and Interface Science* 2013, 407, (0), 536-545.
48. Hoang, A.; Pallon, L.; Liu, D.; Serdyuk, Y.; Gubanski, S.; Gedde, U. *Polymers* 2016, 8, (3), 87.
49. A., N. F.; Alexandra, P.; F., K. B. A.; Martin, D.; Markus, R. *Advanced Materials* 2018, 30, (14), 1704910.
50. Tang, K.; Gomez, A. *Physics of Fluids* 1994, 6, (7), 2317-2332.
51 Freeman, P.; Rowlinson, J. *Polymer* 1960, 1, 20-26.
52. Kay, D.; Styles, V.; Welford, R. *Interfaces Free Bound* 2008, 10, (1), 15-43.
53. Brown, E.; Zhang, H.; Forman, N. A.; Maynor, B. W.; Betts, D. E.; DeSimone, J. M.; Jaeger, H. M. *Physical Review E* 2011, 84, (3), 031408.
54. Bertrand, E.; Bibette, J.; Schmitt, V. *Physical Review E* 2002, 66, (6), 060401.
55. Banerjee, P.; Mandal, B. M. *Macromolecules* 1995, 28, (11), 3940-3943.
56. Park, M.; Im, J.; Shin, M.; Min, Y.; Park, J.; Cho, H.; Park, S.; Shim, M.-B.; Jeon, S.; Chung, D.-Y.; Bae, J.; Park, J.; Jeong, U.; Kim, K. *Nat Nano* 2012, 7, (12), 803-809.
57. Kim, Y.; Zhu, J.; Yeom, B.; Di Prima, M.; Su, X.; Kim, J.-G.; Yoo, S. J.; Uher, C.; Kotov, N. A. *Nature* 2013, 500, (7460), 59-63.
58. Balazs, A. C.; Emrick, T.; Russell, T. P. *Science* 2006, 314, (5802), 1107-1110.
59. Li, J.; Kim, J.-K. *Composites Science and Technology* 2007, 67, (10), 2114-2120.
60. Wang, Y.; Shan, J. W.; Weng, G. J. *Journal of Applied Physics* 2015, 118, (6), 065101.
61. Dhawan, S. K.; Singh, N.; Venkatachalam, S. *Synthetic Metals* 2001, 125, (3), 389-393.
62. Coleman, J. N.; Curran, S.; Dalton, A. B.; Davey, A. P.; Mccarthy, B.; Blau, W.; Barklie, R. C. *Physical Review B* 1998, 58, (12), R7492-R7495.
63 Winey, K. I.; Kashiwagi, T.; Mu, M. *Mrs Bulletin* 2007, 32, (4), 348-353.
64. Powell, M. *Physical Review B* 1979, 20, (10), 4194.
65. Narkis, M.; Lidor, G.; Vaxman, A.; Zuri, L. *Journal of Electrostatics* 1999, 47, (4), 201-214.
66. Kitano, M.; Shiojiri, M. *Powder Technology* 1997, 93, (3), 267-273.
67. Kuhn, H. H., Characterization and Application of Polypyrrole-Coated Textiles. In *Intrinsically Conducting Polymers: An Emerging Technology*, Aldissi, M., Ed. Springer Netherlands: Dordrecht, 1993; pp 25-34.
68. Maleski, K.; Mochalin, V. N.; Gogotsi, Y. *Chemistry of Materials* 2017, 29, (4), 1632-1640.
69. Sprik, M.; Delamarche, E.; Michel, B.; Roethlisberger, U.; Klein, M. L.; Wolf, H.; Ringsdorf, H. *Langmuir* 1994, 10, (11), 4116-4130.
70. Lee, J.; Bong, J.; Ha, Y.-G.; Park, S.; Ju, S. *Applied Surface Science* 2015, 330, 445-448.
71. Kanta, A.; Sedev, R.; Ralston, J. *Colloids and Surfaces A: Physicochemical and Engineering Aspects* 2006, 291, (1), 51-58.
72. Kataby, G.; Prozorov, T.; Koltypin, Y.; Cohen, H.; Sukenik, C. N.; Ulman, A.; Gedanken, A. *Langmuir* 1997, 13, (23), 6151-6158.
73. Hoque, E.; DeRose, J. A.; Houriet, R.; Hoffmann, P.; Mathieu, H. J. *Chemistry of Materials* 2007, 19, (4), 798-804.
74. Kay, D.; Styles, V.; Welford. R *Interfaces Free Bound* 10.1 (2008): 15-43.
75 Altmann, K.; Schulze, R. D.; Friedrich, J. *Thin Solid Films* 2014, 564, 269-276.
76 Altmann, K.; Schulze, R. D.; Hidde, G.; Friedrich, J. *Journal of Adhesion Science and Technology* 2013, 27, (9), 988-1005.
77. Barletta, M.; Gisario, A. *Prog. Org. Coat.* 2009, 64, (4), 339-349.
78 Gañán-Calvo, A. M.; Dávila, J.; Barrero, A. *J. Aerosol Sci* 1997, 28, (2), 249-275.
79. Barletta, M.; Gisario, A.; Rubino, G.; Tagliaferri, V. *Surf. Coat. Technol.* 2006, 201, (6), 3212-3228.
80 Hardy, G. F. *Journal of Paint Technology* 1974, 46, (599), 73-82.
81. Wu, S. *Polymer-Plastics Technology and Engineering* 1976, 7, (2), 119-220.
82. Lee, S., et al. *Appl. Phys. Lett.* 2015, 106, (17), 173303.

What is claimed is:
1. A self-limiting electrospray composition comprising a non-charge-dissipative component and a charge-dissipative component, wherein the non-charge-dissipative component is non-volatile under electrospray deposition conditions, and wherein the charge-dissipative component is non

2. The self-limiting electrospray composition according to claim 1, wherein the non-charge-dissipative component is selected from the group consisting of a non-charge-dissipative polymer, a non-charge-dissipative organosilicon compound, a non-charge-dissipative polysaccharide, a non-charge-dissipative polypeptide, a non-charge-dissipative collagen derivative, a non-charge-dissipative cellulose derivative, a non-charge-dissipative compound containing an epoxide functional group, a non-charge-dissipative urethane, and combinations thereof.

3. The self-limiting electrospray composition according to claim 1, wherein the charge-dissipative component is selected from the group consisting of a charge-dissipative polymer, a charge-dissipative curing agent or photoinitiator, a charge-dissipative organic compound, a charge-dissipative ionic compound, a charge-dissipative chalcogenide glass, a charge-dissipative oil, a charge-dissipative saccharide, a charge-dissipative surfactant, a charge-dissipative polymer, a charge-dissipative protein, a nucleic acid, and combinations thereof.

4. A three-dimensional structure conformally-coated with a thin film, wherein the thin film comprises a self-limiting electrospray composition, and wherein the thin film conformally coats the three-dimensional structure such that a thickness of the thin film varies by less than 75% across a surface of the three-dimensional structure.

5. The three-dimensional structure according to claim 4, wherein the thin film has a thickness of less than 1 mm.

6. The three-dimensional structure according to claim 4, wherein the self-limiting electrospray composition comprises a non-charge-dissipative component and a charge-dissipative component.

7. The three-dimensional structure according to claim 6, wherein the non-charge-dissipative component is a non-conductive polymer in the form of a plurality of spheroidal particles comprising the non-conductive polymer, wherein each of the plurality of spheroidal particles has at least one dimension less than 100 micrometers.

8. The three-dimensional structure according to claim 4, wherein the self-limiting electrospray composition comprises a plurality of charge-dissipative components and excludes a non-charge-dissipative component, and wherein each one of the charge-dissipative components is not capable of forming a layer of self-limiting thickness when electrosprayed without a component selected from the group consisting of at least one other member of the plurality of charge-dissipative components, a non-charge-dissipative component, and combinations thereof.

9. A method for determining a conductivity of a material, the method comprising exposing a material to a spray in the presence of an electric field, wherein the spray comprises a self-limiting electrospray composition; allowing the spray to accumulate on a surface of the material to form the layer of self-limiting thickness, wherein the self-limiting thickness is sufficient to allow the layer to hinder further accumulation of the spray on the material; measuring the self-limiting thickness of the layer; and determining the conductivity of the material by comparing the self-limiting thickness to a thickness achieved by exposing a test material having a known conductivity to the spray in the presence of the electric field.

10. The method according to claim 9, wherein the self-limiting electrospray composition comprises a thermo-responsive polymer solution.

11. The method according to claim 9, wherein the self-limiting electrospray composition comprises a plurality of charge-dissipative components and excludes a non-charge-dissipative component, wherein each one of the charge-dissipative components is not capable of forming a layer of self-limiting thickness when electrosprayed without a component selected from the group consisting of at least one other member of the plurality of charge-dissipative components, a non-charge-dissipative component, and combinations thereof.

12. A method for repairing a flaw in a layer on a surface of an object, the method comprising applying a charge to the layer; exposing the flaw to a spray in the presence of an electric field, wherein the spray comprises a self-limiting electrospray composition; and allowing the spray to accumulate on the flaw to form a repair layer having a self-limiting thickness, wherein the self-limiting thickness is sufficient to hinder further accumulation of the spray on the repair layer.

13. The method according to claim 12, wherein the self-limiting electrospray composition comprises a charge-dissipative component and a non-charge-dissipative component.

14. The method according to claim 12, wherein the self-limiting electrospray composition comprises a thermo-responsive polymer solution.

15. The method according to claim 12, wherein the self-limiting electrospray composition comprises a plurality of charge-dissipative components and excludes a non-charge-dissipative component, wherein each one of the charge-dissipative components is not capable of forming a layer of self-limiting thickness when electrosprayed without a component selected from the group consisting of at least one other member of the plurality of charge-dissipative components, a non-charge-dissipative component, and combinations thereof.

16. The method according to claim 12, wherein the layer on the surface of the object is not conductive, and wherein the step of applying a charge to the layer comprises applying a solids-free spray to the layer.

17. The method according to claim 12, wherein the layer on the surface of the object is conductive, and wherein the step of applying a charge to the layer comprises contacting the layer with a voltage source.

* * * * *